United States Patent
Choi et al.

(10) Patent No.: US 9,396,511 B2
(45) Date of Patent: Jul. 19, 2016

(54) IMAGE PROCESSING APPARATUS, UPGRADE APPARATUS, DISPLAY SYSTEM INCLUDING THE SAME, AND CONTROL METHOD THEREOF

(71) Applicant: SAMSUNG ELECTRONICS CO., LTD., Suwon-si (KR)

(72) Inventors: Hoon Choi, Yongin-si (KR); Ho-woong Kang, Yongin-si (KR); Jin-sung Kang, Hwaseong-si (KR); Kwang-youn Kim, Suwon-si (KR); Young-dae Kim, Suwon-si (KR); Jae-hyun Jeong, Anyang-si (KR); Chang-joo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/678,612

(22) Filed: Nov. 16, 2012

(65) Prior Publication Data

US 2013/0169625 A1  Jul. 4, 2013

(30) Foreign Application Priority Data

Dec. 28, 2011  (KR) .................. 10-2011-0144323
Dec. 30, 2011  (KR) .................. 10-2011-0147339
Jan. 27, 2012  (KR) .................. 10-2012-0008390
Jan. 31, 2012  (KR) .................. 10-2012-0009456
Jan. 31, 2012  (KR) .................. 10-2012-0009878
Jul. 3, 2012   (KR) .................. 10-2012-0072082

(51) Int. Cl.
*G06T 15/00* (2011.01)
*G06T 1/20* (2006.01)
(Continued)

(52) U.S. Cl.
CPC ... *G06T 1/20* (2013.01); *G06F 1/00* (2013.01); *G06T 15/00* (2013.01); *G09G 3/003* (2013.01);
(Continued)

(58) Field of Classification Search
CPC .... G06F 3/0484; G06F 3/04842; G06F 17/24
USPC .................................. 345/418, 419, 502, 520
See application file for complete search history.

(56) References Cited

U.S. PATENT DOCUMENTS 5,663,830 A  9/1997  Ji et al.
6,154,633 A  11/2000  Landgraf et al.
(Continued)

FOREIGN PATENT DOCUMENTS

CN  1252615 C  4/2006
DE  197 57 493 A1  7/1998
(Continued)

OTHER PUBLICATIONS

International Search Report for PCT/KR2012/009264, dated Jan. 29, 2013.
(Continued)

*Primary Examiner* — Ke Xiao
*Assistant Examiner* — Kim-Thanh T Tran
(74) *Attorney, Agent, or Firm* — Sughrue Mion, PLLC

(57) ABSTRACT

An image processing apparatus, upgrade apparatus, display system and control method are provided. The image processing apparatus includes a signal input unit; a first image processing unit which processes an input signal input by the signal input unit to output a first output signal; an upgrade apparatus connection unit connected to an upgrade apparatus which includes a second image processing unit; and a first controller which controls at least one of the input signal processed by the first image processing unit and the first output signal to be transmitted to the upgrade apparatus and processed by the second image processing unit if the upgrade apparatus is connected to the upgrade apparatus connection unit.

71 Claims, 43 Drawing Sheets

(51) Int. Cl.
| | |
|---|---|
| *H04N 5/44* | (2011.01) |
| *H04N 13/00* | (2006.01) |
| *G09G 3/00* | (2006.01) |
| *H04N 21/418* | (2011.01) |
| *G06F 1/00* | (2006.01) |
| *G09G 5/00* | (2006.01) |

(52) U.S. Cl.
CPC .................. *G09G 5/00* (2013.01); *G09G 5/003* (2013.01); *H04N 5/44* (2013.01); *H04N 13/0003* (2013.01); *H04N 21/4183* (2013.01); *G09G 2360/06* (2013.01); *H04N 2213/001* (2013.01)

(56) References Cited

U.S. PATENT DOCUMENTS

| | | |
|---|---|---|
| 6,278,499 B1 | 8/2001 | Darbee et al. |
| 7,078,609 B2 | 7/2006 | Georges |
| 7,096,461 B1 | 8/2006 | Nakamura et al. |
| 7,827,581 B1 | 11/2010 | Eiger et al. |
| 7,844,991 B1 | 11/2010 | Nakamura et al. |
| 7,966,637 B2 | 6/2011 | Boyden et al. |
| 8,023,045 B2 | 9/2011 | Kondo |
| 8,959,536 B2 | 2/2015 | Paul et al. |
| 2003/0233667 A1 | 12/2003 | Umipig et al. |
| 2004/0031060 A1 | 2/2004 | Kondo |
| 2005/0100313 A1 | 5/2005 | Wang |
| 2005/0163210 A1 | 7/2005 | Gupta et al. |
| 2005/0177743 A1 | 8/2005 | Barber et al. |
| 2005/0195975 A1 | 9/2005 | Kawakita |
| 2005/0237327 A1 | 10/2005 | Rubinstein et al. |
| 2005/0266924 A1 | 12/2005 | Horikoshi |
| 2006/0092323 A1 | 5/2006 | Feeler et al. |
| 2006/0203004 A1* | 9/2006 | Hwang et al. ................. 345/593 |
| 2006/0284875 A1* | 12/2006 | Jeon .............................. 345/520 |
| 2007/0101393 A1* | 5/2007 | Ito ................................. 725/132 |
| 2007/0118683 A1 | 5/2007 | Yang et al. |
| 2007/0174418 A1 | 7/2007 | Garcia, Jr. et al. |
| 2007/0222896 A1* | 9/2007 | Oikawa ......................... 348/725 |
| 2007/0250872 A1 | 10/2007 | Dua |
| 2007/0296552 A1 | 12/2007 | Huang |
| 2008/0303946 A1 | 12/2008 | Cox et al. |
| 2009/0136242 A1* | 5/2009 | Okamoto et al. ............... 399/13 |
| 2009/0147146 A1 | 6/2009 | Lee et al. |
| 2009/0207839 A1 | 8/2009 | Cedervall et al. |
| 2009/0245861 A1* | 10/2009 | Eom .............................. 399/119 |
| 2010/0011404 A1 | 1/2010 | Douillet et al. |
| 2010/0057968 A1 | 3/2010 | Dawson et al. |
| 2010/0070748 A1 | 3/2010 | Duan et al. |
| 2010/0095291 A1 | 4/2010 | Kota et al. |
| 2010/0149120 A1* | 6/2010 | Lee et al. ...................... 345/173 |
| 2010/0186007 A1* | 7/2010 | Jeong ............................ 717/170 |
| 2010/0231724 A1 | 9/2010 | Milne et al. |
| 2010/0235875 A1 | 9/2010 | Cedervall et al. |
| 2011/0055747 A1 | 3/2011 | Hua et al. |
| 2011/0128437 A1 | 6/2011 | Lee et al. |
| 2011/0248991 A1* | 10/2011 | Park et al. ..................... 345/419 |
| 2011/0249864 A1 | 10/2011 | Venkatesan et al. |
| 2011/0249867 A1 | 10/2011 | Haas et al. |
| 2011/0249873 A1 | 10/2011 | Nakada et al. |
| 2011/0249896 A1 | 10/2011 | Haikin |
| 2011/0249910 A1 | 10/2011 | Henderson et al. |
| 2011/0249952 A1 | 10/2011 | Taniguchi |
| 2011/0250015 A1 | 10/2011 | Cardoso |
| 2011/0250148 A1 | 10/2011 | Mateu et al. |
| 2011/0250151 A1 | 10/2011 | Mateu et al. |
| 2011/0250293 A1 | 10/2011 | Blomberg |
| 2011/0250318 A1 | 10/2011 | Innocenzi |
| 2011/0250334 A1 | 10/2011 | Caridis |
| 2011/0250338 A1 | 10/2011 | Ramaswamy et al. |
| 2011/0250351 A1 | 10/2011 | Steenhoek |
| 2011/0250356 A1 | 10/2011 | Tavone et al. |
| 2011/0250365 A1 | 10/2011 | Florek et al. |
| 2011/0250391 A1 | 10/2011 | Dorchester |
| 2011/0250400 A1 | 10/2011 | Lee et al. |
| 2011/0250405 A1 | 10/2011 | Sawatsky |
| 2011/0250412 A1 | 10/2011 | Johnson et al. |
| 2011/0250495 A1 | 10/2011 | Webber et al. |
| 2011/0250536 A1 | 10/2011 | Veregin et al. |
| 2011/0250545 A1 | 10/2011 | Williams et al. |
| 2011/0250565 A1 | 10/2011 | Yarovesky |
| 2011/0250627 A1 | 10/2011 | Yuan et al. |
| 2011/0251080 A1 | 10/2011 | Tuunanen et al. |
| 2011/0251096 A1 | 10/2011 | Southern |
| 2011/0251411 A1 | 10/2011 | Newbold et al. |
| 2011/0251423 A1 | 10/2011 | Binder et al. |
| 2011/0251454 A1 | 10/2011 | Robb et al. |
| 2011/0251474 A1 | 10/2011 | Chen et al. |
| 2011/0251488 A1 | 10/2011 | Gritzky |
| 2011/0251493 A1 | 10/2011 | Poh et al. |
| 2011/0251513 A1 | 10/2011 | Chetham et al. |
| 2011/0251706 A1 | 10/2011 | Sheu |
| 2011/0252256 A1 | 10/2011 | Morris |
| 2011/0252296 A1 | 10/2011 | Weiss |
| 2011/0252352 A1 | 10/2011 | Viola et al. |
| 2011/0273616 A1 | 11/2011 | Zhai et al. |
| 2012/0081374 A1 | 4/2012 | Sudo |
| 2012/0120054 A1 | 5/2012 | Sandrew et al. |
| 2012/0124615 A1* | 5/2012 | Lee ................................. 725/30 |
| 2012/0147015 A1* | 6/2012 | Rogers et al. .................. 345/502 |
| 2012/0287343 A1 | 11/2012 | Kelly et al. |
| 2013/0300754 A1* | 11/2013 | Everitt et al. .................. 345/522 |

FOREIGN PATENT DOCUMENTS

| | | |
|---|---|---|
| EP | 1 156 671 A2 | 11/2001 |
| EP | 2200279 A1 | 6/2010 |
| EP | 2 375 730 A1 | 10/2011 |
| JP | 8-161252 A | 6/1996 |
| JP | 200251069 A | 2/2002 |
| JP | 2003-198967 A | 7/2003 |
| JP | 2005-338605 A | 12/2005 |
| JP | 200639848 A | 2/2006 |
| JP | 2011-223543 A | 11/2011 |
| KR | 10-0744185 A | 8/2007 |
| KR | 10-0772284 B1 | 11/2007 |
| KR | 10-2008-0065790 A | 7/2008 |
| KR | 10-2010-0045971 A | 5/2010 |
| WO | 99/21309 A1 | 4/1999 |
| WO | 01/37555 A1 | 5/2001 |
| WO | 2011/098936 A2 | 8/2011 |

OTHER PUBLICATIONS

Communication dated Mar. 15, 2013 from the Korean Intellectual Property Office in a counterpart application No. 10-2012-0072082.
Communication dated May 21, 2013 from the Korean Intellectual Property Office in a counterpart application No. 10-2012-0072082.
Communication from the European Patent Office issued Jun. 3, 2013 in counterpart European Application No. 12199533.6.
USPTO Office Action dated Jun. 20, 2013 issued in co-pending U.S. Appl. No. 13/856,327.
Communication dated Nov. 22, 2013 issued by the United States Patent and Trademark Office in counterpart U.S. Appl. No. 13/856,327.
Communication, dated Mar. 4, 2014, issued by the Japanese Patent Office in counterpart Japanese Application No. 2012-278439.
Communication, dated Apr. 3, 2014, issued by the German Patent Office in counterpart German Application No. G84942UW900ams.
Communication, dated Mar. 20, 2014, issued by the U.S. Patent and Trademark Office in counterpart U.S. Appl. No. 13/856,327.
Communication dated Jul. 25, 2014 issued by United States Patent and Trademark Office in counterpart U.S. Appl. No. 13/856,327.
Communication dated Aug. 4, 2014 issued by the State Intellectual Property Office of the People's Republic of China in counterpart Chinese application No. 201210560970.8.
Communication dated May 5, 2015, issued by the State Intellectual Property Office of the People's Republic of China in counterpart Chinese Application No. 201210560970.8.

(56) References Cited

OTHER PUBLICATIONS

Communication dated May 28, 2015, issued by the United States Patent and Trademark Office in counterpart U.S. Appl. No. 13/856,327.
Communication dated Nov. 4, 2014, issued by the Japanese Intellectual Property Office in counterpart Japanese Application No. 2012-278439.
Communication dated Dec. 2, 2014, issued by the European Patent Office in counterpart European Application No. 12199533.6.
Communication dated Nov. 18, 2014, issued by the United States Patent and Trademark Office in counterpart U.S. Appl. No. 13/856,327.
Communication issued on Sep. 21, 2015 by the European Patent Office in related Application No. 12199533.6.
Non Final Office Action issued on Sep. 25, 2015 by the United States Patent and Trademark Office in counterpart U.S. Appl. No. 13/856,327.
Communication dated Feb. 17, 2016, issued by the United States Patent and Trademark Office in counterpart U.S. Appl. No. 13/856,327.
Communication dated Feb. 23, 2016, issued by the Japanese Patent Office in counterpart Japanese Application No. 2012-278439.
Communication dated Mar. 30, 2016, issued by the European Patent Office in counterpart European Application No. 12199533.6.

* cited by examiner

FIG. 24
DISPLAY APPARATUS    UPGRADE APPARATUS
(a) 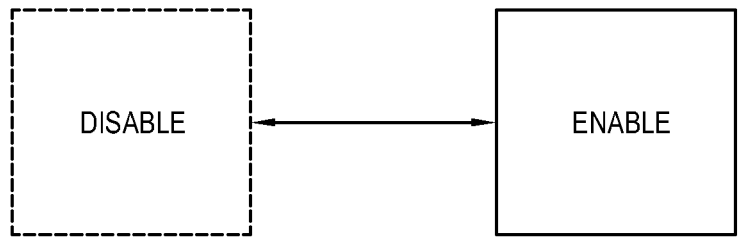
(b) 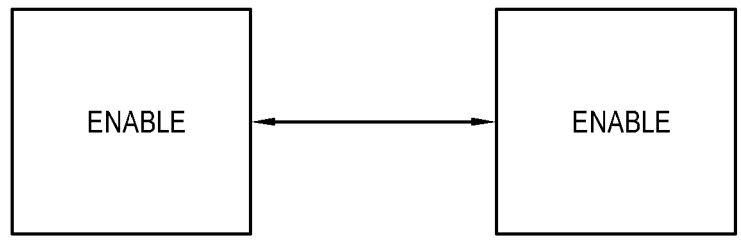
(c) 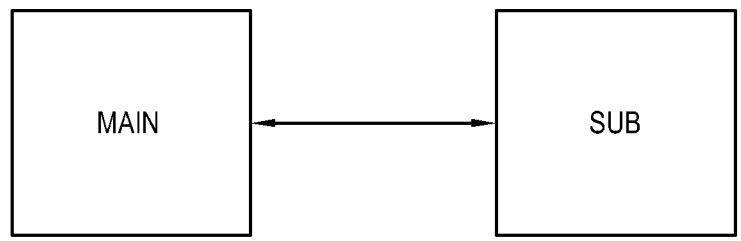
(d) 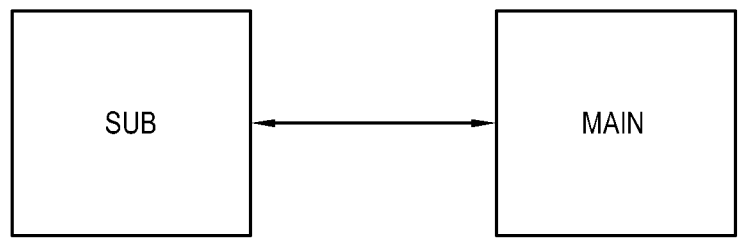

IMAGE PROCESSING APPARATUS, UPGRADE APPARATUS, DISPLAY SYSTEM INCLUDING THE SAME, AND CONTROL METHOD THEREOF

CROSS-REFERENCE TO RELATED APPLICATIONS

This application claims priority from Korean Patent Application No. 10-2011-0144323, filed on Dec. 28, 2011, Korean Patent Application No. 10-2011-0147339, filed on Dec. 30, 2011, Korean Patent Application No. 10-2012-0009878, filed on Jan. 31, 2012, Korean Patent Application No. 10-2012-0008390, filed on Jan. 27, 2012, Korean Patent Application No. 10-2012-0009456, filed on Jan. 31, 2012, and Korean Patent Application No. 10-2012-0072082, filed on Jul. 3, 2012 in the Korean Intellectual Property Office, the disclosures of which are incorporated herein by reference in their entirety.

BACKGROUND

1. Field

Apparatuses and methods consistent with the exemplary embodiments relate to an image processing apparatus, an upgrade apparatus, a display system including the same and a control method thereof, and more particularly to an image processing apparatus which is connected to an upgrade apparatus to upgrade a function thereof, an upgrade apparatus, a display system including the same and a control method thereof.

2. Description of the Related Art

An image processing apparatus is a device which processes image signals or image data transmitted from various external image sources and which are autonomously stored. The image processing apparatus may be configured to display a processed image on its display panel, such as a TV or a monitor. For example, a TV processes a broadcast signal transmitted from outside of the TV according to various types of image processing, e.g., decoding and scaling, and displays an image of a user desired broadcast channel on a display panel.

The image processing apparatus has an embedded image processing board configured as a circuit, including various kinds of chip sets, and a memory to conduct such image processing.

However, with technology development and diverse demands of users, an image processing apparatus having advanced capability is increasingly required and the functionalities of the image processing apparatus have increased.

Further, it is not cost efficient or an efficient use of resources to require a user to purchase a new image processing apparatus in order for the user to utilize a newly added function or an updated function.

Thus, there is a demand for an image processing apparatus which can be upgraded by easily adding or extending a new functionality or updated function.

Also, when upgrading functions or specifications in an upgrade apparatus, it is also necessary to upgrade or change firmware with respect to subsidiary modules already included in the image processing apparatus.

Further, due to physical limitations, an image processing apparatus which has a 2D image processing function cannot reproduce 3D content and can only play the content as 2D images. In order for the image processing apparatus which has the 2D image processing function to reproduce 3D contents a 3D images, the whole or at least part of the image processing board embedded in the image processing apparatus must be physically replaced, which is not easy in terms of manufacture and use. Also, a user may need to purchase a new image processing apparatus with a 3D image processing function.

SUMMARY

Aspects of exemplary embodiments provide an image processing apparatus which can be upgraded easily by adding or extending a new or upgraded function to the upgradable image processing apparatus, an upgrade apparatus, a display system including the same, and a control method thereof.

Further, aspects of exemplary embodiments provide an image processing apparatus which is capable of upgrading firmware driving subsidiary modules already included in the image processing apparatus suitably for upgraded functions or specifications provided by an upgrade apparatus, an upgrade apparatus, a display system including the same, and a control method thereof.

In addition, aspects of exemplary embodiments provide an image processing apparatus which can be upgraded easily by adding a 3D image processing function to a 2D image processing function or extending a 2D image processing function to a 3D image processing function, an upgrade apparatus, a display system including the same, and a control method thereof.

The foregoing and/or other aspects may be achieved by providing an image processing apparatus including: a signal input unit; a first image processing unit which processes an input signal input by the signal input unit to output a first output signal; an upgrade apparatus connection unit connected to an upgrade apparatus including a second image processing unit; and a first controller which controls at least one of the input signal processed by the first image processing unit and the first output signal to be transmitted to the upgrade apparatus and processed by the second image processing unit if the upgrade apparatus is connected to the upgrade apparatus connection unit.

The image processing apparatus may further include a display unit which displays at least one of a first image corresponding to the first output signal output by the first image processing unit and a second image corresponding to a second output signal processed and output by the second image processing unit of the upgrade apparatus.

The upgrade apparatus connection unit may transmit the first output signal to the display unit if the upgrade apparatus is not inserted into the upgrade apparatus connection unit, and transmit the second output signal output from the second image processing unit to the display apparatus if the upgrade apparatus is inserted into the upgrade apparatus connection unit.

The upgrade apparatus connection unit may include a first input signal terminal to which the first output signal is input; and a display unit output terminal selectively brought in contact with at least one of the first input signal terminal and a body connection unit of the upgrade apparatus based on whether the upgrade apparatus is connected, to output one of the first output signal and the second output signal to the display unit.

The image processing apparatus may further include an elastic member which elastically biases at least one of the first input signal terminal and the display unit output terminal so that the first input signal terminal and the display unit output terminal are brought in contact if the upgrade apparatus is not connected to the upgrade apparatus connection unit.

The image processing apparatus may further include a signal connection member inserted into the upgrade apparatus connection unit so that the first output signal is transmitted to the display unit if the upgrade apparatus is not connected to the upgrade apparatus connection unit.

The image processing apparatus may further include a data selection unit which selects and outputs one of the first output signal output from the first image processing unit and the second output signal output from the upgrade apparatus connection unit to the display unit according to control of the first controller; and a data distribution unit which distributes the first output signal to the upgrade apparatus connection unit and the data selection unit according to control of the first controller.

The first controller may control the data distribution unit and the data selection unit to output the first output signal output from the first image processing unit to the display unit if the upgrade apparatus is not connected.

The first controller may control the data distribution unit and the data selection unit to distribute the first output signal output from the first image processing unit to the upgrade apparatus connection unit and to output the second output signal output by the upgrade apparatus to the display unit if the upgrade apparatus is connected.

The image processing apparatus may further include an image signal switch which selectively transmits the first output signal output from the first image processing unit to the display unit, wherein the first image processing unit may output the first output signal to the upgrade apparatus connection unit and the image signal switch, and the first controller controls the image signal switch to transmit the first output signal output by the first image processing unit to the display unit if the upgrade apparatus is not connected, and to transmit the second output signal processed by the upgrade apparatus to the display unit if the upgrade apparatus is connected.

The image signal switch may include a low voltage differential signaling (LVDS) switch.

The first image processing unit may include a first output port which outputs the first output signal to the upgrade apparatus connection unit; and a second output port which outputs the first output signal to the image signal switch.

The first output signal may include at least one of a first image signal and a first audio signal, and the upgrade apparatus connection unit may include a first connection unit transmitting at least one of the input signal and the first image signal to the upgrade apparatus; and a second connection unit which transmits or receives at least one of a control signal and the first audio signal to or from the upgrade apparatus.

The first output signal may include at least one of a first image signal and a first audio signal, and the image processing apparatus may further include an audio output unit which outputs any one of the first audio signal and a second audio signal processed by the second image processing unit of the upgrade apparatus.

The image processing apparatus may further include at least one of a wireless user input unit which receives input wirelessly from a user, a wireless communication unit to access an Internet network and a camera unit to take an image; and a control path conversion switch which selects the first controller or the upgrade apparatus to control at least one of the wireless user input unit, the wireless communication unit and the camera unit based on whether the upgrade apparatus is connected.

The first controller may control the wireless user input unit, the wireless communication unit and the camera unit if the upgrade apparatus is not connected to the upgrade apparatus connection unit, and does not control at least one of the wireless user input unit, the wireless communication unit and the camera unit if the upgrade apparatus is connected to the upgrade apparatus connection unit.

The upgrade apparatus may control at least one of the wireless user input unit, the wireless communication unit and the camera unit through the control path conversion switch if the upgrade apparatus is connected to the upgrade apparatus connection unit.

The first controller may perform control to receive information about at least one upgraded function provided by the upgrade apparatus and performs control to perform the upgraded function based on the information about the upgraded function.

The first controller may assign a control to the upgrade apparatus, and the first image processing unit may perform image processing on the input signal based on control by the upgrade apparatus.

The first controller may perform control to receive an external input signal input through the upgrade apparatus and performs control to display an image based on the received external input signal.

The first controller may control the first output signal processed by the first image processing unit to be transmitted to the upgrade apparatus and outputted to outside of the image processing apparatus.

The image processing apparatus may further include at least one subsidiary module each accommodating firmware, wherein the first controller may upgrade the firmware of the at least one subsidiary module based on corresponding upgraded firmware received from the upgrade apparatus.

The first controller may upgrade the firmware according to control by the upgrade apparatus.

The first controller may back up each firmware accommodated in the at least one subsidiary module in the upgrade apparatus.

The image processing apparatus may further include a user input unit to input a user selection, wherein the first controller may upgrade the firmware based on the user selection.

The image processing apparatus may further include a storage unit which stores extended display identification data (EDID), and wherein the first controller may upgrade the EDID based on upgraded EDID information received from the upgrade apparatus.

The first controller may control each of a plurality of image processing processes to process the image signal to be selectively performed by one of the first image processing unit and the second image processing unit.

The first image processing unit may include a plurality of first blocks processing at least part of the plurality of image processing process, and the second image processing unit may include a plurality of second blocks corresponding to the first blocks, respectively, and processing at least part of the plurality of image processing processes.

The image processing apparatus may further include a plurality of switching units respectively connected to the first blocks and the second blocks and which is switched to transmit a signal to one of the plurality of first blocks and the plurality of second blocks.

The image processing apparatus may further include a user input unit to input a user selection, wherein the first controller may control each of the plurality image processing processes to be selectively performed by one of the first image processing unit and the second image processing unit based on the user selection.

The first controller may control the upgrade apparatus connection unit to receive a three-dimensional (3D) image signal, converted from the first output signal, from the upgrade apparatus.

The upgrade apparatus may be detachably coupled to one of a timing controller, a display panel and an image processing board of the image processing apparatus.

The upgrade apparatus may be connected to a spare connector provided in the timing controller.

The upgrade apparatus may be connected to slots of the image processing board and the display panel in combination with the timing controller.

The foregoing and/or other aspects may be achieved by providing an upgrade apparatus mounted on an image processing apparatus including a first image processing unit and a first controller, the upgrade apparatus including: a body connection unit which is connected to the image processing apparatus; a second image processing unit which receives and processes a signal output from the image processing apparatus through the body connection unit; and a second controller which controls the second image processing unit.

The upgrade apparatus may further include a display connection unit connected to a display unit is connected in order to transmit the signal processed by the second image processing unit to the display unit.

The body connection unit may include a first body connection unit which receives a first image signal processed by the first image processing unit of the image processing apparatus; and a second body connection unit which receives one of a first audio signal processed by the first image processing unit and a control signal transmitted by the first controller.

The second controller may control at least one of the first controller and the first image processing unit.

The second controller may perform control to transmit information about at least one upgraded function provided to the image processing apparatus to the image processing apparatus and to perform the upgraded function.

The second controller may be assigned control by the image processing apparatus and performs control to process the signal output from the image processing apparatus.

The upgrade apparatus may further include a signal input unit to input an external input signal, wherein the second controller transmits the external input signal to the image processing apparatus and controls the image processing apparatus to display an image based on the transmitted external input signal.

The upgrade apparatus may further include a signal output unit, wherein the second controller may perform control to receive the signal output from the image processing apparatus and to output the signal to outside of the upgrade apparatus through the signal output unit.

The upgrade apparatus may further include a storage unit storing upgraded firmware corresponding to a subsidiary module of the image processing apparatus, wherein the second controller may include a controller which performs control to upgrade firmware of the at least one subsidiary module based on the upgraded firmware.

The second controller may back up the firmware of the at least one subsidiary module.

The second controller may perform control to upgrade the firmware of the at least one subsidiary module based on a user selection input through the image processing apparatus.

The second controller may perform control to upgrade the firmware of the at least one subsidiary module based on extended display identification data (EDID) received from the image processing apparatus.

The second controller may control the second image processing unit to generate a three-dimensional (3D) image signal by converting the signal output from the image processing apparatus and controls the connection unit to transmit the 3D image signal to the image processing apparatus.

The upgrade apparatus may further include a communication unit communicating with a pair of 3D glasses, wherein the second controller may perform synchronization of the 3D image signal based on a signal transmitted from the 3D glasses.

The foregoing and/or other aspects may be achieved by providing a control method of an image processing apparatus on which an upgrade apparatus is mounted, the control method including: processing an input signal to output an output signal; transmitting at least one of the input signal and the output signal to the upgrade apparatus if the upgrade apparatus is connected to the image processing apparatus; receiving an image signal based on at least one of the input signal and the output signal from the upgrade apparatus; and processing the image signal to be displayed as an image.

The control method may further include receiving information about at least one upgraded function provided by the upgrade apparatus, and wherein the processing the image signal may include performing the upgraded function based on the information about the upgraded function.

The control method may further include receiving upgraded firmware from the upgrade apparatus; and upgrading firmware of at least one subsidiary module included in the image processing apparatus based on the received upgraded firmware.

Each of a plurality of image processing processes to process the image signal may be performed selectively by one of the image processing apparatus and the upgrade apparatus.

The receiving may include receiving a three-dimensional (3D) image signal, converted from at least one of the input signal and the output signal, from the upgrade apparatus.

The foregoing and/or other aspects may be achieved by providing a control method of an upgrade apparatus mounted on an image processing apparatus, the control method including: receiving a first image signal processed from the image processing apparatus if the upgrade apparatus is connected to the image processing apparatus; processing at least one upgraded function of the image processing apparatus on the first image signal; and transmitting a second image signal, obtained by processing the at least one upgraded function, to the image processing apparatus.

The control method may further include transmitting information about the at least one upgraded function provided to the image processing apparatus.

The control method may further include transmitting, to the upgrade apparatus, upgraded firmware to upgrade firmware of at least one subsidiary module included in the image processing apparatus.

The processing may include generating a three-dimensional (3D) image signal by converting the first image signal received from the image processing apparatus, and wherein the transmitting may include transmitting the 3D image signal to the image processing apparatus.

The foregoing and/or other aspects may be achieved by providing a display system including an image processing apparatus and an upgrade apparatus mounted on the image processing apparatus, wherein the image processing apparatus may include a first image processing unit which processes a first input signal to output a first output signal, a first controller which controls the first image processing unit and an upgrade apparatus connection unit to which the upgrade apparatus is connected, the upgrade apparatus may include a second image processing unit which processes a second input signal to output a second output signal, a second controller which controls the second image processing unit and a body connection unit connected to the upgrade apparatus connection unit, and at least one of the first input signal processed by the first image processing unit and the first output signal may be transmitted to the upgrade apparatus and processed by the second image processing unit if the upgrade apparatus is connected to the upgrade apparatus connection unit.

The upgrade apparatus may transmit information about at least one upgraded function provided to the image processing apparatus to the image processing apparatus, and the image processing apparatus may perform the upgraded function based on the information about the upgraded function.

The image processing apparatus may include at least one subsidiary module each accommodating firmware, wherein the upgrade apparatus may include a storage unit which stores upgraded firmware corresponding to the at least one subsidiary module, and the image processing apparatus may upgrade the firmware of at least one subsidiary module based on corresponding upgraded firmware received from the upgrade apparatus.

Each of a plurality of image processing processes to process the image signal may be performed selectively by one of the image processing apparatus and the upgrade apparatus.

The upgrade apparatus may convert at least one of the first input signal and the first output signal output from the image processing apparatus into a three-dimensional (3D) image signal and transmit the 3D image signal to the image processing apparatus, and the image processing apparatus may display a 3D image based on the 3D image signal received from the upgrade apparatus.

As described above, one or more exemplary embodiments may provide an image processing apparatus upgraded by easily adding or extending a new or upgraded function to the upgradable image processing apparatus, an upgrade apparatus, a display system including the same, and a control method thereof.

Further, one or more exemplary embodiments may provide an image processing apparatus which is capable of upgrading firmware driving subsidiary modules already included in the image processing apparatus suitably for upgraded functions or specifications provided by an upgrade apparatus, an upgrade apparatus, a display system including the same, and a control method thereof.

According to one or more exemplary embodiments, an upgrade apparatus is mounted on an image processing apparatus, thereby performing an enhanced image processing process.

According to one or more exemplary embodiments, an image processing apparatus processing a 2D image is combined with an image processing apparatus processing a 3D image, thereby conveniently upgrading the image processing apparatus to achieve 3D display and to reproduce 3D contents.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 24 illustrates control operations of a display apparatus and an upgrade apparatus according to an exemplary embodiment;

DETAILED DESCRIPTION OF EXEMPLARY EMBODIMENTS

Hereinafter, an image processing apparatus, an upgrade apparatus, a display system, and a control method thereof according to exemplary embodiments will be described in detail with reference to accompanying drawings.

In the exemplary embodiments, an "image processing apparatus" refers to a display device which processes an image signal and may include a display unit to display an image based on an image signal internally or output a processed image signal to an external display apparatus without including a display unit internally. The image processing apparatus according to the exemplary embodiments include both types. A display device which processes an image signal and includes a display unit to display an image based on an image signal is also referred to as a "display apparatus" hereinafter.

Figure 1:
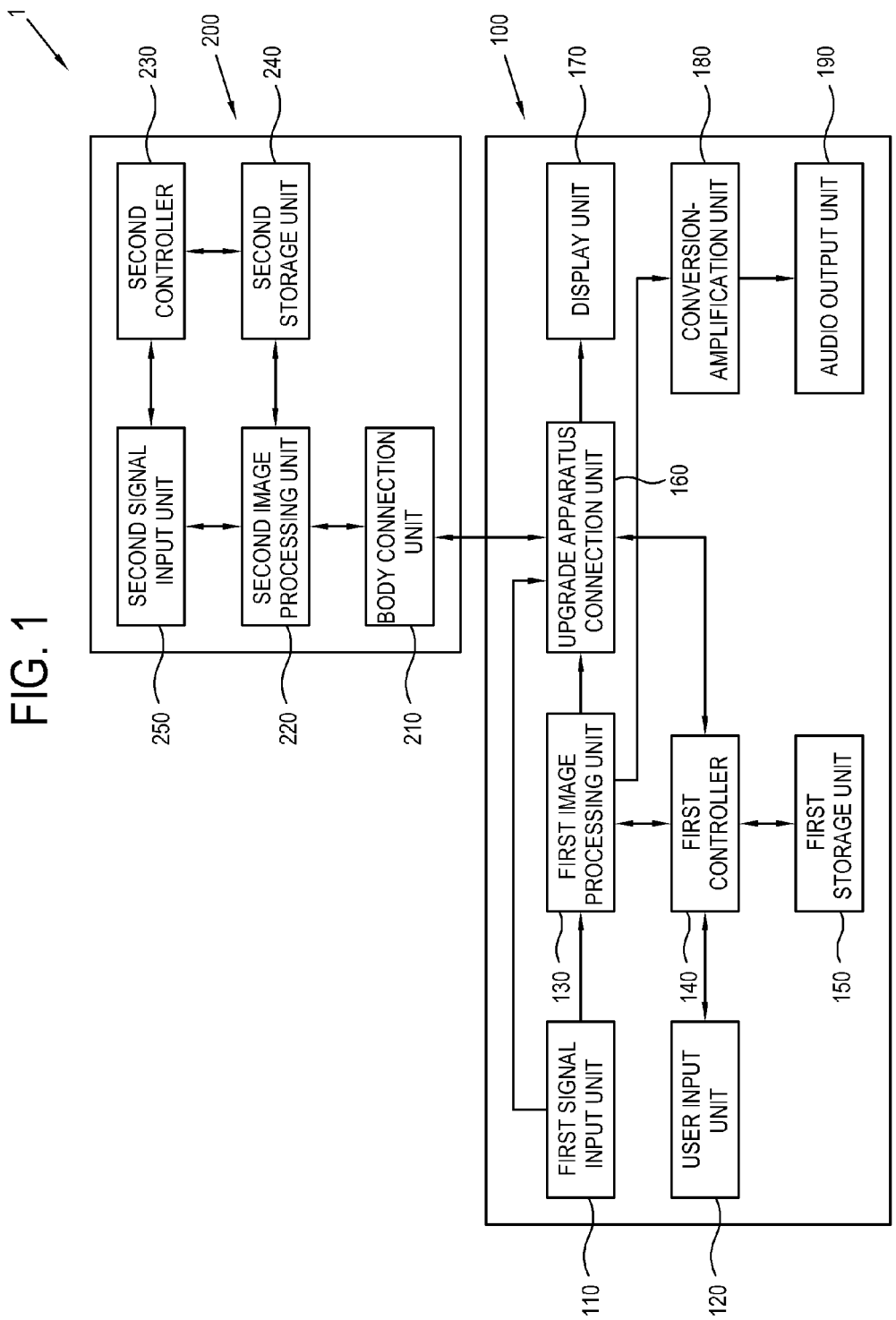
FIG. 1 is a block diagram of a display system according to an exemplary embodiment.

Referring to FIG. 1, a display system 1 according to an exemplary embodiment includes an image processing apparatus 100 processing an image signal provided from an external image source (not shown) according to a preset image processing process to display an image and an upgrade apparatus 200 upgrading hardware or software of the image processing apparatus 100.

In the display system 1 according to the exemplary embodiment, the image processing apparatus 100 is configured as a TV which displays a broadcast image based on a broadcast signal, broadcast information or broadcast data received from a transmitter of a broadcasting station. The image processing apparatus 100 may be configured as various types of devices which process an image or process and display an image, without being limited to a TV. For example, the image processing apparatus 100 may be a set-top box which performs image processing only and does not display an image.

The image processing apparatus 100 may display any type of image, without being limited to a broadcast image. For example, the image processing apparatus 100 may display images, such as videos, still images, applications, an on-screen display (OSD) based on signals or data received from various types of image sources (not shown), and a graphic user interface (GUI) for controlling various operations.

The upgrade apparatus 200 is connected to the image processing apparatus 100 so as to communicate with the image processing apparatus 100. The upgrade apparatus 200 upgrades existing hardware or software of the connected image processing apparatus 100 and enables an image signal to be processed by the upgraded hardware or software of the image processing apparatus 100, thereby displaying an image with improved quality.

As shown in FIG. 1, the image processing apparatus 100 includes a first signal input unit 110 receiving an image signal from at least one image source (not shown), a first image processing unit 130 processing the input signal from the first signal input unit 110 and outputting a first output signal, an upgrade apparatus connection unit 160 to which the upgrade apparatus 200 including a second image processing unit 220 is connected, and a first controller 140 controlling the first image processing unit 130.

The first signal input unit 110 transmits an image signal and/or a broadcast signal received from at least one image source to the first image processing unit 130. The first signal input unit 110 may include a tuner to receive a broadcast signal.

An image signal received through the first signal input unit 110 may have various standards depending on an image source and a display mode of and a display unit 170. For example, the first signal input unit 110 may receive signals or data in accordance with a high definition multimedia interface (HDMI), a universal serial bus (USB), and component standards and include a plurality of connection terminals (not shown) corresponding to the respective standards. Various types of external devices including the image source may be connected to the connection terminals, thus receiving an image signal through the first signal input unit 110.

When the upgrade apparatus 200 is connected to the upgrade apparatus connection unit 160, the first signal input unit 110 may be configured to transmit the input signal to the upgrade apparatus connection unit 160, and not to the first image processing unit 130 according to control of the controller 140. That is, the first signal input unit 110 may include a plurality of output ports to receive and output the input signal and thus selectively transmit the input signal to either the upgrade apparatus 200 or the first image processing unit 130 according to control of the controller 140. The first signal input unit 110 may be configured to provide the input signal only to the first image processing unit 130.

The first image processing unit 130 may include a demultiplexer (not shown), which performs demultiplexing by separating a broadcast signal received from the first signal input unit 110 into an image signal, an audio signal and optional data, a decoder (not shown) decoding the separated image signal into a predetermined image format, and a scaler (not shown) scaling the decoded image signal to a predetermined resolution to display an image based on the image signal on the display unit 170.

Further, the first image processing unit 130 may perform various preset image processing processes on an image signal received from the first signal input unit 110. The first image processing unit 130 outputs a processed image signal to the display unit 170, so that an image based on the image signal is displayed on the display unit 170.

The first image processing unit 130 may perform any type of image processing, without being limited to, for example, demultiplexing to separate a signal into characteristic signals, decoding in accordance with an image format of an image signal, de-interlacing to convert an interlaced image signal into a progressive form, scaling to adjust an image signal to a preset resolution, noise reduction to improve image quality, detail enhancement, frame refresh rate conversion, or the like.

The first image processing unit 130 may be provided as an image processing board (not shown) in which a circuit system including various chip sets (not shown), a memory (not shown), electronic components (not shown) and wiring (not shown) to conduct such processes is mounted on a printed circuit board (PCB, not shown).

Meanwhile, the upgrade apparatus connection unit 160 is connected to a body connection unit 210 of the upgrade apparatus 200 so that the image processing apparatus 100 and the upgrade apparatus 200 communicate at least one of data, a signal, information and power with each other.

The upgrade apparatus connection unit 160 may transmit at least one of the input signal input through the first signal input unit 110 and the first output signal output by the first image processing unit 130 to the body connection unit 210.

Here, the first output signal may include at least one of a first image signal and a first audio signal.

The upgrade apparatus connection unit 160 may be configured as a connection port in accordance with a general standard, such as an HDMI, USB or component port. As necessary, the upgrade apparatus connection unit 160 may be configured to communicate data, a signal, information/, or power in accordance with a low voltage differential signaling (LVDS) standard.

The upgrade apparatus connection unit 160 may be provided in any type and form, without being limited to the foregoing examples, as long as it is configured to enable the image processing apparatus 100 and the upgrade apparatus 200 to communicate at least one of data, a signal, information, and power with each other.

When the upgrade apparatus 200 is not connected to the upgrade apparatus connection unit 160, the upgrade apparatus connection unit 160 transmits the first image signal output by the first image processing unit 130 to the display unit 170.

The upgrade apparatus connection unit 160 may receive a second output signal processed by the second image processing unit 220 through the body connection unit 210 of the upgrade apparatus 200 and transmit the received second output signal to the display unit 170.

As necessary, when the upgrade apparatus 200 is configured to output the second output signal directly to the display unit 170, and not via the image processing apparatus 100, the upgrade apparatus connection unit 160 does not receive the second output signal from the upgrade apparatus 200.

The upgrade apparatus connection unit 160 may enable communication of a control instruction between the first controller 140 and a second controller 230 of the upgrade apparatus 200. That is, the upgrade apparatus connection unit 160 may have a connection port for transmitting and receiving the control instruction.

Meanwhile, when the upgrade apparatus 200 is not connected to the upgrade apparatus connection unit 160, the first controller 140 controls the first image processing unit 130 to process the input signal.

When the upgrade apparatus 200 is connected to the upgrade apparatus connection unit 160, the first controller 140 controls the first signal input unit 110 and the first image processing unit 130 such that at least one of the input signal and the first output signal is transmitted to the upgrade apparatus 200 through the upgrade apparatus connection unit 160 and is processed by the second image processing unit 220.

The first controller 140 may detect whether the upgrade apparatus 200 is connected through the upgrade apparatus connection unit 160.

When the second output signal processed by the upgrade apparatus 200 is received by the upgrade apparatus connection unit 160 through the body connection unit 210, the first controller 140 may control the upgrade apparatus connection unit 160 to transmit the second output signal to the display unit 170.

The image processing apparatus 100 may further include the display unit 170 to display at least one of a first image corresponding to the first output signal and a second image corresponding to the second output signal processed and output by the second image processing unit 220 of the upgrade apparatus 200.

That is, when the upgrade apparatus 200 is not connected to the upgrade apparatus connection unit 160, the display unit 170 displays the first image corresponding to the first output signal output by the first image processing unit 130. When the upgrade apparatus 200 is connected to the upgrade apparatus connection unit 160, the display unit 170 displays the second image corresponding to the second output signal output by the second image processing unit 220.

The display unit 170 may be configured in various display modes using liquid crystals, plasma, light emitting diodes, organic light emitting diodes, a surface conduction electron emitter, a carbon nano-tube, nano-crystals, or the like, without being limited thereto.

The display unit 170 may further include an additional element depending on a display mode thereof. For example, in a display mode using liquid crystals, the display unit 170 may include a liquid crystal display (LCD) panel, a backlight unit (not shown) providing light to the panel, and a panel drive board (not shown) driving the panel.

Further, the image processing apparatus 100 may further include a conversion-amplification unit 180 converting an audio signal separated by the first image processing unit 130 into a preset format and amplifying the signal, and an audio output unit 190 outputting the amplified audio signal. Here, the audio output unit 190 may include a speaker.

Also, the image processing apparatus 100 may further include a user input unit 120 outputting a preset command according to manipulation by a user, and a first storage unit 150 storing unlimited data or information.

The user input unit 120 transmits various preset control commands or unlimited information to the first controller 140 based on a user's manipulation and input. The user input unit 120 may be provided as a menu key and an input panel installed on an outside of the image processing apparatus 100 or as a remote controller separate from the image processing apparatus 100.

The user input unit 120 may be configured to communicate with the image processing apparatus 100 using a short-range wireless communication method, such as Bluetooth or infrared communication. In this case, the user input unit 120 may include a wireless keyboard, a wireless mouse, or the like as well as the remote controller.

As necessary, the user input unit 120 may be configured as a single body with the display unit 170. That is, if the display unit 170 is a touch screen, a user may transmit a preset command to the first controller 140 through an input menu (not shown) displayed on the display unit 170.

The first storage unit 150 may store unlimited data according to control of the first controller 140. The first storage unit 150 may be configured as a non-volatile memory, such as a flash memory and a hard disk drive. The first storage unit 150 is accessible by the first controller 140, and the data stored in the first storage unit 150 may be read, recorded, revised, deleted, or updated by the first controller 140.

The first storage unit 150 may store, for example, an operating system to run the image processing apparatus 100 and various applications, image data, and optional data which are executable in the operating system.

The first controller 140 performs control operations over various components of the image processing apparatus 100. For example, the first controller 140 conducts image processing by the first image processing unit 130, transmission or reception operations of signals, information, or data through the first signal input unit 110, and a control operation corresponding to a command from the user input unit 120, thereby controlling the overall operation of the image processing apparatus 100.

The upgrade apparatus 200 may be connected to the image processing apparatus 100 via wire or wirelessly. In the exemplary embodiment, the upgrade apparatus 200 and the image processing apparatus 100 may be connected to each other via wire to transmit and receive data, information, signals, or power. As described above, the upgrade apparatus 200 includes the body connection unit 210 to transmit or receive power and data to or from the image processing apparatus 100, and the image processing apparatus 100 includes the upgrade apparatus connection unit 160 to transmit or receive power and data to or from the upgrade apparatus 200. That is, the upgrade apparatus 200 may receive power needed for driving from the image processing apparatus 100 through the body connection unit 210. When necessary, the upgrade apparatus 200 may further include a power conversion unit (not shown) to convert power input from the image processing apparatus 100 into power needed for driving.

The upgrade apparatus 200 may be supplied with driving power needed to operate from a separate external power source (commercial power source or battery) and not directly from the image processing apparatus 100 through the body connection unit 210

Further, unlike in FIG. 1, the upgrade apparatus 200 may be connected to the image processing apparatus 100 wirelessly if necessary. In this case, the upgrade apparatus 200 may be supplied with operation power from a separate external power source or battery, and not from the image processing apparatus 100.

Until the upgrade apparatus 200 is connected to the image processing apparatus 100, the image processing apparatus 100 autonomously processes an image signal received from outside of the image processing apparatus 100 according to a preset image processing process and displays an image based on the signal. However, when the upgrade apparatus 200 is connected to the image processing apparatus 100, hardware or software configurations of the display system 1 performing the above image processing process are upgraded. Accordingly, new functions or updated functions may be provided to a user due to the upgrade apparatus 200. For example, as the upgrade apparatus 200 is connected, there is provided an image with higher quality than that realized by the image processing apparatus 100 alone.

The upgrade apparatus 200 includes the body connection unit 210 connected to the image processing apparatus 100, the second image processing unit 220 receiving and processing a signal output from the image processing apparatus 100 through the body connection unit 210, and a second controller 230 controlling the second image processing unit 220.

When the second image processing unit 220 is configured to be controlled only by the first controller 140 of the image processing apparatus 100, the second controller 230 may be omitted as necessary.

The second image processing unit 220 processes any input signal of the first signal input unit 110 output from the image processing apparatus 100 and the first output signal output from the first image processing unit 130 and outputs the signal as a second output signal.

The second output signal output by the second image processing unit 220 is transmitted to the display unit 170 through the body connection unit 210 and the upgrade apparatus connection unit 160. Accordingly, a second image corresponding to the second output signal may be displayed on the display unit 170. Since the second image processing unit 220 additionally performs a function upgraded from a function of the first image processing unit 130 or a function which cannot be conducted by the first image processing unit 130, an upgraded image which is not realized by the image processing apparatus 100 or is hard to be realized by the image processing apparatus 100 is displayed on the display unit 170.

For example, a full HD image cannot be provided by the first image processing unit 130, but may be provided by the second image processing unit 220. Further, a 3D image cannot be realized by the first image processing unit 130, but may be presented through the second image processing unit 220. Such added and expanded functions are only illustrative examples and are not limited to these examples.

Here, the second image processing unit 220 may reprocess the audio signal as well as the image signal, and accordingly the reprocessed and upgraded audio signal may be provided to the image processing apparatus 100.

Meanwhile, the upgrade apparatus 200 may further include a second signal input unit 250 receiving a broadcast signal or an image signal from an image source and transmitting the signal to the second image processing unit 220.

In the foregoing exemplary embodiment, the broadcast signal or the image signal is received or input through the first signal input unit 110 of the image processing apparatus 100. However, if needed, the upgrade apparatus 200 may include the second signal input unit 250 to receive a broadcast signal or an image signal separately from the image processing apparatus 100. In this case, when it is detected that the upgrade apparatus 200 is connected to the upgrade apparatus connection unit 160, the first controller 140 of the image processing apparatus 100 may stop operations of the first signal input unit 110 and the first image processing unit 130. Here, an input signal (broadcast signal or image signal) input through the second signal input unit 250 is transmitted to the second image processing unit 220 and processed, and a second output signal output by the second image processing unit 220 may be transmitted to the display unit 170 through the upgrade apparatus connection unit 160 of the image processing apparatus 100. Accordingly, a second image corresponding to the second output signal may be displayed on the display unit 170.

In another exemplary embodiment, when the upgrade apparatus 200 independently receives a broadcast signal or an image signal through the second signal input unit 250, the first controller 140 may control the first image processing unit 130 to process a signal input through the first signal input unit 110 and output a first output signal to the display unit 170. Here, the display unit 170 may display a first image corresponding to the first output signal as a main screen or sub-screen. At the same time, when receiving the broadcast signal or image signal through the second signal input unit 250, the upgrade apparatus 200 processes the signal in the second image processing unit 220 and transmits a second output signal to the display unit 170. Accordingly, the display unit 170 may display a second image corresponding to the second output signal as a sub-screen or main screen in accordance with the first image. That is, the first input signal input through the first signal input unit 110 of the image processing apparatus 100 and the second input signal input through the second signal input unit 250 of the upgrade apparatus 200 are processed into the first image and the second image, respectively, which may be then displayed in picture in picture (PIP) on the display unit 170.

When it is detected that the upgrade apparatus 200 is connected, the first controller 140 of the image processing apparatus 100 may control the first image processing unit 130 and the first signal input unit 110 in cooperation with the second controller 230 of the upgrade apparatus 200. For example, the first controller 140 may be responsible for controlling part of the demultiplexer (not shown), the decoder (not shown) and the scaler (not shown) of the first image processing unit 130, and the second controller 230 may be responsible for controlling the rest thereof.

If necessary, the first controller 140 may have priority to control the first signal input unit 110 and the first image processing unit 130, and the second controller 230 may assist the first controller 140.

In another exemplary embodiment, the second controller 230 may have priority to control the first signal input unit 110 and the first image processing unit 130, and the first controller 140 may assist the second controller 230.

Meanwhile, when it is detected that the upgrade apparatus 200 is connected, the first controller 140 of the image processing apparatus 100 may entirely transfer the control function of the first controller 140 to the second controller 230. Here, the first controller 140 does not give a control instruction, but just delivers a control instruction between a subject controlled previously by the first controller 140 and the second controller 230. As necessary, an exclusive control communication line may be separately provided to transmit and receive a control instruction between the second controller 230 and the subject previously controlled by the first controller 140.

The upgrade apparatus 200 may further include a second storage unit 240. The second storage unit 240 stores unlimited data.

The second storage unit 240 may be configured as a nonvolatile memory, such as a flash memory and a hard disk drive. The second storage unit 240 is accessed by the first controller 140 or the second controller 230, and data stored in the storage unit 240 is read, recorded, revised, deleted, or updated by the controller 140 or controller 230. The first storage unit 150 may also be accessed by both the first controller 140 and the second controller 230 depending on a configuration thereof.

Further, the second storage unit 240 may store an operating system more recently upgraded than the operating system stored in the first storage unit 150. The first controller 140 or the second controller 230 may update the operating system stored in the first storage unit 150 to the upgraded operating system and drive the updated operating system. As necessary, the operating system of the second storage unit 240 may be driven instead of the operating system stored in the first storage unit 150.

Figure 2:
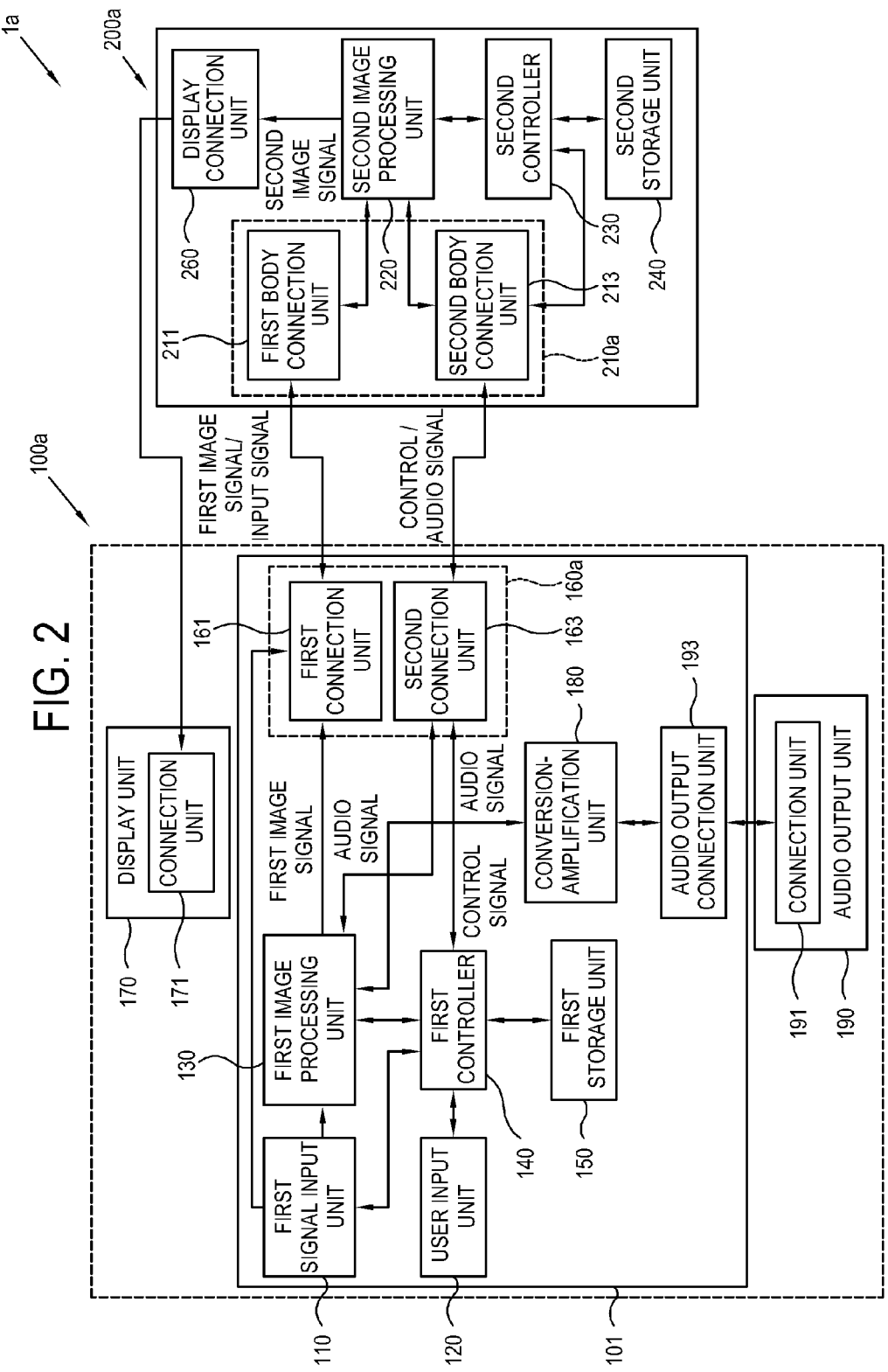
FIG. 2 is a block diagram of a display system according to an exemplary embodiment.

Referring to FIG. 2, a display system 1a according to an exemplary embodiment includes an image processing apparatus 100a and an upgrade apparatus 200a connectable to the image processing apparatus 100a. For reference, the same elements as those in the previous exemplary embodiment have the same numerals and descriptions thereof will be omitted.

The image processing apparatus 100a according to the present exemplary embodiment includes a first signal input unit 110 receiving a broadcast signal or an image signal from an image source (not shown) and selectively transmitting the signal to a first image processing unit 130 or an upgrade apparatus connection unit 160a, the first image processing unit 130 processing the broadcast signal and/or the image signal input through the first signal input unit 110 and outputting a first output signal, the upgrade apparatus connection unit 160a transmitting the first output signal and/or the input signal input through the first signal input unit 110 to the upgrade apparatus 200a, and a first controller 140 controlling the first image processing unit 130 to process the input signal input through the first signal input unit 110 when the upgrade apparatus 200a is not connected to the upgrade apparatus connection unit 160a, and controlling the first signal input unit 110 and the first image processing unit 130 such that at least one of the input signal and the first output signal is transmitted to the upgrade apparatus connection unit 160a and is processed by a second image processing unit 220 when the upgrade apparatus 200a is connected to the upgrade apparatus connection unit 160a.

Here, the first output signal includes a first audio signal and a first image signal.

As described above, the first image processing unit 130 may include a demultiplexer (not shown) which performs demultiplexing by separating a broadcast signal received from the first signal input unit 110 into an image signal, an audio signal and optional data, a decoder (not shown) decoding the separated image signal into a predetermined image format, and a scaler (not shown) scaling the decoded image signal to a predetermined resolution to display an image on the display unit 170.

Here, the first image signal may be an image signal separated by the demultiplexer, an image signal decoded by the decoder, or an image signal scaled to a predetermined resolution.

Here, the first audio signal may be an audio signal separated by the demultiplexer.

The upgrade apparatus connection unit 160a includes a first connection unit 161 transmitting the first image signal and the input signal (at least one of the broadcast signal or the image signal provided from the image source) input by the first signal input unit 110 to the upgrade apparatus 200a, and a second connection unit 163 transmitting or receiving at least one of a control signal and/or the first audio signal to or from the upgrade apparatus 200a.

The optional data included in the broadcast signal processed by the first image processing unit 130 may be transmitted to the upgrade apparatus 200a through at least one of the first connection unit 161 and the second connection unit 163.

The first connection unit 161 is provided to transmit the first image signal and/or the input signal in one direction from the image processing apparatus 100a to the upgrade apparatus 200a.

The second connection unit 163 is provided to transmit and receive the control signal and/or the first audio signal in two directions between the image processing apparatus 100a and the upgrade apparatus 200a.

That is, the upgrade apparatus connection unit 160a according to the present exemplary embodiment communicates an image signal, control signal, or audio signal with the image processing apparatus 200a through separate connection units. The image signal is transmitted in one direction from the image processing apparatus 100a to the upgrade apparatus 200a and the control signal or audio signal is transmitted in two directions.

The upgrade apparatus 200a includes a body connection unit 210a connectable to the upgrade apparatus connection unit 160a of the image processing apparatus 100a, a second image processing unit 220, a second controller 230 controlling the second image processing unit 220, and a display connection unit 260 providing a second image signal processed by the second image processing unit 220 to the display unit 170.

The body connection unit 210a includes a first body connection unit 211 and a second body connection unit 213 connected to the first connection unit 161 and the second connection unit 163, respectively, of the image processing apparatus 100a.

The first connection unit 161 and the first body connection unit 211 may be connected to each other via wire or wirelessly. In an exemplary wire connection mode, the first connection unit 161 and the first body connection unit 211 may be connected via a connector (not shown) and a cable (not shown).

The second connection unit 163 and the second body connection unit 213 may be also connected to each other via wire or wirelessly. In an illustrative wire connection mode, the second connection unit 163 and the second body connection unit 213 may be also connected via a connector (not shown) and a cable (not shown).

The input signal and/or the first image signal input through the first body connection unit 211 is provided to the second image processing unit 220, and the audio signal and/or the control signal input through the second body connection unit 213 is provided to the second controller 230 or the second image processing unit 220.

The second image processing unit 220 processes the input signal and/or the first image signal input through the body connection unit 210a to output a second image signal.

The output second image signal is transmitted to the display unit 170 through the display connection unit 260, so that a second image corresponding to the second image signal may be displayed on the display unit 170. Here, the display unit 170 may include a connection unit 171 to be connected to the display connection unit 260.

Here, the connection unit 171 and the display connection unit 260 may include connectors, respectively, and be connected via wire using a cable. As necessary, the connection unit 171 and the display connection unit 250 may also be connected wirelessly.

Meanwhile, the second image processing unit 220 may output a second audio signal by processing the first audio signal transmitted from the image processing apparatus 100a. The output second audio signal may be transmitted to a conversion-amplification unit 180 through the second body connection unit 213 and the second connection unit 163 and can be output as sound through the audio output unit 190.

Here, the second audio signal processed in the upgrade apparatus 200a may be transmitted from the second connection unit 163 to the conversion-amplification unit 180 via the first image processing unit 130. As necessary, the second audio signal may be transmitted from the second connection unit 163 directly to the conversion-amplification unit 180.

The audio signal amplified by the conversion-amplification unit 180 may be transmitted to the audio output unit 190 through an audio output connection unit 193 and a connection unit 191, which are detachably connected, and can be output as sound. The connection unit 191 may be provided in the audio output unit 190, and the audio output connection unit 193 may be installed on an image processing board 101.

Here, before the upgrade apparatus 200a is mounted on the image processing apparatus 100a, the first connection unit 161 on the image processing board 101 and the connection unit 171 of the display unit 170 may be connected to each other via wire using a cable (not shown) and a connector (not shown). Further, since the second connection unit 163 is prepared for installing the upgrade apparatus 200a, the second connection unit 163 remains unconnected until the upgrade apparatus 200a is mounted.

When the upgrade apparatus 200a is installed in the image processing apparatus 100a to upgrade a function of the image processing apparatus 100a, the first connection unit 161 and the connection unit 171 of the display unit 170 are disconnected, and then the first connection unit 161 and the first body connection unit 211 of the upgrade apparatus 200a are connected to each other using a cable (not shown) or a connector (not shown) and the second connection unit 163 and the second body connection unit 213 are connected in the same manner. In addition, the display connection unit 260 of the upgrade apparatus 200a and the disconnected connection unit 171 of the display unit 170 are connected to each other via wire or wirelessly. The first and second connection units 161 and 163 and the first and second body connection units 211 and 213 may be connected wirelessly as well as via wire using a cable and a connector.

Figure 3:
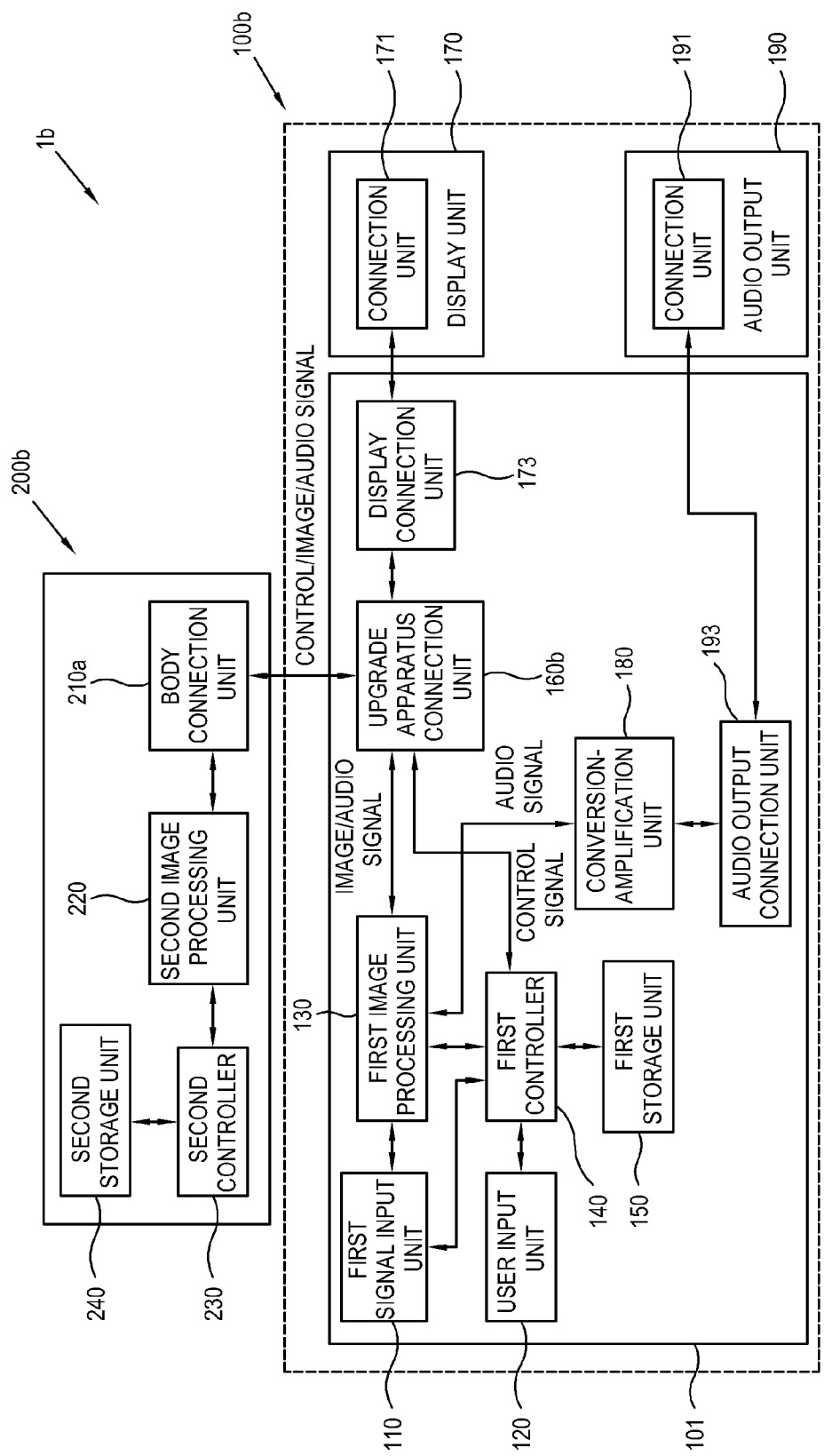
FIG. 3 is a block diagram of a display system according to an exemplary embodiment.

Referring to FIG. 3, a display system 1b according to an exemplary embodiment includes an upgrade apparatus 200b and an image processing apparatus 100b which is functionally upgraded by the upgrade apparatus 200b.

As shown in FIG. 3, the image processing apparatus 100b includes a first signal input unit 110 receiving a broadcast signal or an image signal from an image source and transmitting the signal to a first image processing unit 130; the first image processing unit 130 processing the image signal or the broadcast signal input by the first signal input unit 110 to output a first output signal, a first controller 140 controlling the first image processing unit 130, a first storage unit 150, an upgrade apparatus connection unit 160b to which the upgrade apparatus 200b is connected, a display unit 170; a display connection unit 173 to which the display unit 170 is connected, a conversion-amplification unit 180 converting and amplifying an audio signal processed by the first image processing unit 130, an audio output unit 190, and an audio output connection unit 193 to which the audio output unit 190 is connected.

The first signal input unit 110, the first image processing unit 130, the controller 140, the upgrade apparatus connection unit 160b, and the display connection unit 173 may be mounted on a single image processing board or a plurality of image processing boards.

Compared with in the image processing apparatus 100a of FIG. 2, in the image processing apparatus 100b of the present exemplary embodiment, the display connection unit 173 connected to the display unit 170 is provided on an image processing board. In the exemplary embodiment shown in FIG. 2, the display connection unit 260 is provided in the upgrade apparatus 200a.

Figure 4:
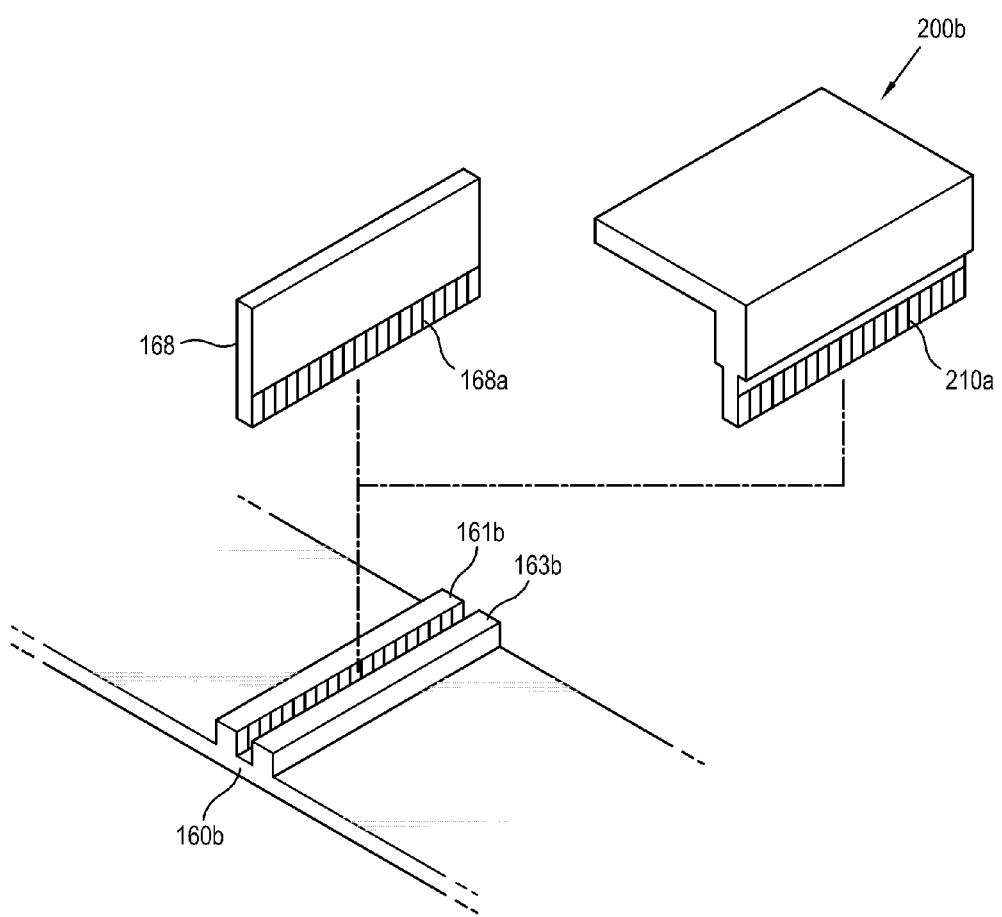
FIG. 4 is a perspective view illustrating a main part of a signal connection member and an upgrade apparatus selectively connected to an upgrade apparatus connection unit of an image processing apparatus in a display system according to an exemplary embodiment.

As shown in FIG. 4, the image processing apparatus 100b further includes a signal connection member 168 inserted into the upgrade apparatus connection unit 160b such that the first output signal output by the first image processing unit 130 is transmitted to the display unit 170. Specifically, the first output signal is output to the display connection unit 173 when the upgrade apparatus 200b is not connected to the upgrade apparatus connection unit 160b.

The upgrade apparatus connection unit 160b includes a first input signal terminal 161b to which the first output signal output by the first image processing unit 130 is input and a display unit output terminal 163b which is separated from the first input signal terminal 161b and from which a signal to be output to the display unit 170 is output.

The signal connection member 168 includes a signal connection terminal 168a disposed between the first input signal terminal 161b and the display unit output terminal 163b to electrically connect these two terminals. Accordingly, until the upgrade apparatus 200b is inserted into the upgrade apparatus connection unit 160b, the first output signal processed by the first image processing unit 130 may be transmitted to the display unit 170 by the signal connection member 168.

Meanwhile, the upgrade apparatus 200b includes a body connection unit 210a receiving the first output signal from the first input signal terminal 161b and transmitting a second output signal processed by a second image processing unit 220 to the display unit 170, specifically to the display connection unit 173 through the display unit output terminal 163b.

The body connection unit 210a may be provided to project so that it can be inserted into the upgrade apparatus connection unit 160b.

Further, the upgrade apparatus 200b may further include the second image processing unit 220 processing the first output signal input through the first input signal terminal 161b and the body connection unit 210a to output the second output signal, a second controller 230 controlling the second image processing unit 220, a second storage unit 240, and an upgrade apparatus casing (not shown) accommodating the second image processing unit 220, the second controller 230, and the second storage unit 240.

To connect the upgrade apparatus 200b to the upgrade apparatus connection unit 160b, the signal connection member 168 is removed from the upgrade apparatus connection unit 160b, and then the body connection unit 210a of the upgrade apparatus 200b is inserted into the upgrade apparatus connection unit 160b.

Figure 5:
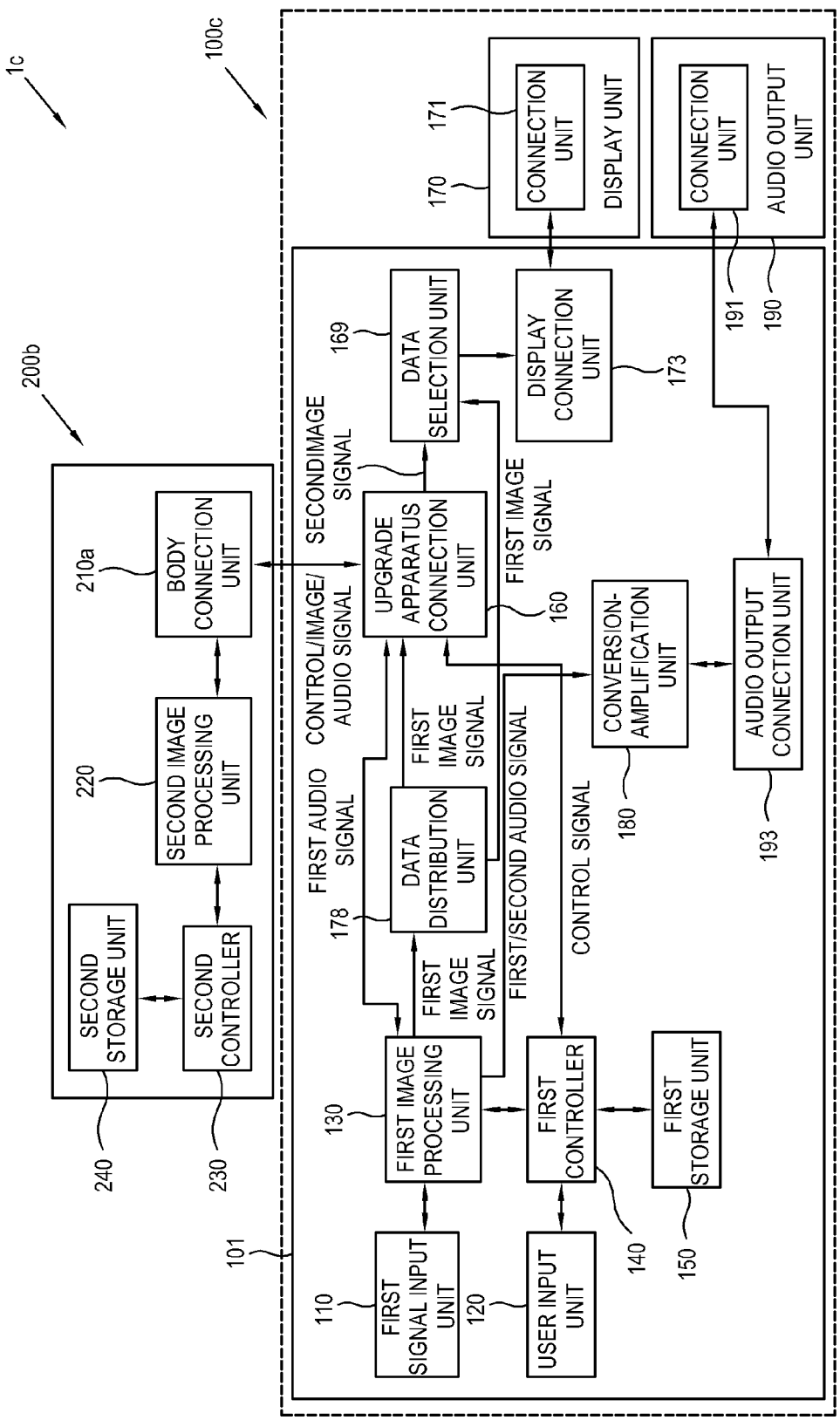
FIG. 5 is a block diagram of a display system according to an exemplary embodiment.

Referring to FIG. 5, a display system 1c according to an exemplary embodiment includes an upgrade apparatus 200b and an image processing apparatus 100c functionally upgraded when the upgrade apparatus 200b is connected thereto.

The image processing apparatus 100c includes a data distribution unit 178 distributing a first image signal output by a first image processing unit 130 to an upgrade apparatus connection unit 160 and a data selection unit 169, the data selection unit 169 selecting any one of a second image signal output through the upgrade apparatus connection unit 160 and the first image signal distributed by the data distribution unit 178, and a first controller 140 controlling the data distribution unit 178 and the data selection unit 169.

The data distribution unit 178 may include a demultiplexer distributing the first image signal into a plurality of output signals by a control signal of the first controller 140.

The data selection unit 169 may include a multiplexer selecting any one of the first image signal and the second image signal by a control signal of the first controller 140.

The first controller 140 controls the data distribution unit 178 and the data selection unit 169 to output the first output signal output from the first image processing unit 130 to a display unit 170 when the upgrade apparatus 200b is not connected to the image processing apparatus 100c. Here, as described above, the first output signal includes at least one of the first image signal and a first audio signal.

In detail, when the upgrade apparatus 200b is not connected to the upgrade apparatus connection unit 160, the first controller 140 controls the data distribution unit 178 to distribute the first image signal output by the first image processing unit 130 to the data selection unit 169. Further, the first controller 140 controls the data selection unit 169 to select the first image signal output from the data distribution unit 178 and output the signal to a display connection unit 173. Accordingly, a first image corresponding to the first image signal may be displayed on the display unit 170.

When the upgrade apparatus 200b is connected, the first controller 140 controls the data distribution unit 178 and the data selection unit 169 to distribute the first output signal output from the first image processing unit 130 to the upgrade apparatus connection unit 160 and to output a second output signal output by the upgrade apparatus 200b to the display unit 170.

In detail, when the upgrade apparatus 200b is connected to the upgrade apparatus connection unit 160, the first controller 140 controls the data distribution unit 178 to distribute the first image signal output by the first image processing unit 130 to the upgrade apparatus connection unit 160. Accordingly, the first image signal transmitted to the upgrade apparatus connection unit 160 is input to a second image processing unit 220 through a body connection unit 210a. The second image processing unit 220 processes the input first image signal to output a second image signal, and the output second image signal is input to the data selection unit 169 through the body connection unit 210a and the upgrade apparatus connection unit 160. The data selection unit 169 selects and outputs the second image signal to the display connection unit 173 according to a control instruction of the first controller 140. Accordingly, a second image corresponding to the second image signal may be displayed on the display unit 170. Here, the second image signal may be functionally improved as compared with the first image signal or may have a newly added function which the first image signal does not have.

Accordingly, a user may watch an upgraded image by mounting the upgrade apparatus 200b to the image processing apparatus 100c.

When the upgrade apparatus 200b is connected to the upgrade apparatus connection unit 160, the first output signal output by the first image processing unit 130 may be input to the second image processing unit 220 through the upgrade apparatus connection unit 160, thereby outputting the second output signal.

Here, the first output signal may include the first audio signal as well as the first image signal.

The first audio signal is input to the second image processing unit 220 through the upgrade apparatus connection unit 160 and processed by the second image processing unit 220, thereby outputting a second audio signal. The second audio signal output by the second image processing unit 220 may be output to an audio output unit 190 via the upgrade apparatus connection unit 160, the first image processing unit 130, and a conversion-amplification unit 180.

In the foregoing exemplary embodiment, the data distribution unit 178 and the data selection unit 169 are controlled by the first controller 140. However, as necessary, a second controller 230 of the upgrade apparatus 200b may control the data distribution unit 178 and the data selection unit 169 to perform the same functions described above.

Figure 6:
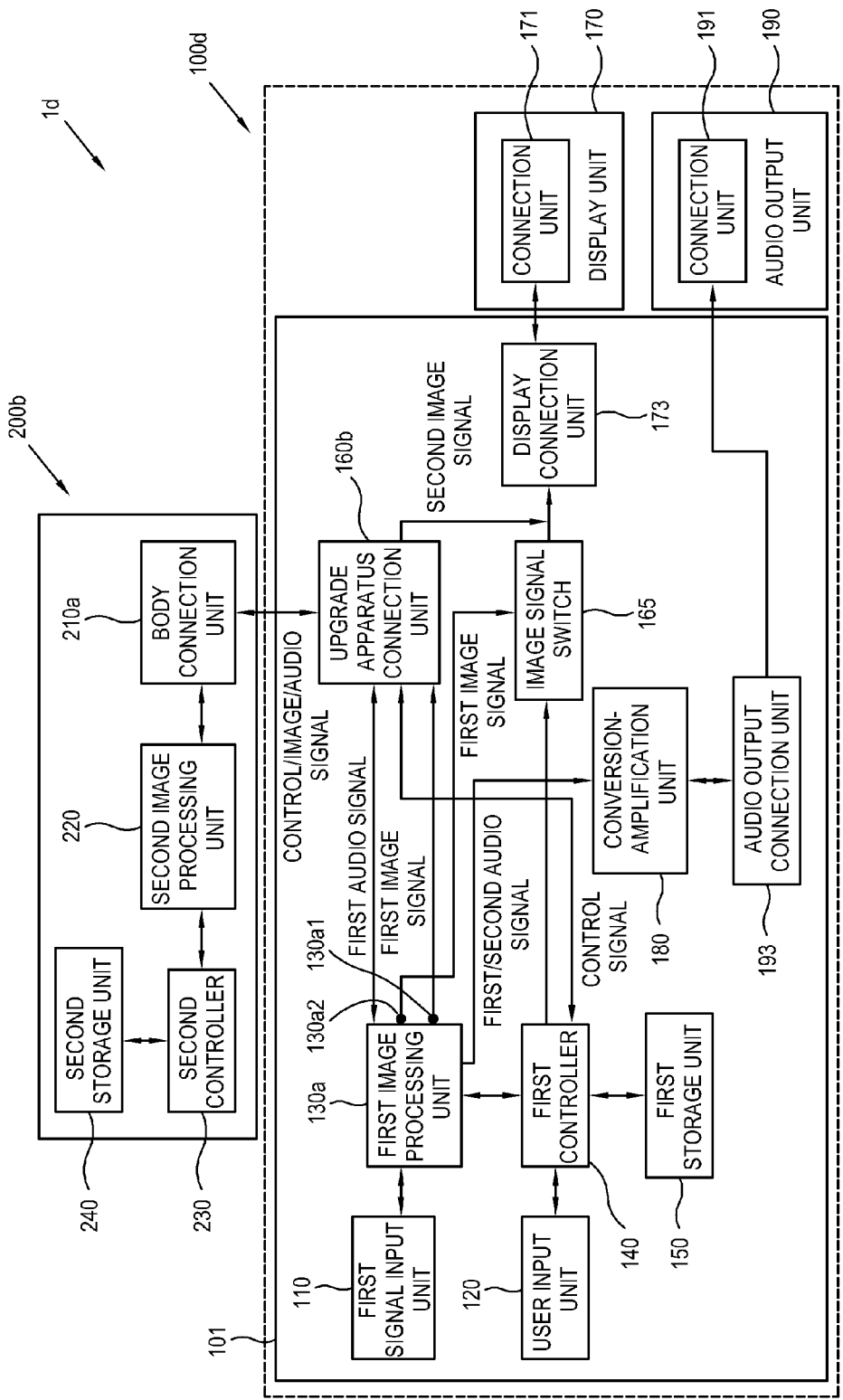
FIG. 6 is a block diagram of a display system according to an exemplary embodiment.

Referring to FIG. 6, a display system 1d according to an exemplary embodiment includes an upgrade apparatus 200b and an image processing apparatus 100d to which the upgrade apparatus 200b is connected.

The image processing apparatus 100d includes a first image processing unit 130a processing an input signal input through a first signal input unit 110 and outputting a first image signal through a first output port 130a1 and a second output port 130a2, an upgrade apparatus connection unit 160b receiving the first image signal output from the first output port of the first image processing unit 130a, and an image signal switch 165 selectively transmitting the first image signal output from the second output port of the first image processing unit 130a to the display unit 170.

In the exemplary embodiment shown in FIG. 4, the signal connection member 168 is inserted into the upgrade apparatus connection unit 160b before the upgrade apparatus 200 is connected to the upgrade apparatus connection unit 160b. However, in the present exemplary embodiment, a signal connection member 168 is not inserted into the upgrade apparatus connection unit 160b before the upgrade apparatus 200 is connected thereto.

That is, until the upgrade apparatus 200b is not connected, a first input signal terminal 161b and a display unit output terminal 163b of the upgrade apparatus connection unit 160b do not short-circuit, but are physically open. Accordingly, a first output signal by the first image processing unit 130 input to the first input signal terminal 161b is not output to the display unit 170 through the display unit output unit 163b.

When the upgrade apparatus 200b is not connected to the upgrade apparatus connection unit 160b, a first controller 140 turns on the image signal switch 165 so that the first image signal is transmitted to the display unit 170, specifically to a display connection unit 173. Accordingly, a first image corresponding to the first image signal is displayed on the display unit 170.

When it is detected that the upgrade apparatus 200b is connected to the upgrade apparatus connection unit 160b, the first controller 140 turns off the image signal switch 165 so that the first image signal is not transmitted directly to the display unit 170. Accordingly, the first image signal input to the upgrade apparatus connection unit 160b may be transmitted to the upgrade apparatus 200b through a body connection unit 210a and processed by a second image processing unit 220. A second image signal processed by the second image processing unit 220 is transmitted to the display unit 170 through the upgrade apparatus connection unit 160b. Accordingly, a second image corresponding to the second image signal may be displayed on the display unit 170.

Here, the image signal switch 165 may be configured as a switch suitable for an electrical signal system capable of operating at a high speed in accordance with low voltage differential signaling (LVDS). The image signal switch 165 may be configured as a bus switch capable of transmitting data at a high speed.

Figure 7:
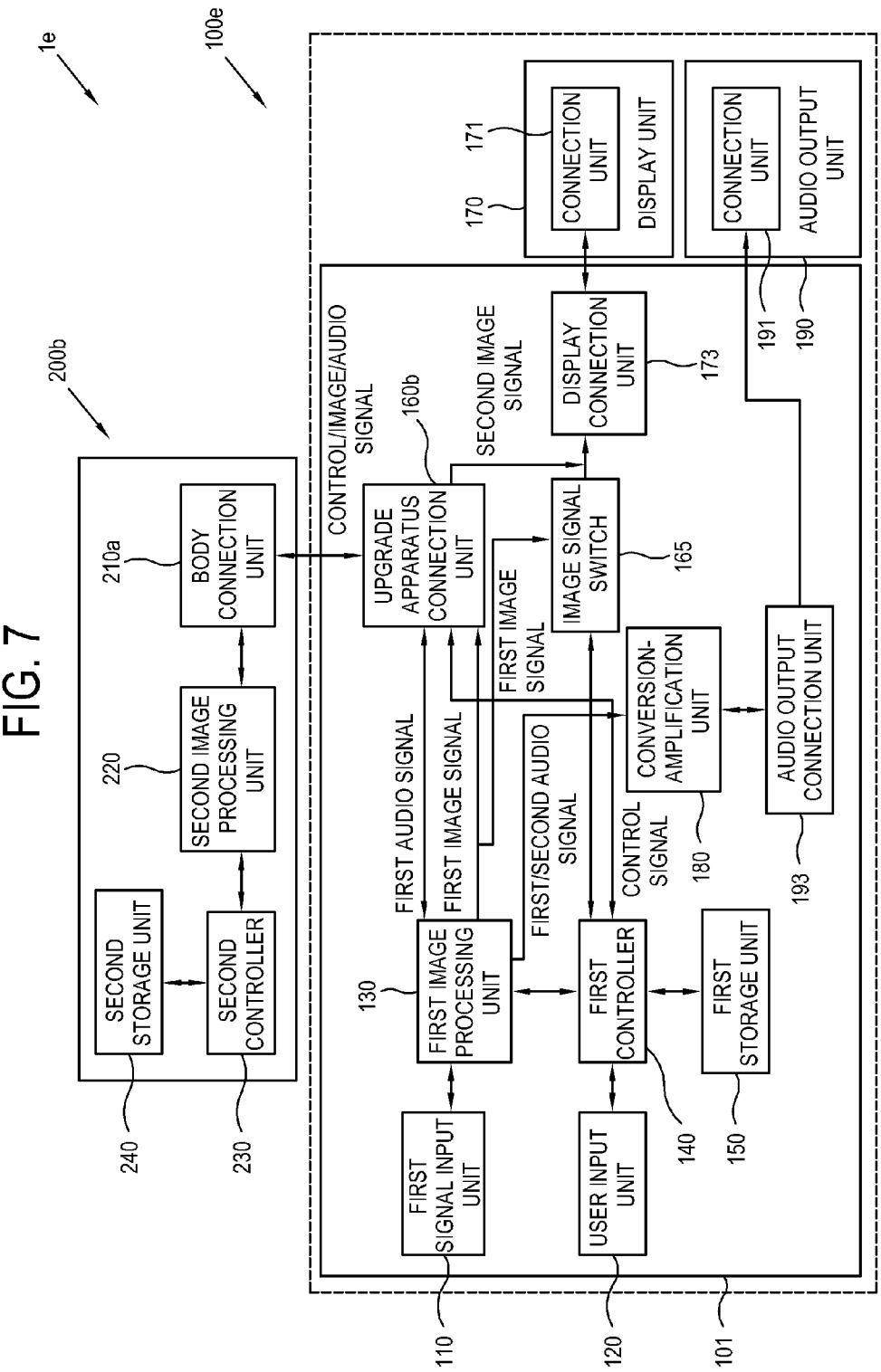
FIG. 7 is a block diagram of a display system according to an exemplary embodiment.

Referring to FIG. 7, a display system 1e according to an exemplary embodiment includes an upgrade apparatus 200b and an image processing apparatus 100e to which the upgrade apparatus 200b is connected.

Compared with the previous exemplary embodiment, the image processing apparatus 100e according to the present exemplary embodiment includes a first image processing unit 130 processing an input signal input through a first signal input unit 110 to output a first image signal through a single output port.

The first image signal output through the single output port of the first image processing unit 130 is divided and input to an upgrade apparatus connection unit 160b and an image signal switch 165.

The other elements of the display system 1e in the present exemplary embodiment are the same as those of the display system 1d in the previous exemplary embodiment, and thus descriptions thereof are omitted herein.

Figure 8:
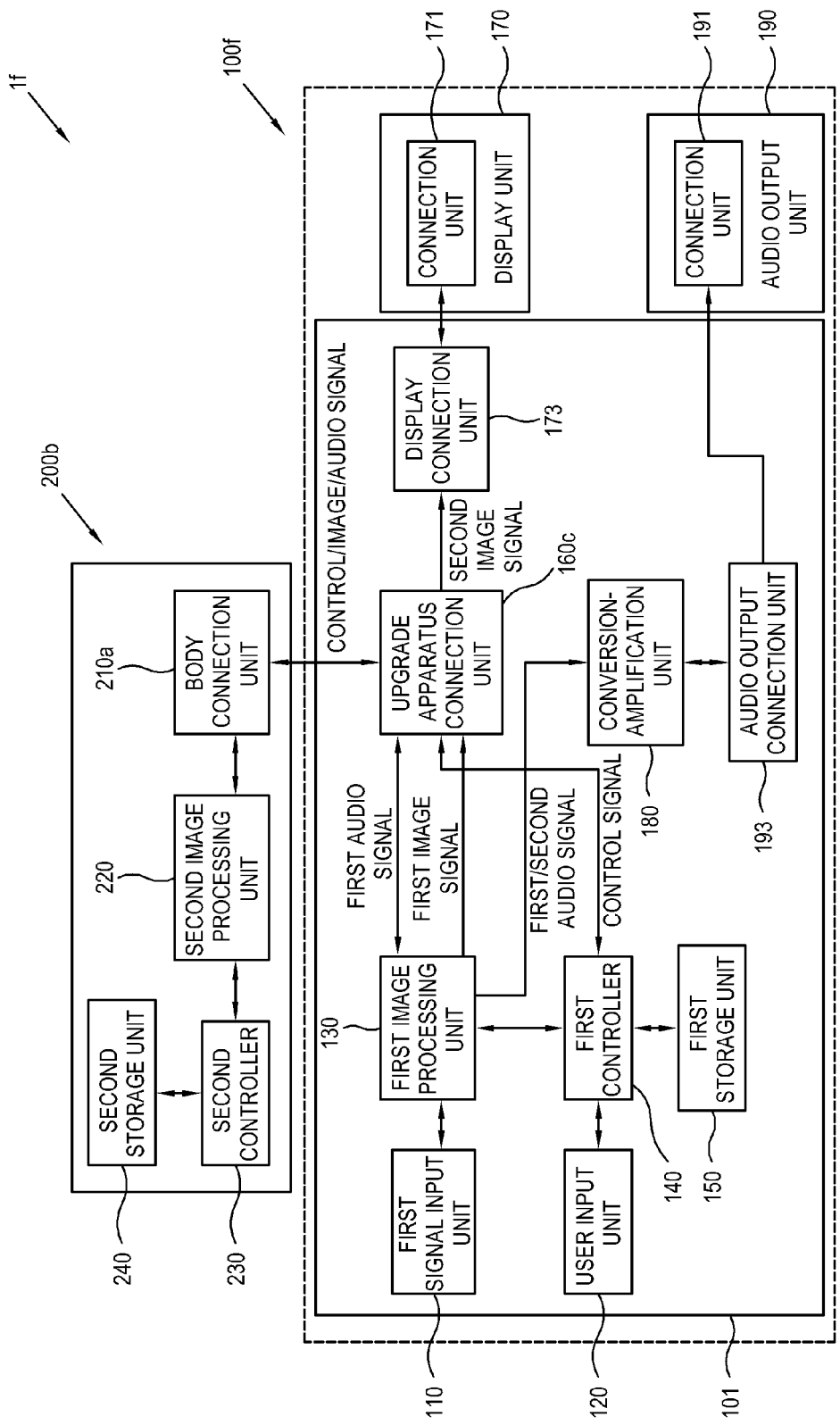
FIG. 8 is a block diagram of a display system according to an exemplary embodiment.
Figure 9:
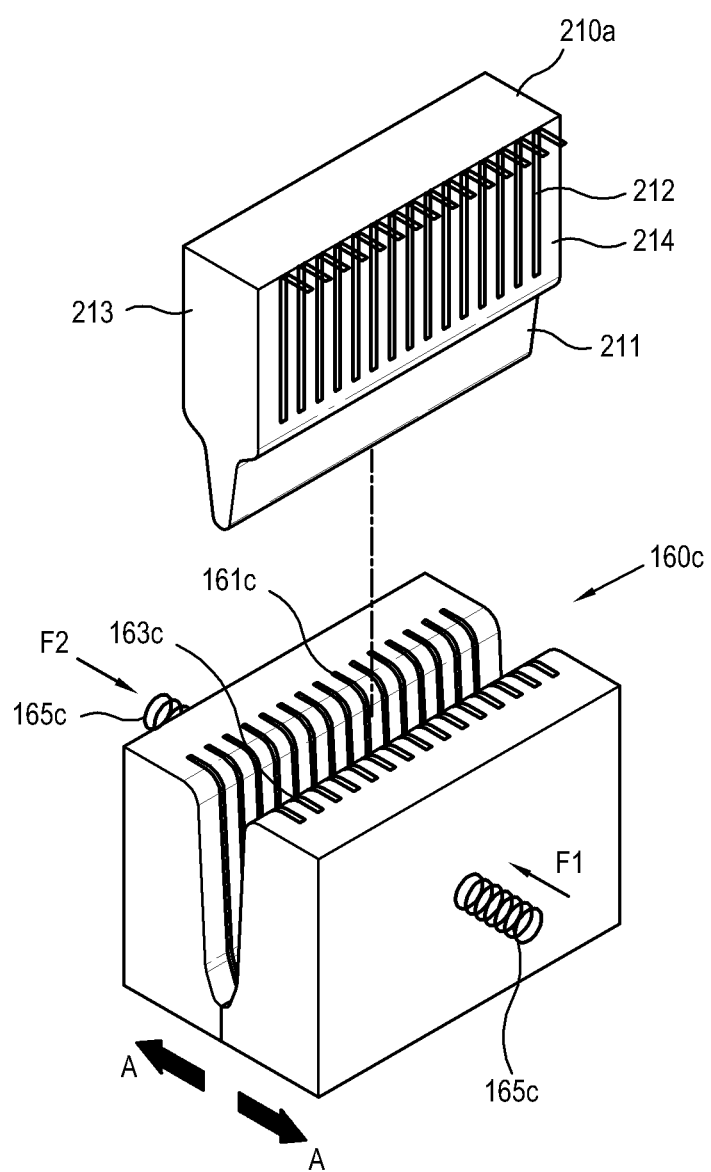
FIG. 9 is an enlarged perspective view illustrating a connection method of an upgrade apparatus connection unit of an image processing apparatus and an upgrade apparatus according to an exemplary embodiment.
Figure 10:
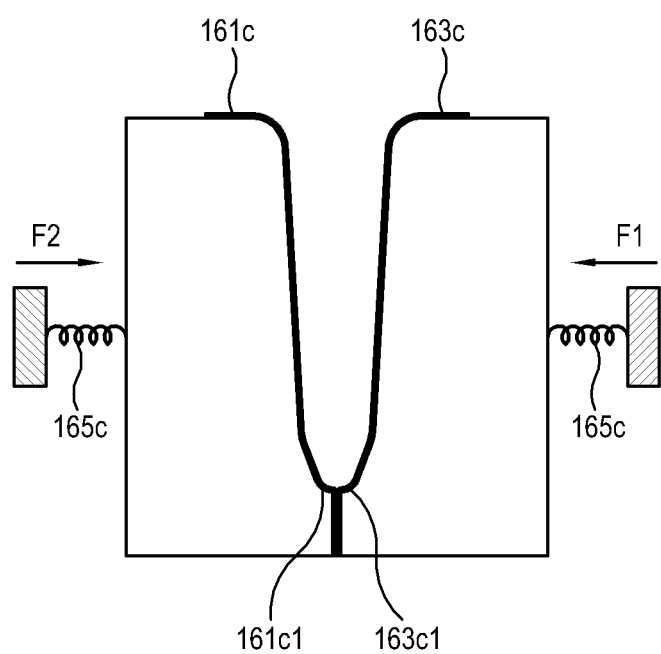
FIG. 10 is an enlarged front view illustrating a connection method of an upgrade apparatus connection unit of an image processing apparatus and an upgrade apparatus of a display system according to an exemplary embodiment.

Referring to FIGS. 8, 9 and 10, a display system if according to an exemplary embodiment includes an upgrade apparatus 200b and an image processing apparatus 100f to be upgraded when the upgrade apparatus 200b is connected to the image processing apparatus 100f.

The image processing apparatus 100f includes an upgrade apparatus connection unit 160c selectively transmitting any one of a first output signal output from a first image processing unit 130 and a second output signal output from a second image processing unit 220 to a display unit 170 depending on whether the upgrade apparatus 200b is inserted or is not inserted into the image processing apparatus 100f.

The upgrade apparatus connection unit 160c according to the present exemplary embodiment is configured to switch the first output signal and the second output signal alone without the signal connection member 168 in FIG. 4, the data distribution unit 178, the data selection unit 169, and the image signal switch 165 which are provided to selectively transmit the first output signal and the second output signal to the display unit 170 in the foregoing exemplary embodiments.

The upgrade apparatus connection unit 160c includes a first input signal terminal 161c to which the first output signal output from the first image processing unit 130 is input, and a display unit output terminal 163c to be selectively brought in contact with any one of the first input signal terminal 161c and a body connection unit 210 of the upgrade apparatus 200b based on whether the upgrade apparatus 200b is connected so that any one of the first output signal and the second output signal is output to the display unit 170.

Here, at least one of the first input signal terminal 161c and the display unit output terminal 163c may be configured to move in an approach direction to be brought in contact with the other thereof when the upgrade apparatus 200b is not connected and to move back in a receding direction to be brought out of contact with the other thereof when the upgrade apparatus 200b is connected.

In detail, as shown in FIGS. 9 and 10, a first contact unit 161c1 of the first input signal terminal 161c and a second contact unit 163c1 of the display unit output terminal 163c move close to each other to be in contact with each other when the upgrade apparatus 200b is not inserted.

Here, the image processing apparatus 100f may further include an elastic member 165c to provide elastic biasing force F1 and F2 to at least one of the first input signal terminal 161c and the display unit output terminal 163c so that the first input signal terminal 161c and the display unit output terminal 163c are brought in contact with each other when the upgrade apparatus 200b is not connected to the upgrade apparatus connection unit 160c.

When a body connection unit 210a of the upgrade apparatus 200b is inserted between the first input signal terminal 161c and the display unit output terminal 163c, the first input signal terminal 161c and the display unit output terminal 163c move in the receding direction so that the first contact unit 161c1 and the second contact unit 163c1 are spaced away from each other. Then, the first input signal terminal 161c is brought in contact with an input terminal (not shown) of the body connection unit 210a and the display unit output terminal 163c is brought in contact with an output terminal 212 of the body connection unit 210a. Accordingly, the first output signal is input through the input terminal of the body connection unit 210a, processed by the second image processing unit 220, and then output as the second output signal to the display unit output terminal 163c through the output terminal 212 of the body connection unit 210a.

Thus, when the upgrade apparatus 200b is not inserted into the upgrade apparatus connection unit 160c, the first output signal may be transmitted to the display unit 170 through the display unit output terminal 163c. Further, when the upgrade apparatus 200b is inserted into the upgrade apparatus connection unit 160c, the second output signal may be transmitted to the display unit 170 through the display unit output terminal 163c.

Here, the body connection unit 210a may include a first surface 213 facing the first input signal terminal 161c and a second surface 214 facing the display unit output terminal 163c, wherein the input terminal may be provided on the first surface 213 and the output terminal 212 may be provided on the second surface 214.

Although FIGS. 9 and 10 illustrate that both the first input signal terminal 161c and the display unit output terminal 163c move close to or away from each other, as necessary, any one of the first input signal terminal 161*c* and the display unit output terminal 163*c* can be fixed while the other thereof moves back and forth.

Further, although FIGS. 9 and 10 illustrate that at least one of the first input signal terminal 161*c* and the display unit output terminal 163*c* moves, as necessary, the first input signal terminal 161*c* and the display unit output terminal 163*c* do not have to move and can be formed of a transformable elastic material. In this case, when the body connection unit 210*a* is inserted, the first input signal terminal 161*c* and the display unit output terminal 163*c* are transformed by contact with the body connection unit 210*a*, thereby bringing the first input signal terminal 161*c* and the display unit output terminal 163*c* out of contact with each other.

Figure 11:
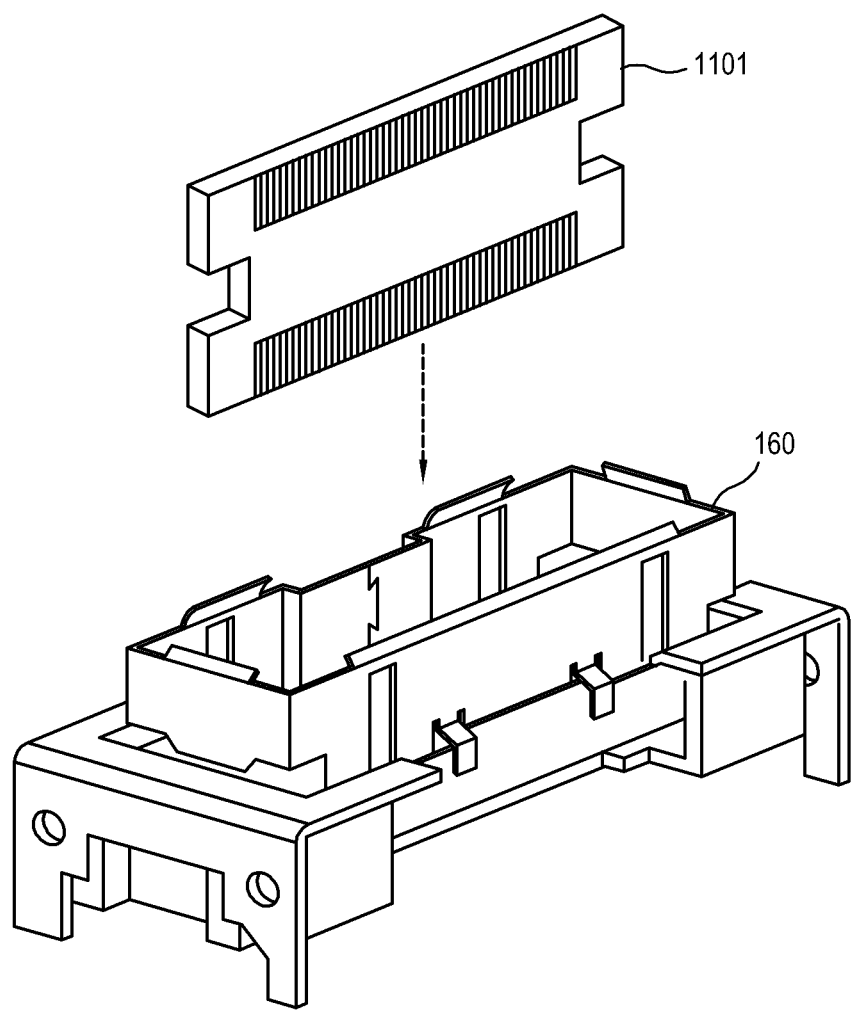
FIGS. 11 to 17 are perspective views and cross-sectional views illustrating connections of an upgrade apparatus connection unit of an image processing apparatus and an upgrade apparatus according to exemplary embodiments.
Figure 12:
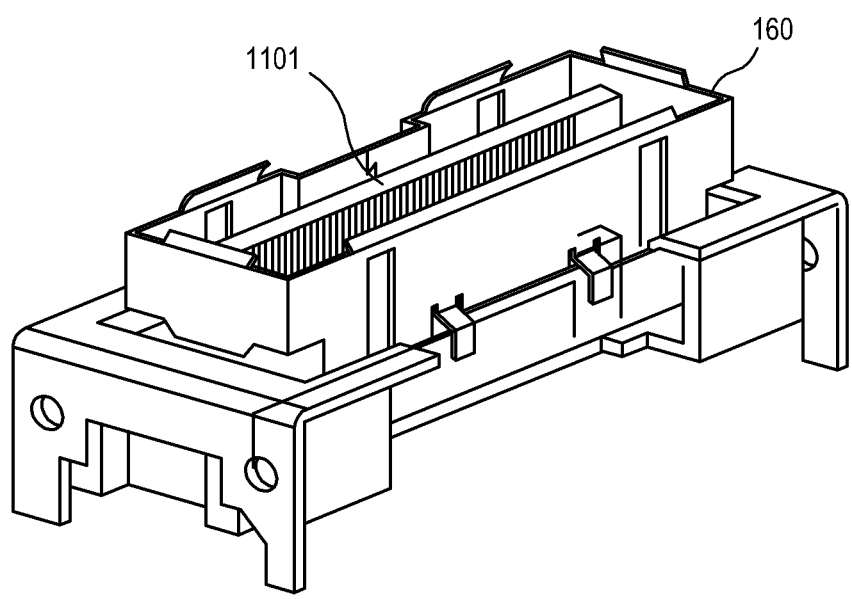

FIGS. 11 to 17 are perspective views, enlarged views and cross-sectional views illustrating connections of an upgrade apparatus connection unit of an image processing apparatus and an upgrade apparatus according to exemplary embodiments. As shown in FIGS. 11 and 12, a body connection unit 210 of an upgrade apparatus 200 may be connected to an upgrade apparatus connection unit 160 of an image processing apparatus 100 via an intermediate board 1101.

Figure 13:
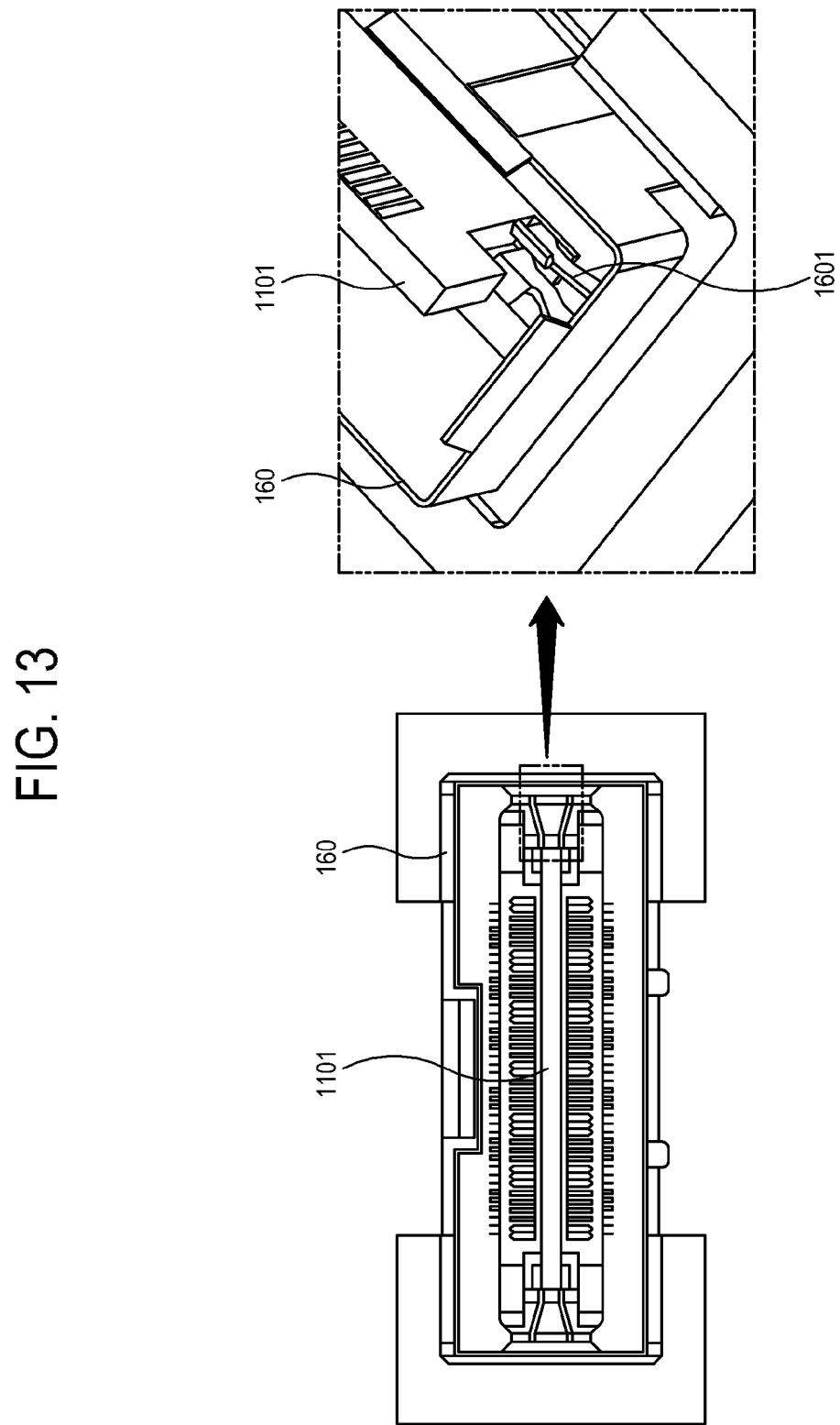

As shown in FIG. 13, the upgrade apparatus connection unit 160 may include a fixing unit 1601 so that the intermediate board 1101 is fixed and inserted into the upgrade apparatus connection unit 160. The fixing unit 1601 includes an elastic hook to fix the intermediate board 1101 to the upgrade apparatus connection unit 160 when the intermediate board 1101 is inserted.

Figure 14:
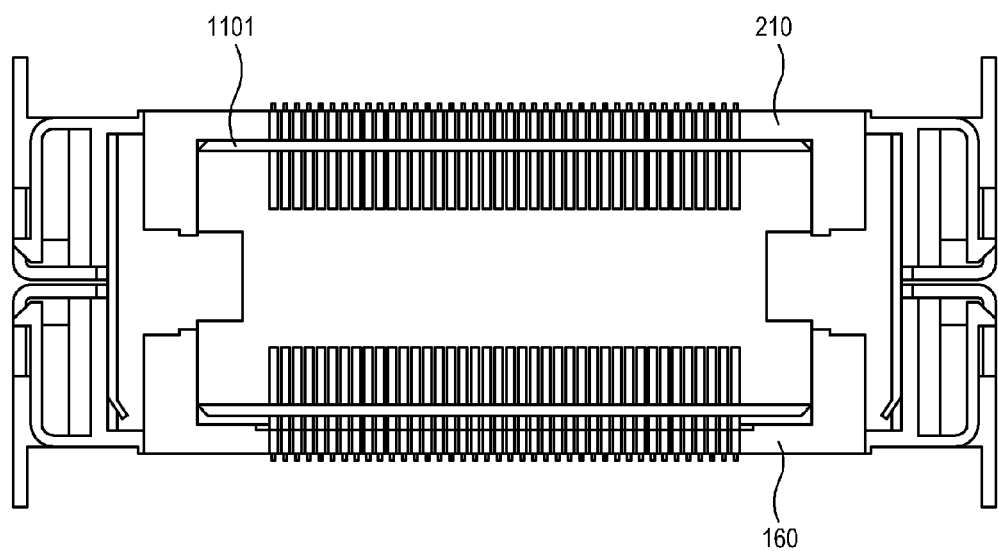
Figure 15:
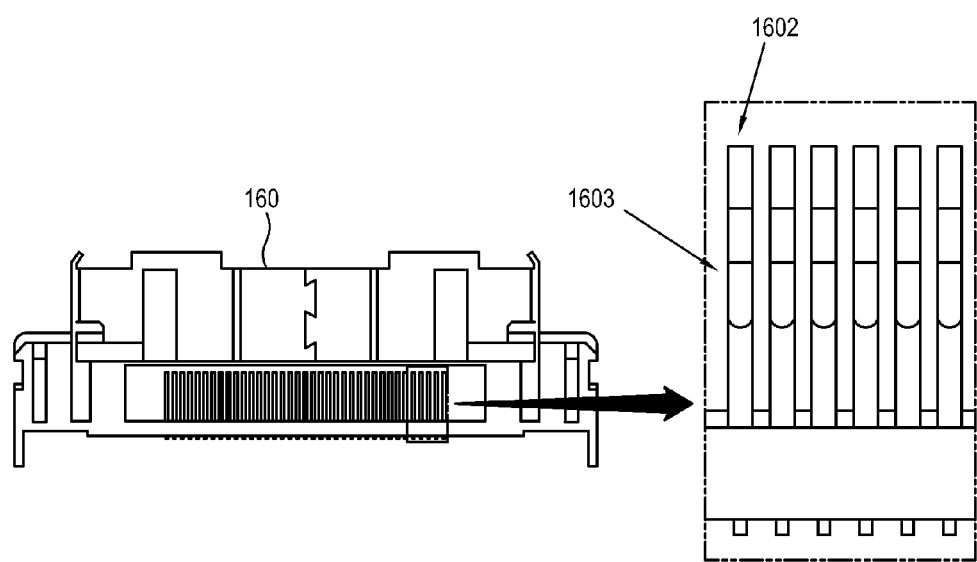

FIG. 14 is a cross-sectional view illustrating that the body connection unit 210 of the upgrade apparatus 200 is connected to the upgrade apparatus connection unit 160 of the image processing apparatus 100 via the intermediate board 1101. FIG. 15 illustrates a cross-sectional view of the upgrade apparatus connection unit 160 and an enlarged view of a terminal portion. As shown in FIG. 15, a terminal 1602 of the upgrade apparatus connection unit 160 may be protected by a housing 1603.

Figure 16:
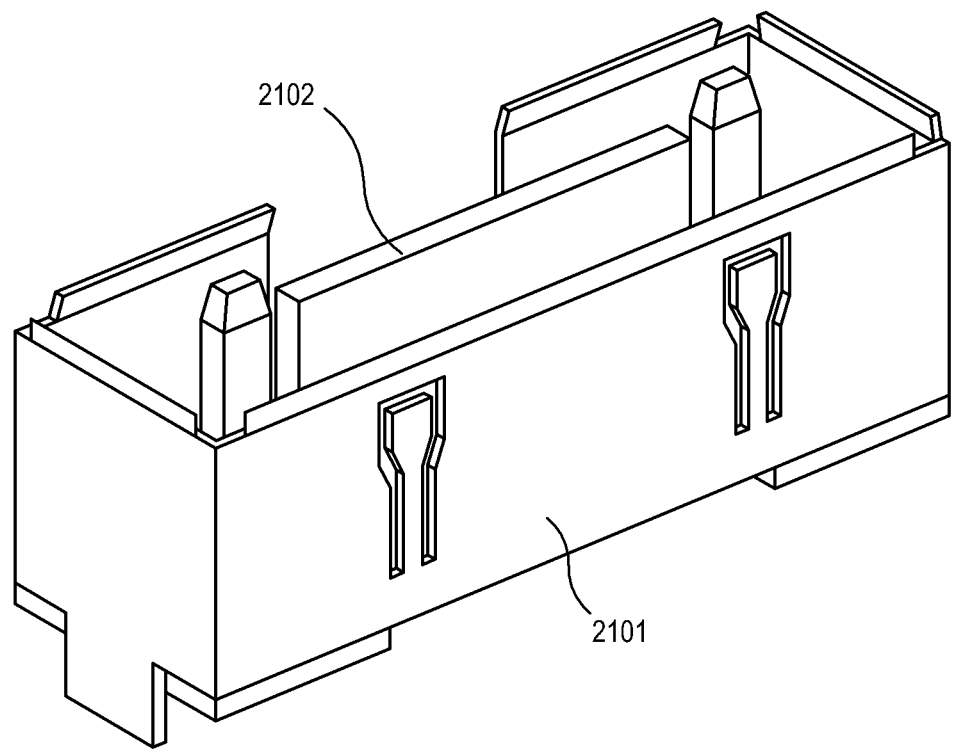
Figure 17:
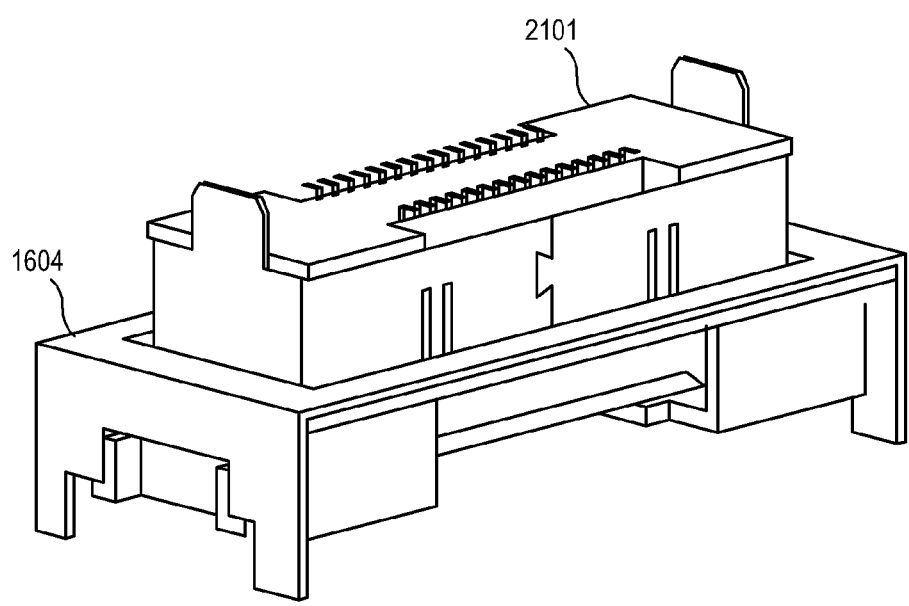

FIGS. 16 and 17 are perspective views illustrating a connection of an upgrade apparatus connection unit of an image processing apparatus and an upgrade apparatus according to an exemplary embodiment. As shown in FIG. 16, a body connection unit 2101 of an upgrade apparatus 200 includes a terminal unit 2102. As shown in FIG. 17, the body connection unit 2101 may be inserted into an upgrade apparatus connection unit 1604 of an image processing apparatus 100.

Figure 18:
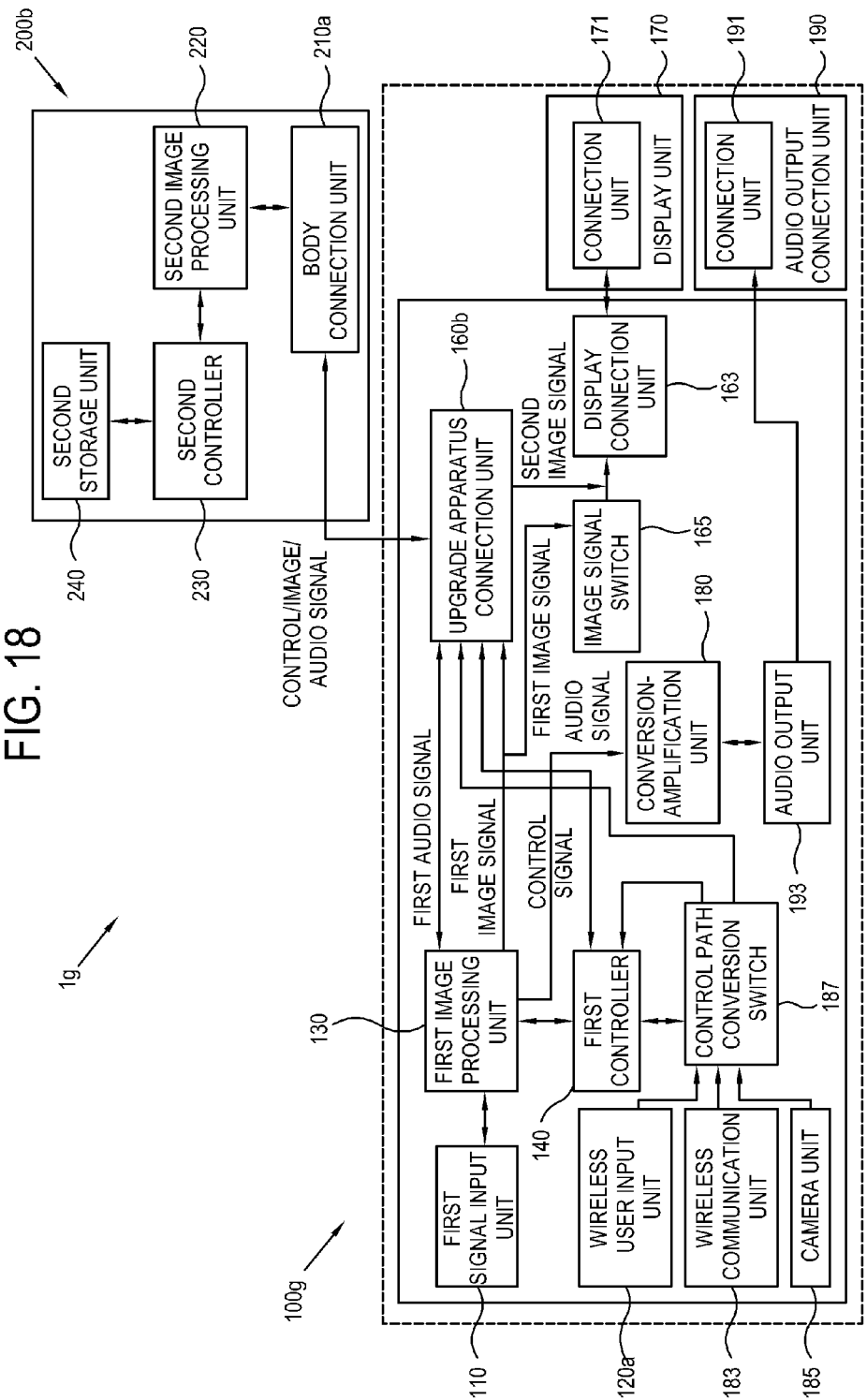
FIG. 18 is a block diagram of a display system according to an exemplary embodiment.

Referring to FIG. 18, a display system 1*g* according to an exemplary embodiment includes an upgrade apparatus 200*b* and an image processing apparatus 100*g* upgraded by the upgrade apparatus 200*b*.

Compared with the display system be of FIG. 7, the image processing apparatus 100*g* of the display system 1*g* according to the present exemplary embodiment further includes a wireless user input unit 120*a*, a wireless communication unit 183, a camera unit 185, and a control path conversion switch 187.

The wireless user input unit 120*a* is to receive a control input signal wirelessly from a user and may include a remote controller, a wireless keyboard, and a wireless mouse.

The wireless user input unit 120*a* may be configured to communicate with the image processing apparatus 100*g* using a short-range communication method, such as Bluetooth or infrared communication.

The wireless communication unit 183 is used to access an Internet network wirelessly and may include a wireless communication module in accordance with at least one wireless communication technology among Wi-Fi, WiBro and Long Term Evolution (LTE).

The camera unit 185 is used to take an image and may include an image sensor (not shown) and an optical lens (not shown).

The control path conversion switch 187 selects either a first controller 140 or the upgrade apparatus 200*b* to have control over at least one of the wireless user input unit 120*a*, the wireless communication unit 183 and the camera unit 185 based on whether the upgrade apparatus 200*b* is connected.

When the upgrade apparatus 200*b* is not connected to an upgrade apparatus connection unit 160*b*, the first controller 140 controls the wireless user input unit 120*a*, the wireless communication unit 183 and the camera unit 185.

However, when the upgrade apparatus 200*b* is connected to the upgrade apparatus connection unit 160*b*, the first controller 140 may stop controlling at least one of the wireless user input unit 120*a*, the wireless communication unit 183 and the camera unit 185. Instead of the first controller 140, a second controller 230 of the upgrade apparatus 220*b* may directly control at least one of the wireless user input unit 120*a*, the wireless communication unit 183 and the camera unit 185 by the control path conversion switch 187.

Internal elements to be quickly processed or controlled, such as user input, Internet data and a taken image signal received through the wireless user input unit 120*a*, the wireless communication unit 183 and the camera unit 185, may need to be connected directly to the second controller 230 instead of communicating with the second controller 230 via the first controller 140. In this case, when the upgrade apparatus 200*b* is connected to the image processing apparatus 100*g*, the control path conversion switch 187 is controlled to form a control path directly connecting the second controller 230 and at least one of the wireless user input unit 120*a*, the wireless communication unit 183 and the camera unit 185.

Meanwhile, when the upgrade apparatus 200*b* is not connected, a control path is formed such that the wireless user input unit 120*a*, the wireless communication unit 183 and the camera unit 185 are controlled by the first controller 140.

The control path conversion switch 187 may be controlled by at least one of the first controller 140 and the second controller 230 of the upgrade apparatus 200*b*. When the first controller 140 and the second controller 230 control the control path conversion switch 187 together, at least one of control instructions of the first controller 140 and the second controller 230 is given priority. For example, the first controller 140 has main control and the second controller 230 has auxiliary control, and vice versa.

Figure 19:
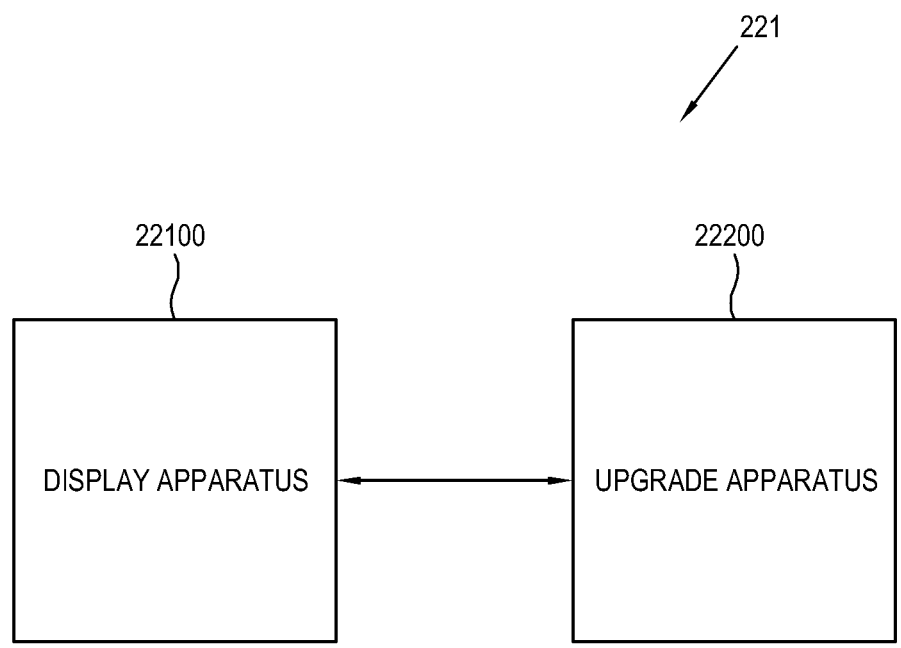
FIG. 19 is a block diagram of a display system according to an exemplary embodiment.

Hereinafter, an image processing apparatus (display apparatus), an upgrade apparatus, a display system, and a control method thereof according to another exemplary embodiment will be described. In the present exemplary embodiment, descriptions of components which are the same as or similar to those of the image processing apparatuses 100 to 100*g*, the upgrade apparatuses 200 to 200*g*, and the display systems 1 to 1*g* described with reference to FIGS. 1 to 18 will be omitted herein. FIG. 19 is a block diagram of a display system 221 according to an exemplary embodiment.

As shown in FIG. 19, the display system 221 according to the present exemplary embodiment includes a display apparatus 22100 processing an image signal provided from an external image source (not shown) according to a preset image processing process to display an image and an upgrade apparatus 22200 upgrading hardware and/or software of the display apparatus 22100.

The display apparatus 22100 may be configured as, for example, a TV, and is capable of performing any function included in the display apparatus 22100 alone, except for an upgraded function provided by the upgrade apparatus 22200, when not connected to the upgrade apparatus 22200. For example, the display apparatus 22100 may conduct an image displaying function of an external imaging device, a multimedia content reproducing function, and a network function.

Figure 20:
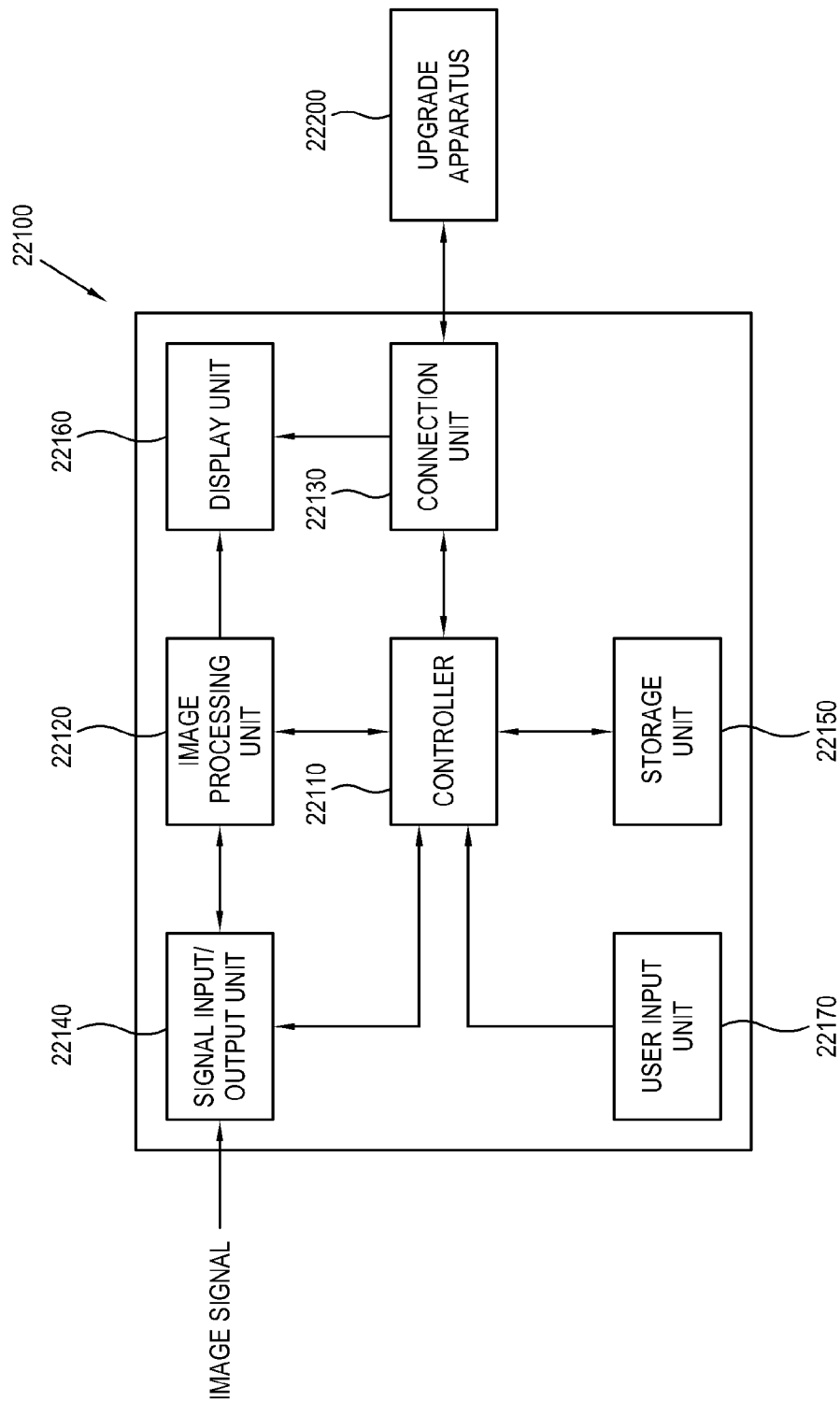
FIG. 20 is a block diagram illustrating a configuration of a display apparatus according to an exemplary embodiment.

Further, as shown in FIG. 20, the display apparatus 22100 includes a connection unit 22130, a storage unit 22150, and a controller 22110, which will be described, to communicate with the upgrade apparatus 22200 and to perform an upgraded function when connected to the upgrade apparatus 22200.

Figure 21:
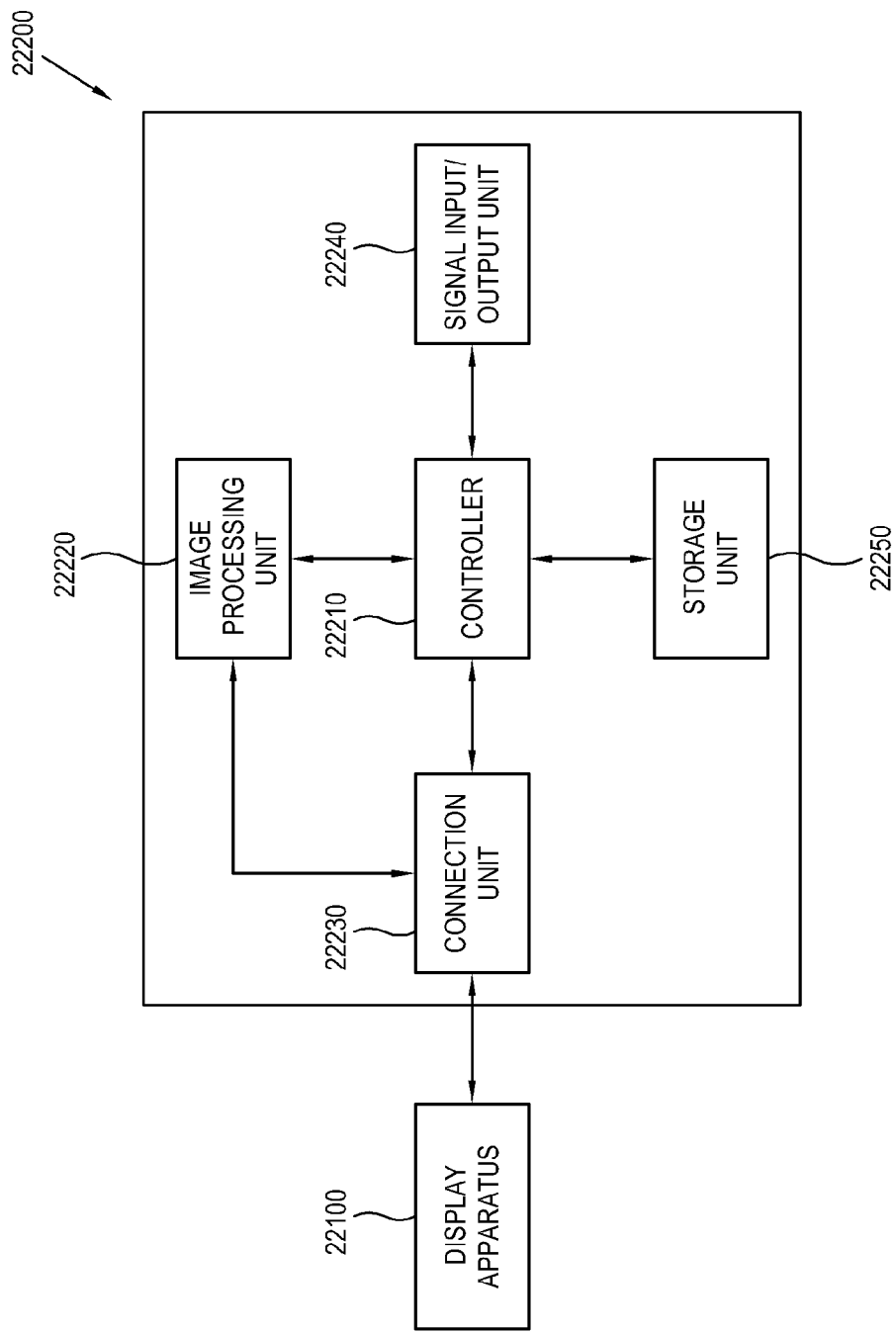
FIG. 21 is a block diagram of an upgrade apparatus according to an exemplary embodiment.

The display apparatus 22100 is connected to the upgrade apparatus 22200 to perform an upgraded function. As shown in FIG. 21, the upgrade apparatus 22200 may include an image processing unit 22220 more upgraded than an image processing unit of the display apparatus 22100, which will be described. Alternatively, the upgrade apparatus 22200 may include a controller 22219 more upgraded than the controller 22110 of the display apparatus 22100, which will be described. The display apparatus 22100 may replace a function thereof with an upgraded function of the upgrade apparatus 22200 or perform a function thereof and a function of the upgrade apparatus 22200 in combination using the upgrade apparatus 22200.

The display apparatus 22100 may display a broadcast image based on a broadcast signal, broadcast information, or broadcast data received from a transmitter of a broadcasting station.

Further, the display apparatus 22100 may display images, such as videos, still images, applications, OSDs based on signals or data received from various types of image sources (not shown), and GUIs for controlling various operations.

In the display system 221, the upgrade apparatus 22200 is connected to the display apparatus 22100 to communicate therewith. The upgrade apparatus 22200 upgrades existing hardware or software of the connected display apparatus 22100 and enables an image signal to be processed by the upgraded hardware or software of the display apparatus 22100, thereby displaying an image with improved quality.

Further, the upgrade apparatus 22200 may be connected to the display apparatus 22100 via wire or wirelessly and transmit and receive data, information, signals, or power with the display apparatus 22100.

Further, the upgrade apparatus 22200 may be configured as a mobile phone, a USB dongle, or a set-top box which is connectable to the display apparatus 22100 via wire or wirelessly.

The display apparatus 22100 may autonomously process an image signal received from the outside according to a preset image processing process and display an image based on the signal. However, in the present exemplary embodiment, as the display apparatus 22100 and the upgrade apparatus 22200 are connected to each other, hardware or software configurations of the display system 221 performing the above image processing process are upgraded. Accordingly, an image with relatively enhanced quality or an image with a newly added function may be provided to a user.

Hereinafter, configurations of the display apparatus 22100 and the upgrade apparatus 22200 will be described with reference to FIGS. 20 and 21.

As shown in FIG. 20, the display apparatus 22100 includes a signal input/output unit 22140 inputting/outputting at least one image signal, an image processing unit 22120 processing the image signal received through the signal input/output unit 22140, a display unit 22160 displaying an image based on the image signal processed by the image processing unit 22120, a user input unit 22170, the storage unit 22150 storing data or information, the connection unit 22130 connected to the upgrade apparatus 22200, and the controller 22110 controlling operations of all components of the display apparatus 22100.

The signal input/output unit 22140 transmits a received image signal to the image processing unit 22120 and is configured in various types in accordance with standards of received signals and formats of the image source and the display apparatus 22100. For example, the signal input/output unit 22140 may receive signals/data in accordance with HDMI, USB, and component standards and include a plurality of connection terminals (not shown) corresponding to the respective standards.

The image processing unit 22120 may perform various preset image processing processes on an image signal received from the signal input/output unit 22140. The image processing unit 22120 outputs a processed image signal to the display unit 22160, so that an image based on the image signal is displayed on the display unit 22160.

The image processing unit 22120 may perform any type of image processing, without being limited to, for example, demultiplexing to separate a signal into characteristic signals, decoding in accordance with an image format of an image signal, de-interlacing to convert an interlaced image signal into a progressive form, scaling to adjust an image signal to a preset resolution, noise reduction to improve image quality, detail enhancement, frame refresh rate conversion, or the like.

The image processing unit 22120 is provided as an image processing board (not shown) in which a circuit system including various chip sets (not shown), a memory (not shown), electronic components (not shown) and wiring (not shown) to conduct such processes is mounted on a printed circuit board (PCB, not shown).

The display unit 22160 displays an image based on an image signal output from the image processing unit 22120. The display unit 22160 may be configured in various display modes using liquid crystals, plasma, light emitting diodes, organic light emitting diodes, a surface conduction electron emitter, a carbon nano-tube, nano-crystals, or the like, without being limited thereto.

The display unit 22160 may further include an additional element depending on a display mode thereof. For example, in a display mode using liquid crystals, the display unit 22160 may include a liquid crystal display (LCD) panel, a backlight unit (not shown) providing light to the panel, and a panel drive board (not shown) driving the panel.

The user input unit 22170 transmits various preset control commands or unlimited information to the controller 22110 by a user's manipulation and input. The user input unit 22170 may be provided as a menu key and an input panel installed on an outside of the display apparatus 22100 or as a remote controller separate from the display apparatus 22100.

Alternatively, the user input unit 22170 may be configured as a single body with the display unit 22160. That is, if the display unit 22160 is a touch screen, a user may transmit a preset command to the controller 22110 through an input menu (not shown) displayed on the display unit 22160.

The storage unit 22150 may store unlimited data according to control of the controller 22110. The storage unit 22150 may be configured as a non-volatile memory, such as a flash memory and a hard disk drive. The storage unit 22150 is accessible by the controller 22110, and the data stored in the storage unit 22150 may be read, recorded, revised, deleted, or updated by the controller 22110.

The storage unit 22150 may store, for example, an operating system to run the display apparatus 22100 and various applications, image data, and optional data which are executable in the operating system.

Further, the storage unit 22150 may store information on a control of the controller 22110 on an operation of the upgrade apparatus 22200 when the upgrade apparatus 22200 is connected.

The connection unit 22130 may be configured as a connection port in accordance with HDMI, USB or component standards or LVDS standard for communication with the upgrade apparatus 22200.

The connection unit 22130 may be provided in any type and form, without being limited to the foregoing examples, as long as it is configured to enable the display apparatus 22100 and the upgrade apparatus 22200 to communicate at least one of data, a signal, information, and power with each other.

Further, the connection unit 22130 may include a plurality of terminals to be connected to a plurality of upgrade apparatuses 22200 having different upgraded functions.

The controller 22110 performs control operations over various components of the display apparatus 22100. For example, the controller 22110 conducts image processing in charge of the image processing unit 22120, transmission/reception operations of signals, information, or data through the connection unit 22130, and a control operation corresponding to a command from the user input unit 22170, thereby controlling the general operations of the display apparatus 22100.

Further, the controller 22110 may include a microcomputer (not shown) to adjust a control range of the controller 22100 corresponding to an operation of the upgrade apparatus 22200 when the upgrade apparatus 22200 is connected to the connection unit 22130.

That is, the microcomputer may communicate with the upgrade apparatus 22200 and assign the control to the upgrade apparatus 22200 or allow the controller 22110 to hold the control with respect to each operation based on the information stored in the storage unit 22150.

Accordingly, the controller 22110 may control a received image signal to be processed by the upgrade apparatus 22200 when the upgrade apparatus 22200 is connected to the connection unit 22130.

Furthermore, the controller 22110 may control the image processing unit 22120 to conduct first image processing on a received image signal and enable the upgrade apparatus 22200 to conduct second image processing on a processed first image.

In addition, the controller 22110 may control the image processing unit 22120 to receive a second image processed by the upgrade apparatus 22200 and to conduct third image processing on the second image.

Also, the controller 22110 may control the display unit 22160 to receive an image signal processed by the upgrade apparatus 22200 and to display the received image signal.

Moreover, the controller 22110 may control the display unit 22160 to receive an image signal processed by the upgrade apparatus 22200 and to display the received image signal via follow-up image processing processes by the image processing unit 22120.

Further, the controller 22110 may assign the control to the upgrade apparatus 22200 so that the image processing unit 22120 processes a received image signal according to control of the upgrade apparatus 22200.

In addition, the controller 22110 may control the display unit 22160 to receive an image signal received and processed by the upgrade apparatus 22200 and to display an image based on the received image signal.

Upgrading the display apparatus 22100 having the foregoing configuration is necessary for various cases, for example, to receive an image signal in a new format which is not proposed when the display apparatus 22100 is first manufactured, to receive an image signal with a higher level than supported solely by the display apparatus 22100, or to reduce system load of the display apparatus 22100.

Upgrading the display apparatus 22100 may be carried out in terms of hardware and software. In the present exemplary embodiment, the upgrade apparatus 22200 provided to upgrade the display apparatus 22100 is connected to the connection unit 22130, thereby upgrading at least one of the existing hardware and software configurations of the display apparatus 22100.

The upgrade apparatus 22200 includes hardware or software configurations corresponding to at least part of the hardware or software resources of the display apparatus 22100. These hardware or software configurations of the upgrade apparatus 22200 are provided to perform more improved functions than the at least part of the resources of the display apparatus 22100. Thus, when the upgrade apparatus 22200 is connected to the display apparatus 22100, the display apparatus 22100 may provide an image with more improved quality than that solely realized by the display apparatus 22100.

Hereinafter, the configuration of the upgrade apparatus 22200 will be described.

The upgrade apparatus 22200 includes a connection unit 22230 connected to the connection unit 22130 of the display apparatus 22100, an image processing unit 22220 capable of replacing an image processing process of the image processing unit 22120 or performing processes corresponding to at least part of the image processing processes of the image processing unit 22120, a storage unit 22250 storing unlimited data or information, a signal input/output unit 22240 inputting/outputting an image signal, and a controller 22210 controlling general operations of the upgrade apparatus 22200.

The connection unit 22230 is connected to the connection unit 22130, thereby enabling communication between the upgrade apparatus 22200 and the display apparatus 22100. The connection unit 22230 may be connected to the connection unit 22130 via wire or wirelessly. The connection unit 22230 may be connected to the connection unit 22130 in various methods, without being particularly limited.

The image processing unit 22220 may perform image processing instead of the image processing unit 22120 of the display apparatus 22100 or perform part of all image processing processes performed by the image processing unit 22120 instead. The image processing processes performed by the image processing unit 22220 instead of the image processing unit 22120 include a function upgraded from a function of the image processing unit 22120 of the display apparatus 22100 or an additional function which the image processing unit 22120 is not capable of performing and are achieved by upgrading hardware, such as a chip set, or software, such as algorithms, executable codes, or programs.

For example, the image processing unit 22220 processes an image signal with high resolution or an image signal in a format which the image processing unit 22120 cannot handle.

The storage unit 22250 stores unlimited data. The storage unit 22250 is configured as a nonvolatile memory, such as a flash memory and a hard disk drive. The storage unit 22250 is accessed by the controller 22110 of the display apparatus 22100 or the controller 22210, and the data stored in the storage unit 22250 is read, recorded, revised, deleted, or updated by controller 22110 or controller 22210. Meanwhile, the storage unit 22150 may also be accessed by not only the controller 22110 but the controller 22210 depending on a configuration thereof.

Further, when an operating system stored in the storage unit 22250 is a more upgraded version than the operating system stored in the storage unit 22150, the operating system of the storage unit 22150 may be updated to the operating system of the storage unit 22250 to run the updated operating system, or the operating system of the storage unit 22250 may be run instead of the operating system of the storage unit 22150.

Further, the storage unit 22250 stores information corresponding to the information associated with assigning control priority stored in the storage unit 22150 of the display apparatus 22100. Accordingly, the control priority between the controller 22110 and controller 22210 may be adjusted using communication with the display apparatus 22100.

The signal input/output unit 22240 transmits a received image signal to the image processing unit 22220 and is configured in various types in accordance with standards of received signals and formats of the image source and the display apparatus 22100. For example, the signal input/output unit 22240 may receive signals or data in accordance with HDMI, USB, and component standards and include a plurality of connection terminals (not shown) corresponding to the respective standards.

Further, the signal input/output unit 22240 may include an input unit for an image signal in a new format which the signal input/output unit 22140 of the display apparatus 22100 cannot receive.

The controller 22210 controls a connection operation of the display apparatus 22100 and the upgrade apparatus 22200 for performing the general image processing processes.

Further, the controller 22210 may include a microcomputer (not shown) to communicate with the controller 22110 of the display apparatus 22100 when the display apparatus 22100 is connected to the connection unit 22230.

The controller 22210 and the controller 22110 may be configured as a CPU. Thus, if the controller 22210 performs a more improved function than the controller 22110, the controller 22210 may disable the controller 22110 and control general operations of the display system 221 instead of the controller 22110. Alternatively, the controller 22210 may control the general operations of the display system 221 together with the controller 22110.

Further, the controller 22210 communicates with the display apparatus 22100 and may be assigned a control with respect to each operation based on the information stored in the storage unit 22250.

Accordingly, the controller 22210 may control an image signal to be processed by the image processing unit 22220.

In addition, the controller 22210 may control the processed image signal to be transmitted to the display apparatus 22100 and displayed on the display unit 22160.

Hereinafter, a control method of the display apparatus 22100 according to an exemplary embodiment will be described with reference to FIG. 22.

Figure 22:
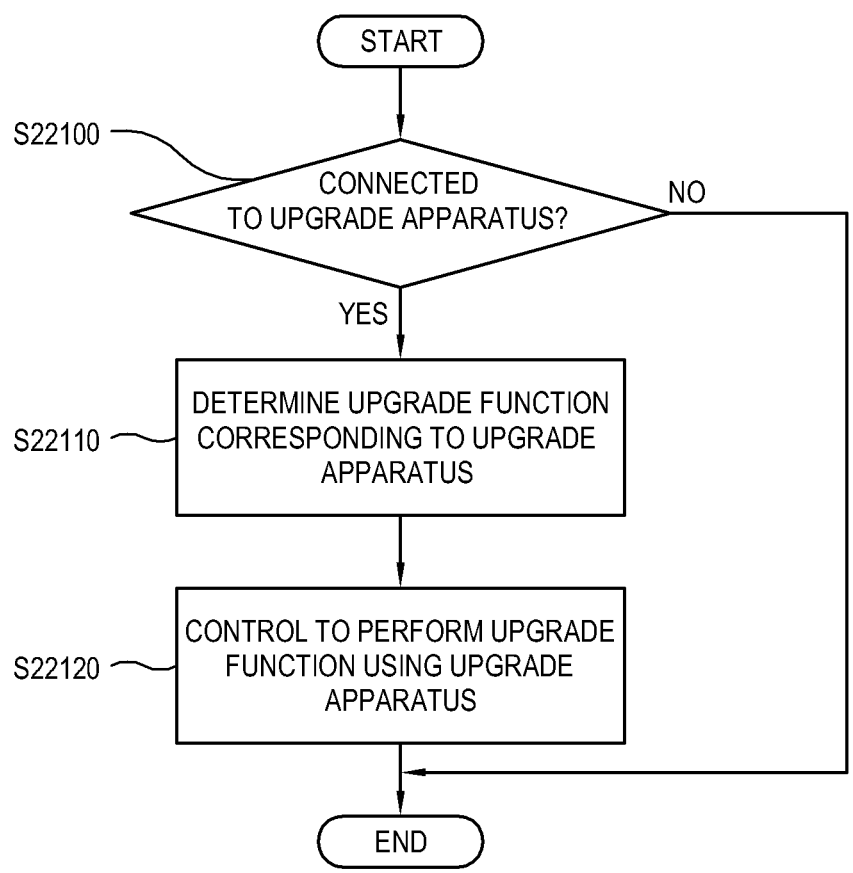
FIG. 22 is a flowchart illustrating a control method of a display apparatus according to an exemplary embodiment.

As shown in FIG. 22, the controller 22110 detects whether the upgrade apparatus 22200 is connected to the display apparatus 22100 through the connection unit 22130 of the display apparatus 22100 (S22100).

When the upgrade apparatus 22200 is not connected to the display apparatus 22100, the controller 22110 controls all operations of the display apparatus 22100 according to a preset process.

When the upgrade apparatus 22200 is connected to the display apparatus 22100, the controller 22110 determines at least one function of the display apparatus 22100 to be upgraded corresponding to the upgrade apparatus 22200 (S22110).

For example, among image processing processes, such as demultiplexing to separate a signal into an image signal, an audio signal and optional data, decoding the demultiplexed image signal into an image format, and scaling the decoded image signal to a preset resolution, a decoding process is determined The controller 22110 controls the upgraded function to be performed using the upgrade apparatus 22200 (S22120).

For example, the controller 22110 controls the determined decoding process to be conducted by the image processing unit 22220 of the upgrade apparatus 22200.

Further, the controller 22110 may control the display unit 22160 to receive and display an image signal processed by the upgrade apparatus 22200.

In addition, the controller 22110 may determine all functions with respect to the image processing processes and assign a control to the upgrade apparatus 22200, so that a received image signal may be processed overall by the upgrade apparatus 22200.

Hereinafter, a control method of the upgrade apparatus 22200 according to an exemplary embodiment will be described with reference to FIG. 23.

Figure 23:
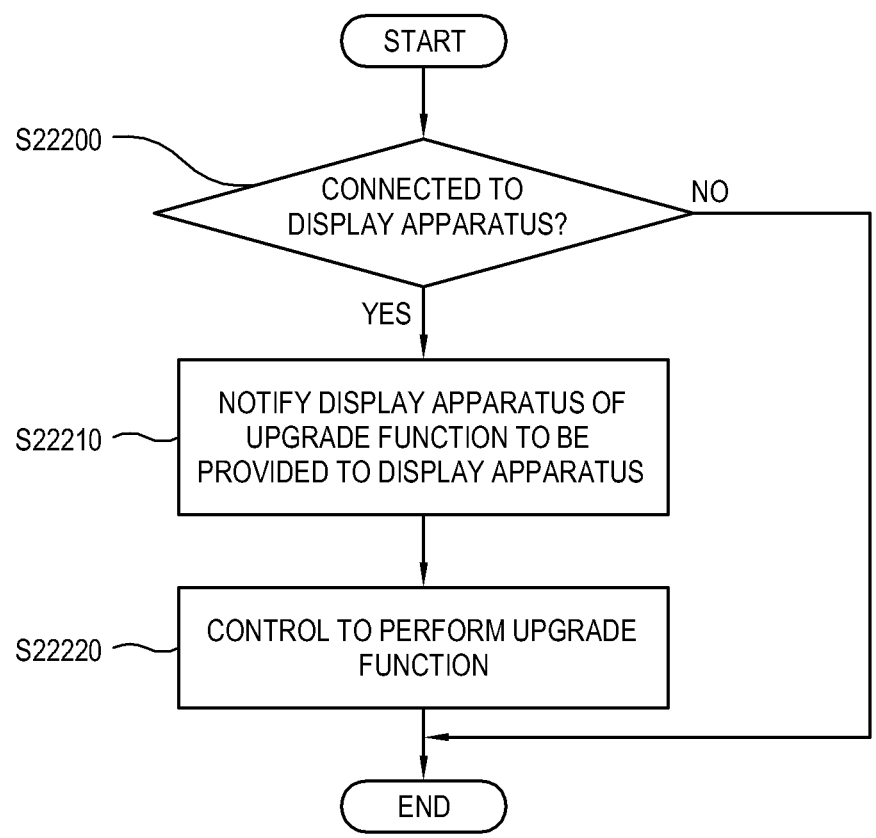
FIG. 23 is a flowchart illustrating a control method of an upgrade apparatus according to an exemplary embodiment.

As shown in FIG. 23, the controller 22210 detects whether the display apparatus 22100 is connected to the upgrade apparatus 22200 through the connection unit 22230 (S22200).

When the display apparatus 22100 is connected, the controller 22210 notifies the display apparatus 22100 of at least one upgraded function to be provided to the display apparatus 22100 (S22210).

The controller 22210 controls the at least one upgraded function to be conducted (S22220).

Here, the controller 22210 may be assigned a control from the controller 22110 of the display apparatus 22100 in order to conduct the upgraded function.

For example, the controller 22210 may control the received image signal to be partly or entirely processed by the image processing unit 22220.

Then, the controller 22210 may transmit the processed image signal by the image processing unit 22220 to the display apparatus so that an image based on the image signal is displayed on the display unit 22160.

Hereinafter, control operations of the controller 22110 and the controller 22210 when the display apparatus 22100 and the upgrade apparatus 22200 are connected according to exemplary embodiments will be described with reference to FIG. 24.

FIG. 24(*a*) illustrates the controller 22210 of the upgrade apparatus 22200 is assigned a control from the display apparatus 22100 to conduct general control.

For example, when the display apparatus 22100 and the upgrade apparatus 22200 are connected, the controller 22210 is assigned a control over all received image signals to be processed by the image processing unit 22220 of the upgrade apparatus 22200 and may disable the controller 22110 and/or the image processing unit 22120 of the display apparatus 22100.

FIG. 24(*b*) illustrates the controller 22110 of the display apparatus 22100 and the controller 22210 of the upgrade apparatus 22200 performing control in combination.

For example, the controller 22110 may control the image processing unit 22120 to conduct first image processing on a received image signal, and the controller 22210 of the upgrade apparatus 22200 may receive the first-processed image signal and control the image processing unit 22220 to conduct second image processing on the image signal.

FIG. 24(*c*) illustrates the controller 22110 of the display apparatus 22100 performs main control and the controller 22210 of the upgrade apparatus 22200 performs sub-control.

For example, the controller 22110 of the display apparatus 22100 may control a received video signal to be processed by the image processing unit 22120 and to be displayed on the display unit 22160, and the controller 22210 of the upgrade apparatus 22200 may control the image processing unit 22220 to process a graphic image, such as a GUI, overlapping the video image displayed on the display apparatus 22100.

Alternatively, the controller 22210 of the upgrade apparatus 22200 may perform control depending on an instruction of the controller 22110 of the display apparatus 22100.

FIG. 24(*d*) illustrates the controller 22210 of the upgrade apparatus 22200 performs main control and the controller 22110 of the display apparatus 22100 performs sub-control, which is, for example, the reverse of FIG. 24(*c*).

Hereinafter, an image processing apparatus (display apparatus), an upgrade apparatus, and a display system according to still another exemplary embodiment will be described. In the present exemplary embodiment, descriptions of components which are the same as or similar to those of the image processing apparatuses 100 to 100*g*, the display apparatus 22100, the upgrade apparatuses 200 to 200*g* and 22200, and the display systems 1 to 1*g* and 221 described with reference to FIGS. 1 to 24 will be omitted herein.

Figure 25:
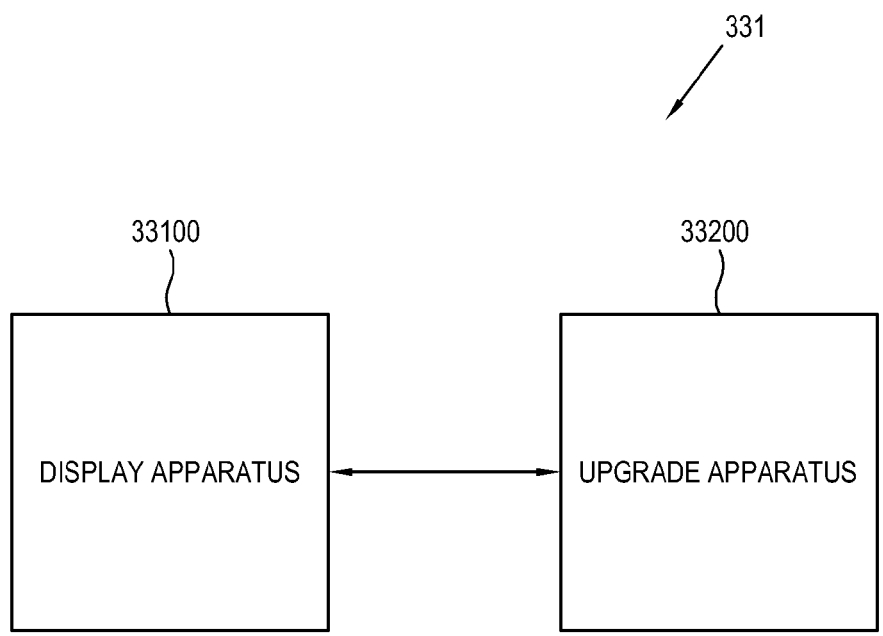
FIG. 25 is a block diagram of a display system according to an exemplary embodiment.

FIG. 25 is a block diagram of a display system 331 according to an exemplary embodiment. As shown in FIG. 25, the display system 331 according to the present exemplary embodiment includes a display apparatus 33100 processing an image signal provided from an external image source (not shown) according to a preset image processing process to display an image and an upgrade apparatus 33200 upgrading hardware or software of the display apparatus 33100.

The display apparatus 33100 may be configured as, for example, a TV, and may conduct an image displaying function of an external imaging device, a multimedia content reproducing function, and a network function. The display apparatus 33100 is connected to the upgrade apparatus 33200 to perform an upgraded function. Meanwhile, the upgrade apparatus 33200 may include an image processing unit more upgraded than an image processing unit of the display apparatus 33100. Alternatively, the upgrade apparatus 33200 may include a controller more upgraded than the controller of the display apparatus 33100.

The display apparatus 33100 may replace a function thereof with an upgraded function of the upgrade apparatus 33200 or perform a function thereof and a function of the upgrade apparatus 33200 in combination using the upgrade apparatus 33200.

The display apparatus 33100 may display a broadcast image based on a broadcast signal, broadcast information, or broadcast data received from a transmitter of a broadcasting station. Further, the display apparatus 33100 may display images, such as videos, still images, applications, OSDs based on signals or data received from various types of image sources (not shown), and GUIs for controlling various operations.

In the display system 331, the upgrade apparatus 33200 is connected to the display apparatus 33100 to communicate therewith. The upgrade apparatus 33200 upgrades existing hardware or software of the connected display apparatus 33100 and enables an image signal to be processed by the upgraded hardware or software of the display apparatus 33100, thereby displaying an image with improved quality.

Further, the upgrade apparatus 33200 may be connected to the display apparatus 33100 via wire or wirelessly and transmit and receive data, information, signals, or power with the display apparatus 33100.

The display apparatus 33100 may autonomously process an image signal received from the outside according to a preset image processing process and display an image based on the signal. However, in the present exemplary embodiment, as the display apparatus 33100 and the upgrade apparatus 33200 are connected to each other, hardware or software configurations of the display system 331 performing the above image processing process are upgraded. Accordingly, an image with relatively enhanced quality or an image with a newly added function may be provided to a user.

Hereinafter, configurations of the display apparatus 33100 and the upgrade apparatus 33200 will be described with reference to FIGS. 26 and 27.

Figure 26:
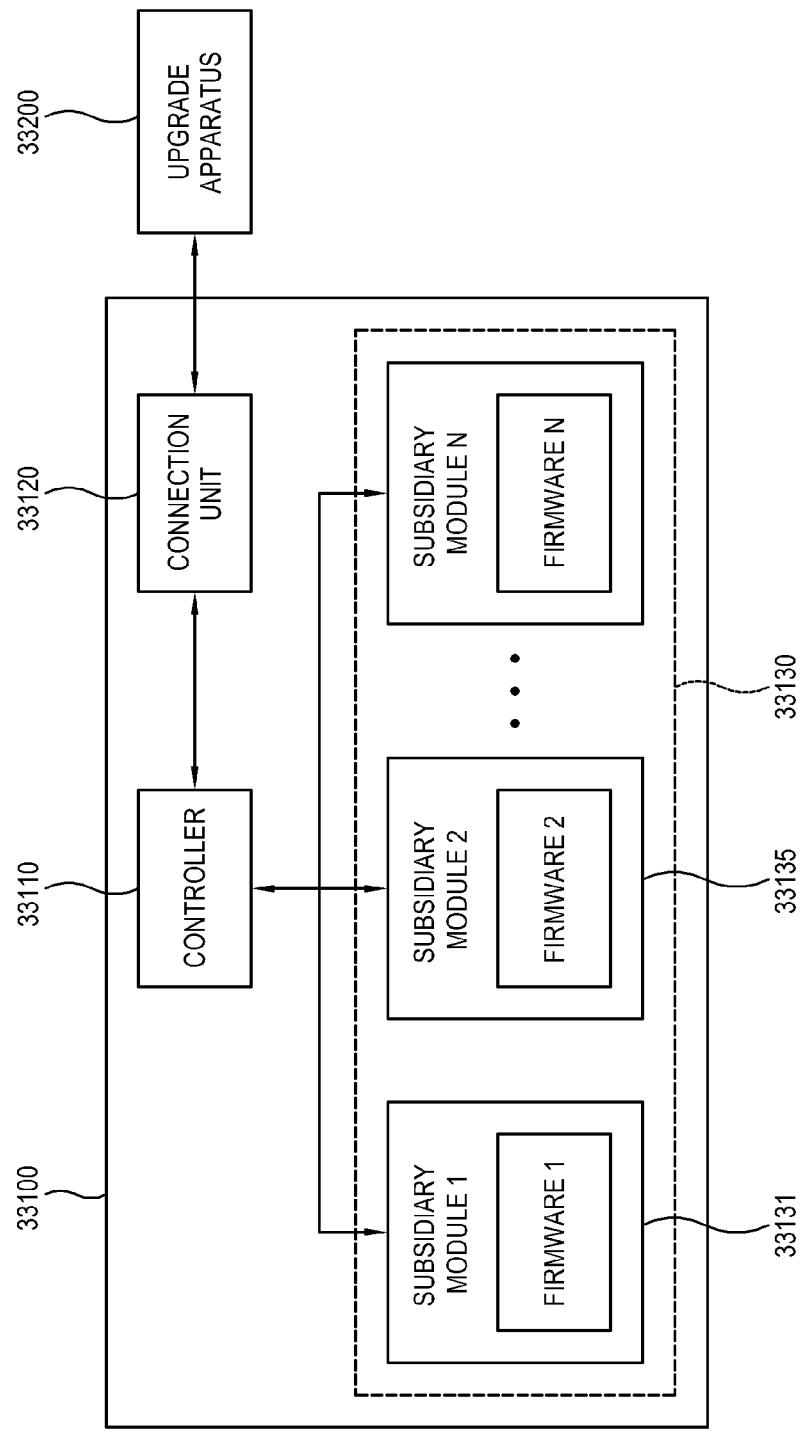
FIG. 26 is a block diagram illustrating a configuration of a display apparatus according to an exemplary embodiment.
Figure 27:
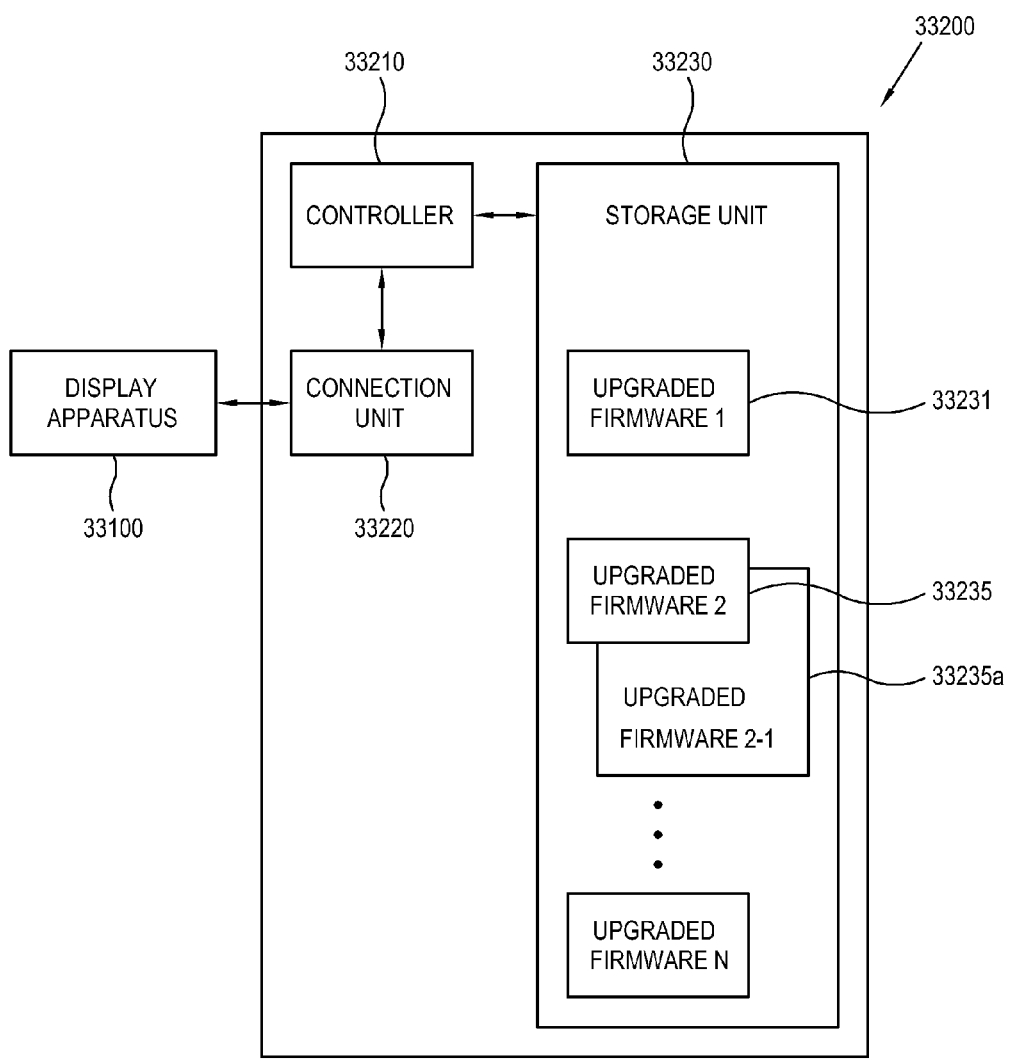
FIG. 27 is a block diagram of an upgrade apparatus according to an exemplary embodiment.

As shown in FIG. 26, the display apparatus 33100 includes at least one subsidiary modules 33130 each accommodating firmware, a connection unit 33120 connected to the upgrade apparatus 33200 storing at least one upgraded firmware corresponding to the at least one subsidiary module 33130, and a controller 33110 controlling operations of all components of the display apparatus 33100. FIG. 26 illustrates a plurality of subsidiary modules but is not limited thereto. For example, there can be a single subsidiary module.

Further, the display apparatus 33100 includes a signal input/output unit (not shown) inputting/outputting at least one image signal, an image processing unit (not shown) processing the image signal received through the signal input/output unit, a display unit (not shown) displaying an image based on the image signal processed by the image processing unit, a user input unit (not shown), and the storage unit (not shown) storing data or information.

The signal input/output unit transmits a received image signal to the image processing unit and is configured in various types in accordance with standards of received signals and formats of the image source and the display apparatus 33100. For example, the signal input/output unit may receive signals or data in accordance with HDMI, USB, and component standards and may include a plurality of connection terminals (not shown) corresponding to the respective standards.

The image processing unit may perform various preset image processing processes on an image signal received from the signal input/output unit. The image processing unit outputs a processed image signal to the display unit, so that an image based on the image signal is displayed on the display unit.

The image processing unit may perform any type of image processing, without being limited to, for example, demultiplexing to separate a signal into characteristic signals, decoding in accordance with an image format of an image signal, de-interlacing to convert an interlaced image signal into a progressive form, scaling to adjust an image signal to a preset resolution, noise reduction to improve image quality, detail enhancement, frame refresh rate conversion, or the like.

The image processing unit is provided as an image processing board (not shown) in which a circuit system including various chip sets (not shown), a memory (not shown), electronic components (not shown) and wiring (not shown) to conduct such processes is mounted on a printed circuit board (PCB, not shown).

The display unit displays an image based on an image signal output from the image processing unit. The display unit may be configured in various display modes using liquid crystals, plasma, light emitting diodes, organic light emitting diodes, a surface conduction electron emitter, a carbon nanotube, nano-crystals, or the like, without being limited thereto.

The user input unit transmits various preset control commands or unlimited information to the controller 33110 by user's manipulation and input. The user input unit may be provided as a menu key and an input panel installed on an outside of the display apparatus 33100 or as a remote controller separate from the display apparatus 33100.

Alternatively, the user input unit may be configured as a single body with the display unit. That is, if the display unit is a touch screen, a user may transmit a preset command to the controller 33110 through an input menu (not shown) displayed on the display unit.

The storage unit may store unlimited data according to control of the controller 33110. The storage unit may be configured as a non-volatile memory, such as a flash memory and a hard disk drive. The storage unit is accessible by the controller 33110, and the data stored in the storage unit may be read, recorded, revised, deleted, or updated by the controller 33110.

The storage unit may store, for example, an operating system to run the display apparatus 33100 and various applications, image data, and optional data which are executable in the operating system.

Further, the storage unit may store information on a control of the controller 33110 on an operation of the upgrade apparatus 33200 when the upgrade apparatus 33200 is connected.

The connection unit 33120 may be configured as a connection port in accordance with HDMI, USB or component standards or LVDS standard for communication with the upgrade apparatus 33200.

The connection unit 33120 may be provided in any type and form, without being limited to the foregoing examples, as long as it is configured to enable the display apparatus 33100 and the upgrade apparatus 33200 to communicate at least one of data, a signal, information, and power with each other.

The subsidiary modules 33130 each include a non-volatile memory (not shown) and firmware storing an operating system for an autonomous operation. For example, a subsidiary module 1 33131 includes firmware 1 for an operation of the subsidiary module 1, and a subsidiary module 2 33135 includes firmware 2 for an operation of the subsidiary module 2. These subsidiary modules may include, for example, a panel manipulation unit installed on an outside of the display apparatus 33100, a WiFi unit, a Multimedia over Internet Protocol (MoIP) or a remote controller connected to the display apparatus wirelessly.

The controller 33110 performs control operations over various components of the display apparatus 33100. For example, the controller 33110 conducts image processing by the image processing unit, transmission/reception operations of signals, information, or data through the connection unit 33120, and a control operation corresponding to a command from the user input unit, thereby controlling the overall operations of the display apparatus 33100.

Further, when the upgrade apparatus 33200 storing the at least one upgraded firmware corresponding to the subsidiary modules 33130 is connected to the connection unit 33120, the controller 33110 controls the subsidiary modules 33130 to be upgraded to the corresponding upgraded firmware.

The controller 33110 may assign the control to the upgrade apparatus 33200 and communicate with the upgrade apparatus 33200 so that the subsidiary modules 33130 are upgraded to the corresponding upgraded firmware by control of the upgrade apparatus 33200.

The controller 33110 controls each firmware accommodated in the subsidiary modules 33130 to be backed up in a storage unit of the upgrade apparatus 33200.

The controller 33110 may control the subsidiary modules 33130 to be upgraded based on a user selection input through the user input unit.

The display apparatus 33100 according to the present exemplary embodiment may include Extended Display Identification Data (EDID), and the controller 33110 may control the EDID of the display apparatus 331000 to be upgraded based on information on upgraded EDID included in the upgrade apparatus.

The upgrade apparatus 33200 includes hardware or software configurations corresponding to at least part of the hardware or software resources of the display apparatus 33100. These hardware or software configurations of the upgrade apparatus 33200 are provided to perform more improved functions than the at least part of the resources of the display apparatus 33100. Thus, when the upgrade apparatus 33200 is connected to the display apparatus 33100, the display apparatus 33100 may provide an image with more improved quality than that solely realized by the display apparatus 33100.

Hereinafter, the configuration of the upgrade apparatus 33200 will be described.

The upgrade apparatus 33200 includes a connection unit 33220 connected to the connection unit 33120 of the display apparatus 33100, a storage unit 33230, and a controller 33210 controlling general operations of the upgrade apparatus 33200.

The connection unit 33220 is connected to the connection unit 33120, thereby enabling communication between the upgrade apparatus 33200 and the display apparatus 33100. The connection unit 33220 may be connected to the connection unit 33120 via wire or wirelessly. The connection unit 33220 may be connected to the connection unit 33120 in various methods, without being particularly limited.

The connection unit 33220 may be configured as a connection port in accordance with HDMI, USB or component standards or LVDS standard for communication with the display apparatus 33100.

The connection unit 33220 may be provided in any type and form, without being limited to the foregoing examples, as long as it is configured to enable the upgrade apparatus 33200 and the display apparatus 33100 to communicate at least one of data, a signal, information, and power with each other.

The storage unit 33230 may be configured as a non-volatile memory, such as a flash memory and a hard disk drive. The storage unit 33230 is accessible by the controller 33110 of the display apparatus 33100 or the controller 33210, and the data stored in the storage unit may be read, recorded, revised, deleted, or updated by the controller 33110 and the controller 33210. Meanwhile, the storage unit 33230 may be also accessed not only by the controller 33110 but by the controller 33210 based on a configuration thereof.

The storage unit 33230 stores at least one upgraded firmware each corresponding to the subsidiary modules 33130 provided in the display apparatus 33100. For example, as shown in FIGS. 26 and 27, the storage unit 33230 may store upgraded firmware each corresponding to the firmware of the subsidiary modules 33130, such as an upgraded firmware 1 33231 corresponding to the subsidiary module 1 33131 and an upgraded firmware 2 33235 corresponding to the subsidiary module 2 33135.

Further, the storage unit 33230 may store a plurality of upgraded firmware in different versions corresponding to the subsidiary modules 33130. For example, as shown in FIG. 27, as upgraded firmware corresponding to the subsidiary module 2, different versions of the upgrade firmware 2 33235 and upgraded firmware 2-1 33235$a$ may be stored. Accordingly, there are provided a multiple-version upgrade function enabling replacement by properly upgraded firmware among a plurality of upgraded firmware corresponding to a subsidiary module.

Also, the storage unit 33230 may back up previous firmware before the subsidiary modules 33130 are upgraded to upgraded firmware.

The controller 33210 controls a connection operation of the display apparatus 33100 and the upgrade apparatus 33200 for performing an upgraded function.

When the upgrade apparatus 33220 is connected to the display apparatus 33100 including the subsidiary modules 33130, the controller 33210 is assigned the control from the display apparatus 33100 and controls the subsidiary modules to be upgraded by the upgraded firmware stored in the storage unit 33230.

Further, the controller 33210 may communicate with the display apparatus so that the subsidiary modules 33130 are upgraded by the display apparatus 33100 to upgraded firmware stored in the storage unit 33230.

In addition, the controller 33210 controls each firmware accommodated in the subsidiary modules 33130 to be backed up in the storage unit 33230.

Hereinafter, a control method of the display apparatus 33100 according to an exemplary embodiment will be described with reference to FIG. 28.

Figure 28:
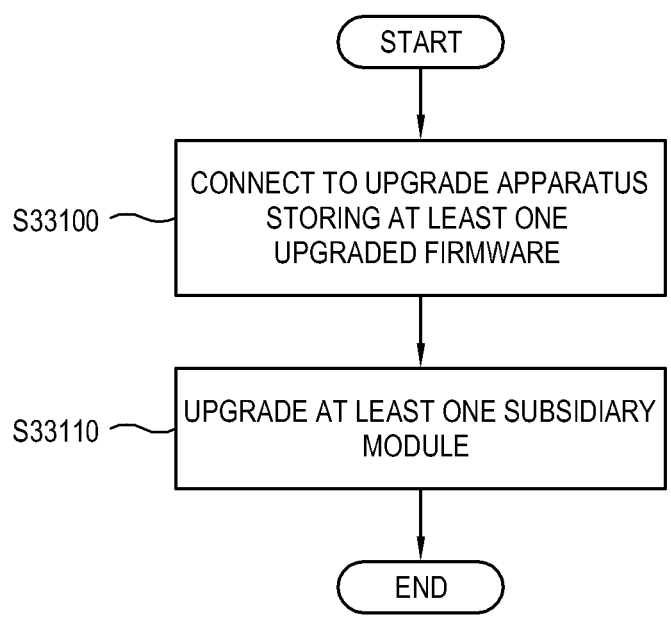
FIG. 28 is a flowchart illustrating a control method of a display apparatus according to an exemplary embodiment.

As shown in FIG. 28, the upgrade apparatus storing at least one upgraded firmware is connected to the connection unit 33120 of the display apparatus (S33100). Then, the subsidiary modules 33130 are controlled to be upgraded to upgraded firmware (S33110). Here, each firmware previously provided in the subsidiary modules 33130 are backed up in the upgrade apparatus. Further, upgrading the subsidiary modules 33130 to the upgraded firmware may be performed based on a user selection input through the user input unit.

Hereinafter, a control method of the upgrade apparatus 33200 according to an exemplary embodiment will be described with reference to FIG. 29.

Figure 29:
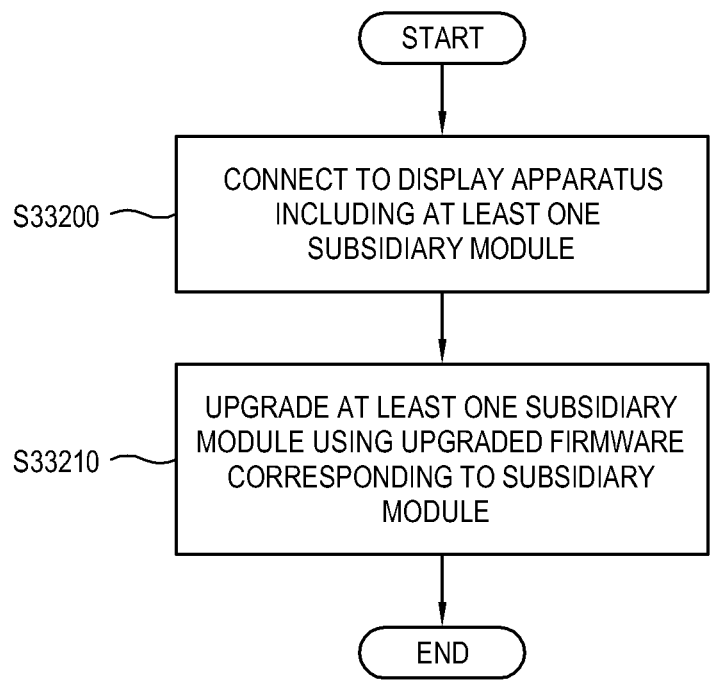
FIG. 29 is a flowchart illustrating a control method of an upgrade apparatus according to an exemplary embodiment.

As shown in FIG. 29, the display apparatus including the subsidiary modules 33130 accommodating firmware each corresponding to upgraded firmware stored in the storage unit 33230 is connected (S33200). Next, the controller 33210 is assigned the control from the display apparatus 33100 and controls the subsidiary modules 33130 to be upgraded to the upgraded firmware stored in the storage unit 33230 (S33210). Here, the controller 33210 controls each firmware previously provided in the subsidiary modules 33130 to be backed up in the storage unit 33230. Further, the controller 33210 may perform upgrading to the upgraded firmware based on a user selection.

Hereinafter, an image processing apparatus (display apparatus), an upgrade apparatus, and a display system according to another exemplary embodiment will be described. In the present exemplary embodiment, descriptions of components which are the same as or similar to those of the image processing apparatuses 100 to 100g, the display apparatuses 22100 and 33100, the upgrade apparatuses 200 to 200g, 22200 and 33200 and the display systems 1 to 1g, 221 and 331 described with reference to FIGS. 1 to 29 will be omitted herein.

Figure 30:
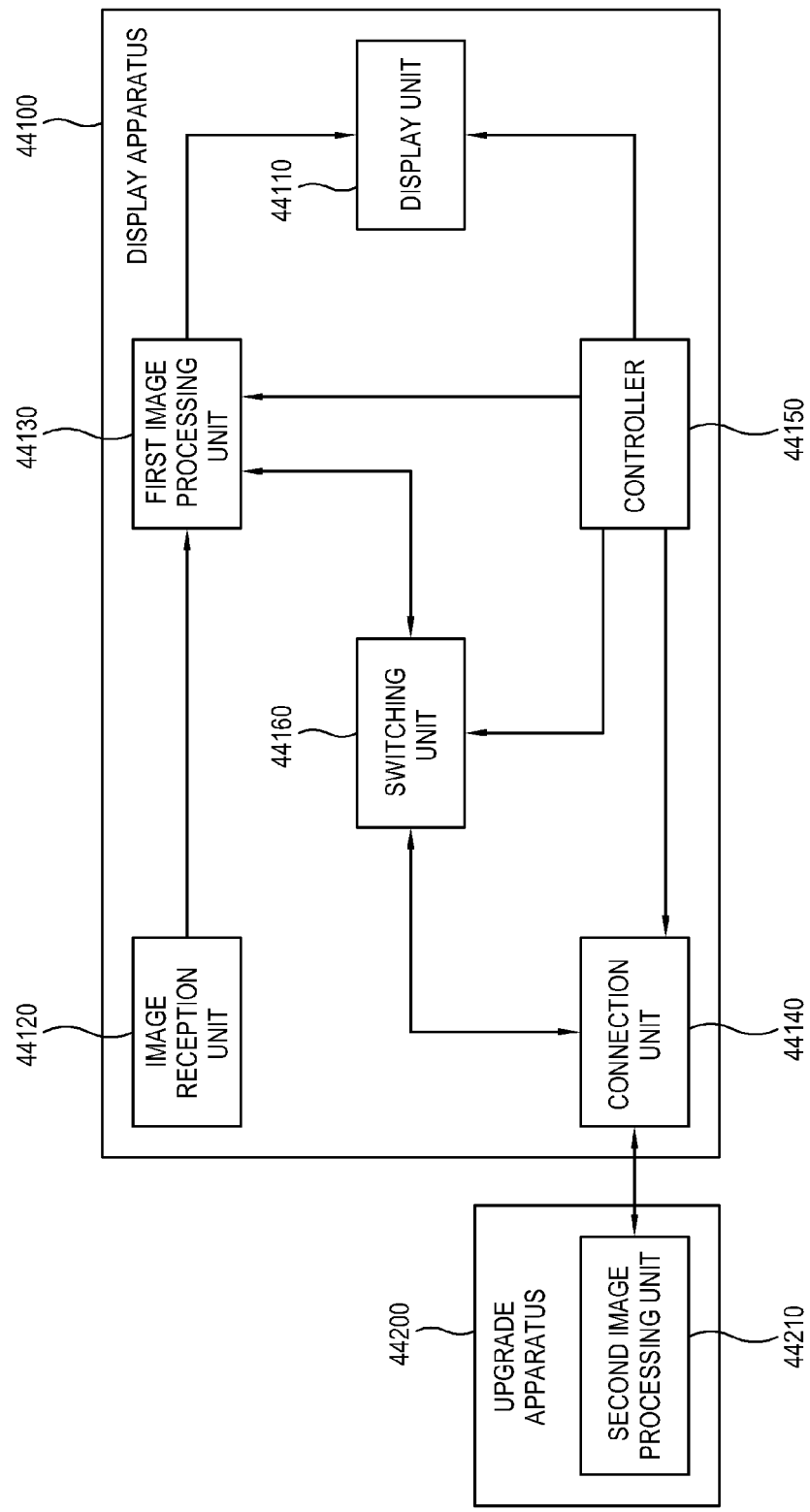
FIG. 30 is a block diagram of a display apparatus according to an exemplary embodiment.

FIG. 30 is a block diagram of a display apparatus 44100 according to an exemplary embodiment. As shown in FIG. 30, the display apparatus 44100 includes a display unit 44110, an image reception unit 44120, a first image processing unit 44130, a connection unit 44140, and a controller 44150. The display apparatus 44100 may be configured as a TV and can be any type of display apparatus capable of displaying an image.

The display unit 44110 displays an image. The display unit 44110 may be configured as a plasma display panel (PDP), a liquid crystal display (LCD), organic light emitting diodes (OLEDs), a flexible display, or the like.

The image reception unit 44120 receives an analog or digital image signal from an external image source (not shown). The image reception unit 44120 may be configured in various ways based on kinds or standards of image signals and configurations of the display apparatus 44100.

The first image processing unit 44130 performs various preset image processing processes on an image signal received by the image reception unit 44120. The image processing processes include, for example, conversion of an analog image signal to a digital image signal, demodulating to shift a frequency of an image signal to a baseband, decoding in accordance with image and audio formats, de-interlacing to convert an interlaced image signal into a progressive form, scaling to adjust an image signal to a preset resolution, and various types of color processing to adjust color of a displayed image. Hereinafter, various types of color processing will be illustrated as an image processing process, but the foregoing image processing processes may be also included.

The first image processing unit 44130 may include a plurality of first blocks each processing the plurality of image processing processes described above. The first image processing unit 44130 configured as the plurality of first blocks will be illustrated with reference to FIG. 31.

The connection unit 44140 is connected to an upgrade apparatus 44200 provided to upgrade the display apparatus 44100. The connection unit 44140 may be configured as a connector in accordance with HDMI, USB or component standards. The upgrade apparatus 44200 and the display apparatus 44100 may transmit and receive various signals through the connection unit 44140, and the display apparatus 44100 may provide power to the upgrade apparatus 44200. The connection unit 44140 is connected to a ground terminal. When the upgrade apparatus 44200 is connected to the connection unit 44140, the controller 44150 may detects an electrical signal by ground connection, thereby identifying that the upgrade apparatus 44200 is connected.

The connected upgrade apparatus 44200 includes a second image processing unit 44210 performing at least part of the plurality of image processing processes. The second image processing unit 44210 includes a plurality of second blocks respectively corresponding to the first blocks and each processing a plurality of image processing processes. The respective second blocks may perform functions corresponding to the image processing processes conducted by the first blocks of the first image processing unit 44130.

The upgrade apparatus 44200 includes the second blocks capable of performing enhanced image processing processes when the display apparatus 44100 is launched. Thus, part of the image processing processes is carried out by the upgrade apparatus 44200, thereby providing an enhanced image.

The controller 44150 controls general operations of the display apparatus 44100 and may be configured as a microprocessor, such as a central processing unit (CPU) and a micro-control unit (MCU).

The controller 44150 identifies whether the upgrade apparatus 44200 is connected through the connection unit 44140. When the upgrade apparatus 44200 is connected, the controller 44150 checks which image processing process the second image processing unit 44210 of the upgrade apparatus 44200 can perform. As described above, the first image processing unit 44130 includes the plurality of first blocks, and the controller 44150 identifies whether the second image processing unit 44210 includes second blocks corresponding to the respective first blocks, thereby identifying whether the second image processing unit 44210 of the upgrade apparatus 44200 is able to perform an image processing process carried out by a particular first block.

When it is determined that the second image processing unit 44210 includes a second block corresponding to the particular first block, the controller 44150 controls a particular image processing process to be performed either by the first block or by the second block.

The display apparatus 44100 may include a plurality of switching units 44160 respectively connected to the first blocks and to the second blocks respectively corresponding to the first blocks to transmit a signal to either of the first blocks and the second blocks. The switching units 44160 may be configured as a demultiplexer (deMUX) and switches to transmit the signal selectively to either of the first blocks and the second blocks to process the image processing process according to control of the controller 44150. For example, as shown in FIG. 31, the switching unit 44160 includes demultiplexer 44161, demultiplexer 44163, demultiplexer 44165 and demultiplexer 44167.

Although the upgrade apparatus 44200 is provided to upgrade a function of the display apparatus 44100, an image processing process is not necessarily conducted by the second image processing unit 44210 of the upgrade apparatus 44200. All second blocks may be used based on a presetting of the upgrade apparatus 44200, or any one of a first block and a corresponding second block may be selected by a user.

Figure 31:
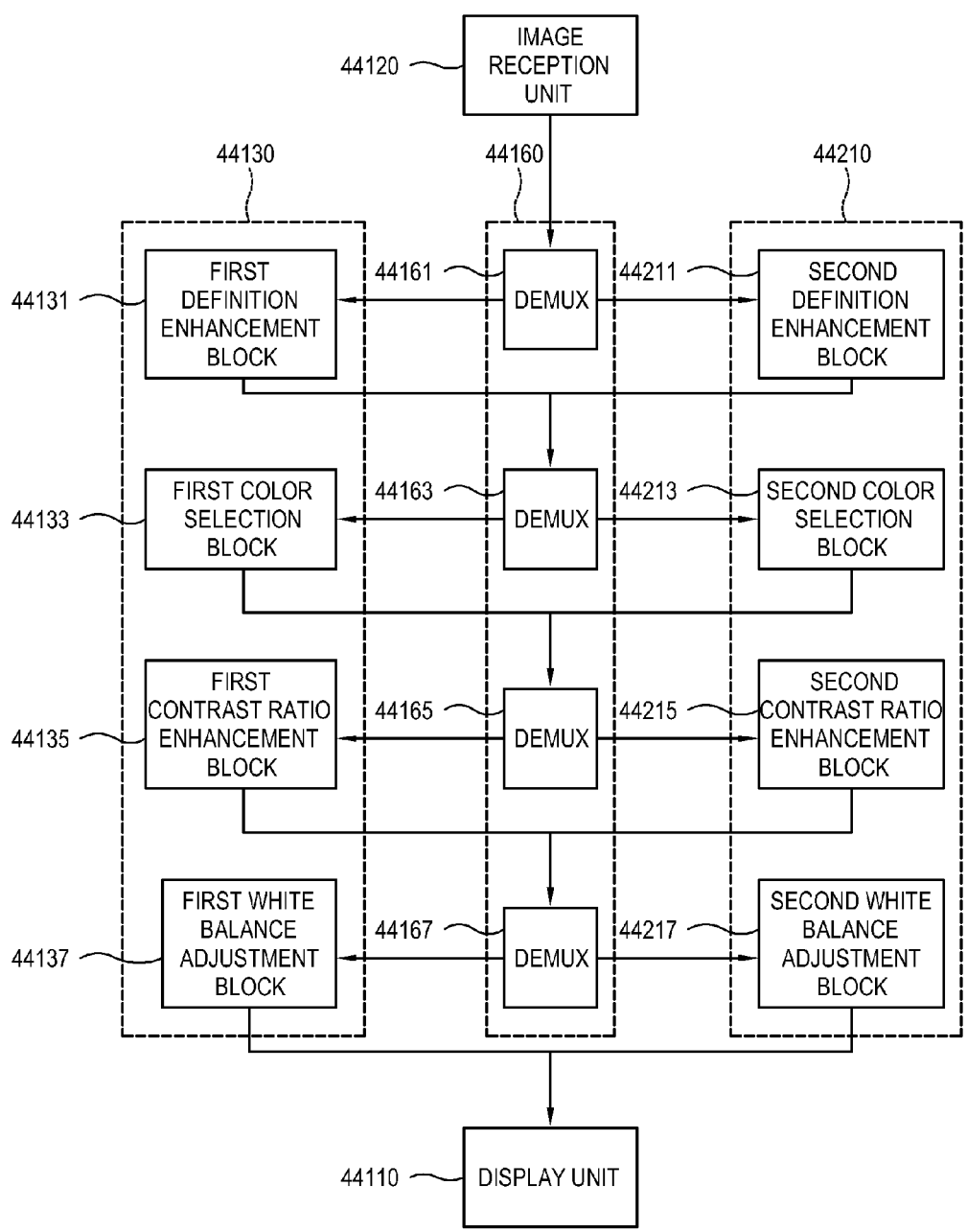
FIG. 31 illustrates a first image processing unit and a second image processing unit according to an exemplary embodiment.

FIG. 31 illustrates the first image processing unit 44130 and the second image processing unit 44210 in detail.

FIG. 31 illustrates only part of the image processing processes carried out by the display apparatus 44100 and the upgrade apparatus 44200, and the present exemplary embodiment may be applied to various other image processing processes known in the art.

As shown in FIG. 31, the first image processing unit 44130 may include a plurality of first blocks 44131, 44133, 44135 and 44137, that is, a first definition enhancement block 44131, a first color selection block 44133, a first contrast ratio enhancement block 44135 and a first white balance adjustment block 44137. The first blocks, the first definition enhancement block 44131, the first color selection block 44133, the first contrast ratio enhancement block 44135 and the first white balance adjustment block 44137 are classified blocks performing similar image processing processes and each may include at least one sub-block (not shown). For example, the first definition enhancement block 44131 may include a dejagging block to smooth a straight line or a curve of an image and a detail enhancement block to improve definition by strengthening a particular frequency component, and the first contrast ratio enhancement block 44135 may include a contrast enhancement block, a white stretch block and a black stretch block.

The second image processing unit 44210 may include a plurality of second blocks 44211, 44213, 44215 and 44217, that is, a second definition enhancement block 44211, a second color selection block 44213, a second contrast ratio enhancement block 44215 and a second white balance adjustment block 44217. The second blocks, the second definition enhancement block 44211, the second color selection block 44213, the second contrast ratio enhancement block 44215 and the second white balance adjustment block 44217, corresponding to the first blocks, the first definition enhancement block 44131, the first color selection block 44133, the first contrast ratio enhancement block 44135 and the first white balance adjustment block 44137 are not necessarily included, and a part thereof may be included.

An image signal received by the image reception unit 44120 is input to a first demultiplexer 44161 via A/D conversion. The controller 44150 controls the input image signal to be output either to the first definition enhancement block 44131 or to the second definition enhancement block 44211 based on a presetting or a user selection, and the block which receives the output signal performs an image processing process for definition enhancement.

After definition enhancement processing, the image signal is output to a second demultiplexer 44163, and then output to the first color selection block 44133 or the second color selection block 44213 according to control of the controller 44150.

After a plurality of image processing processes, the image signal is finally output to the display unit 44110. As described above, FIG. 31 illustrates part of the image processing processes only, and it is obvious that the image signal received from the image reception unit 44120 may need to go through a series of image processing processes other than those shown in FIG. 31 to be finally displayed on the display unit 44110.

According to the display apparatus 44100, at least part of the image processing processes is performed by the external upgrade apparatus 44200 connected to the display apparatus 44100, thereby carrying out enhanced image processing processes without replacement of hardware of the display apparatus 44100.

Figure 32:
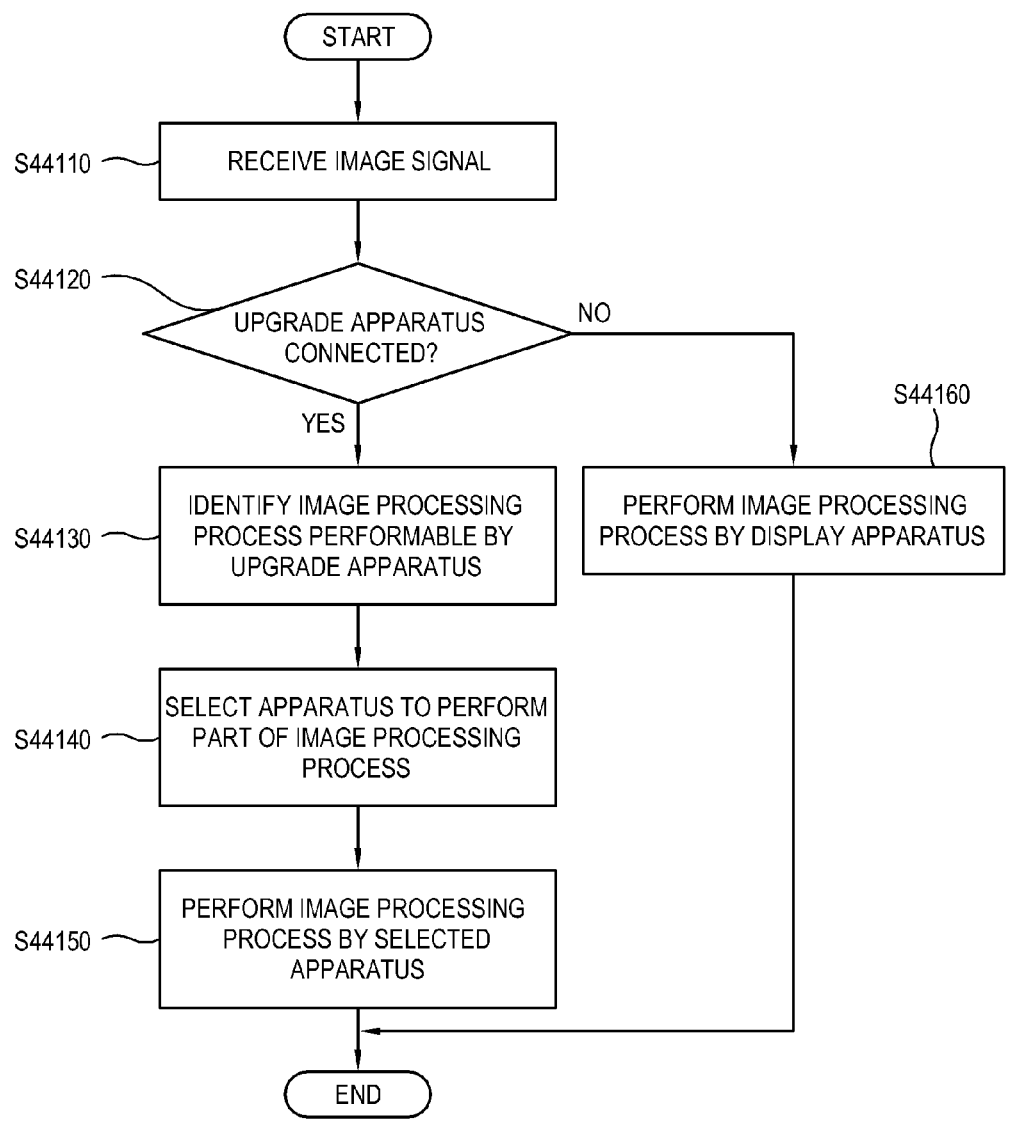
FIG. 32 is a flowchart illustrating a control method of a display apparatus according to an exemplary embodiment.

FIG. 32 is a flowchart illustrating a control method of the display apparatus 44100 according to an exemplary embodiment.

The display apparatus 44100 may be configured as any types capable of displaying an image including a TV and can be connected to the upgrade apparatus 44200 to exchange data.

The display apparatus 44100 receives an analog or digital image signal from an external image source (not shown) (S44110).

The display apparatus 44100 identifies whether the upgrade apparatus 44200 is connected to the display apparatus 44100 (S44120). The connection unit 44140 connected to the upgrade apparatus 44200 is connected to the ground terminal. Thus, when the upgrade apparatus 44200 is connected, an electrical signal by ground connection is detected, thereby identifying whether the upgrade apparatus 44200 is connected.

The display apparatus 44100 may include a plurality of first blocks performing a plurality of image processing processes, respectively, and the upgrade apparatus 44200 may include a plurality of second blocks respectively corresponding to the first blocks and performing part of the image processing processes. The received image signal is processed according to a predetermined image processing process, and the respective second blocks may perform functions corresponding to the image processing processes conducted by the first blocks.

When the upgrade apparatus 44200 is not connected, all image processing processes are conducted by the display apparatus 44100 (S44160).

When the upgrade apparatus 44200 is connected, the display apparatus 44100 identifies an image processing process that the upgrade apparatus 44200 is able to perform (S44130). Here, the display apparatus 44100 checks whether the upgrade apparatus 44200 includes second blocks corresponding to the respective first blocks, thereby identifying an image processing process that the upgrade apparatus 44200 is able to perform.

When the upgrade apparatus 44200 is capable of performing a particular image processing process, an apparatus to perform the process is selected among the display apparatus 44100 and the upgrade apparatus 44200 (S44140). That is, any one of a first block and a corresponding second block is selected. In this case, the display apparatus 44100 may include a plurality of switching units respectively connected to the first blocks and the second blocks respectively corresponding to the first blocks to transmit a signal to either of the first blocks and the second blocks, which has been described above with reference to FIG. 31.

According to a selection result, any one of the display apparatus 44100 and the upgrade apparatus 44200 performs the image processing process (S44150). In this case, regarding selection of an apparatus, all second blocks may be used based on a presetting of the upgrade apparatus 44200, or any one of the first blocks and the corresponding second blocks may be selected based on a user selection.

According to the control method of the display apparatus 44100, at least part of the image processing processes is carried out by the external upgrade apparatus 44200 connected to the display apparatus 44100, thereby carrying out enhanced image processing processes without replacement of hardware of the display apparatus 44100.

Hereinafter, an image processing apparatus (display apparatus), an upgrade apparatus, and a display system according to another exemplary embodiment will be described. In the present exemplary embodiment, descriptions of components which are the same as or similar to those of the image processing apparatuses 100 to 100g, the display apparatuses 22100, 33100 and 44100, the upgrade apparatuses 200 to 200g, 22200, 33200 and 44200, and the display systems 1 to 1g, 221 and 331 described with reference to FIGS. 1 to 32 will be omitted herein.

Figure 33:
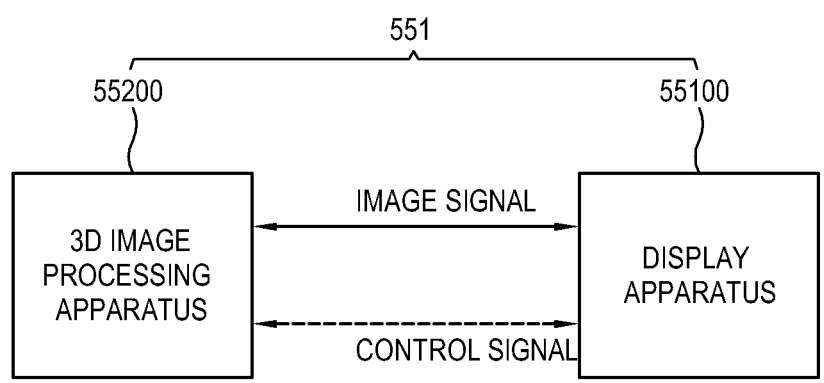
FIG. 33 is a block diagram illustrating a configuration of a display system according to an exemplary embodiment.

FIG. 33 is a block diagram illustrating a configuration of a display system 551 according to an exemplary embodiment. As shown in FIG. 33, the display system 551 includes a display apparatus 55100 and a three-dimensional (3D) image processing apparatus 55200. The display apparatus 55100 and the 3D image processing apparatus 55200 are connected to communicate with each other.

The display apparatus 55100 and the 3D image processing apparatus 55200, which are connected to each other, transmit and receive an image signal, such as a broadcast signal, and a control signal including various types of data and power.

The display apparatus 55100 processes an image signal provided from an external image source (not shown) according to a preset image processing process to display an image. Here, the display apparatus 55100 processes a two-dimensional (2D) image signal to display a 2D image.

In the display system 551 according to the present exemplary embodiment, the display apparatus 55100 is configured as a TV which displays a broadcast image based on a broadcast signal, broadcast information, or broadcast data received from a transmitter of a broadcasting station. However, the display apparatus 55100 may be configured as any type of device which is capable of displaying an image, without being limited to a TV.

Further, the display apparatus 55100 may display any type of image, without being limited to a broadcast image. For example, the display apparatus 55100 may display images, such as videos, still images, applications, on-screen display (OSD) based on signals or data received from various types of image sources (not shown), and GUIs for controlling various operations.

The 3D image processing apparatus 55200 is connected to the display apparatus 55100 to communicate therewith. The 3D image processing apparatus 55200 upgrades existing hardware or software of the connected display apparatus 55100 for 3D display and enables an image signal to be processed by the upgraded hardware or software of the display apparatus 55100, thereby displaying a 3D image.

For example, the 3D image processing apparatus 55200 may be a device to upgrade hardware of a TV, such as an image processing circuit, for 3D display and be detachable from the display apparatus 55100.

Meanwhile, unlike in the present exemplary embodiment, the 3D image processing apparatus 55200 may be connected to the display apparatus 55100 wirelessly. In this case, the 3D image processing apparatus 55200 may be supplied with operation power from a separate external power source or battery. However, the present exemplary embodiment will be described with reference to the 3D image processing apparatus 55200 connected to the display apparatus 55100 via wire.

The display apparatus 55100 may solely process an image signal received from the outside according to a preset image processing process to display an image.

According to the present exemplary embodiment, as the 3D image processing apparatus 55200 is connected to the display apparatus 55100, hardware or software configurations of the display system 551 performing the above image processing process are upgraded. The 3D image processing apparatus 55200 receives an image signal from the display apparatus 55100, processes the image signal into a 3D image signal, and transmits the processed image signal to the display apparatus 55100. The display apparatus 55100 displays a 3D image corresponding to the 3D image signal received from the 3D image processing apparatus 55200.

In another exemplary embodiment, the 3D image processing apparatus 55200 may receive an image signal, processes the image signal into a 3D image signal, and transmits the processed image signal to the display apparatus 55100. The display apparatus 55100 displays a 3D image corresponding to the 3D image signal received from the 3D image processing apparatus 55200.

Accordingly, the display apparatus 55100 supporting 2D display may also provide a 3D image to a user.

Figure 34:
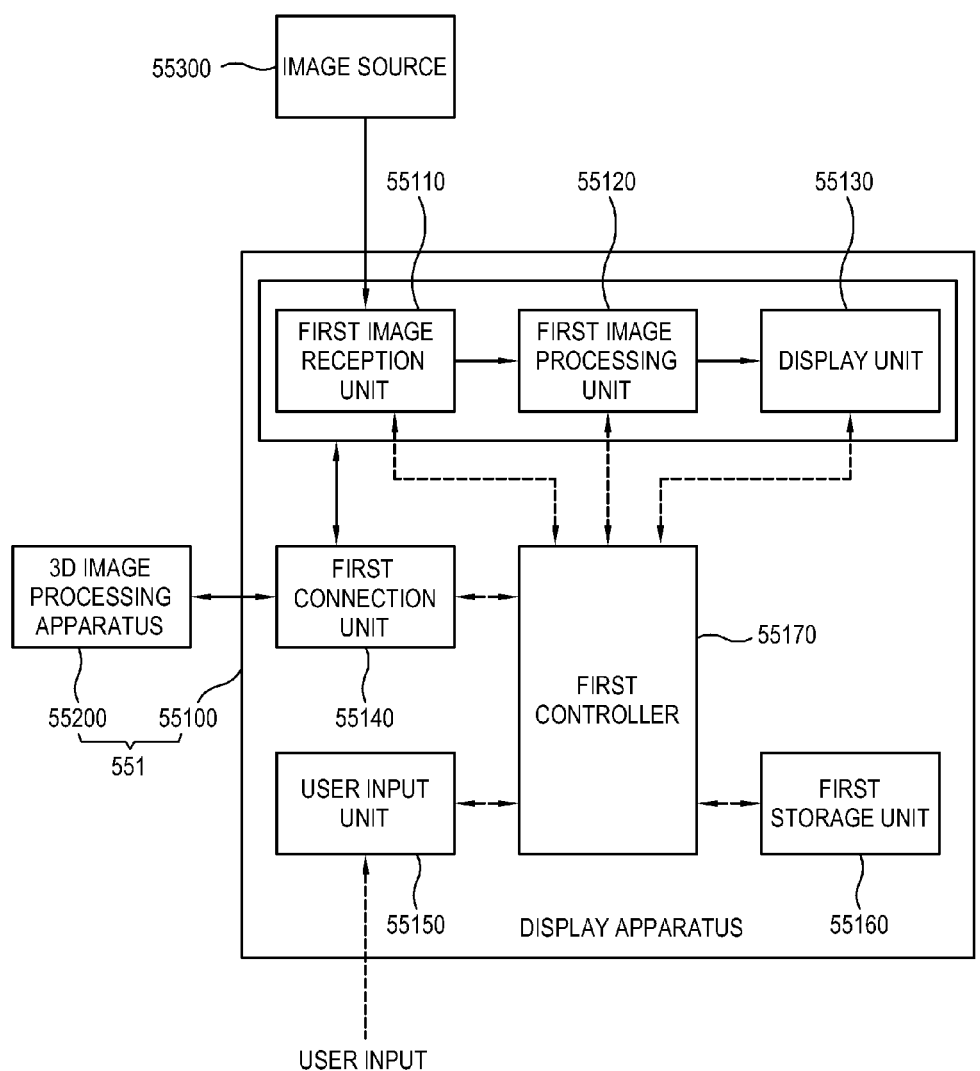
FIG. 34 is a block diagram illustrating a configuration of a display apparatus according to an exemplary embodiment.

FIG. 34 is a block diagram illustrating a configuration of the display apparatus 55100 of the display system 551 according to an exemplary embodiment.

As shown in FIG. 34, the display apparatus 55100 includes a first image reception unit 55110 to which at least one image source 55300 is connected, a first image processing unit 55120 processing an image signal received from the image source 55300 through the first image reception unit 55110, a display unit 55130 displaying an image based on the image signal processed by the first image processing unit 55120, a first connection unit 55140 to which the 3D image processing apparatus 55200 is detachably connected, a user input unit 55150 outputting a preset command based on user input, a first storage unit 55160 storing unlimited data or information, and a first controller 55170 controlling operations of all components of the display apparatus 55100.

The first image reception unit 55110 is an input/output (I/O) device transmitting an image signal received from the at least one image source 55300 to the first image processing unit 55120 and is configured as various types corresponding to standards of received image signals or configurations of the image source 55300 and the display apparatus 55100. For example, the first image reception unit 55110 may receive signals or data in accordance with the HDMI, USB, and component standards and may include a plurality of connection terminals (not shown) corresponding to the respective standards. Various external devices including the image source 55300 are connected to the respective connection terminals, thereby enabling communication via the first image reception unit 55110. The image signals received through the first image reception unit 55110 include a 2D image signal and a 3D image signal.

The first image processing unit 55120 may perform various preset image processing processes on an image signal received from the first image reception unit 55110. The first image processing unit 55120 outputs a processed image signal to the display unit 55130, so that an image based on the image signal is displayed on the display unit 55130.

The first image processing unit 55120 may perform any type of image processing, without being limited to, for example, demultiplexing to separate a signal into characteristic signals, decoding in accordance with an image format of an image signal, de-interlacing to convert an interlaced image signal into a progressive form, scaling to adjust an image signal to a preset resolution, noise reduction to improve image quality, detail enhancement, frame refresh rate conversion, or the like.

Figure 36:
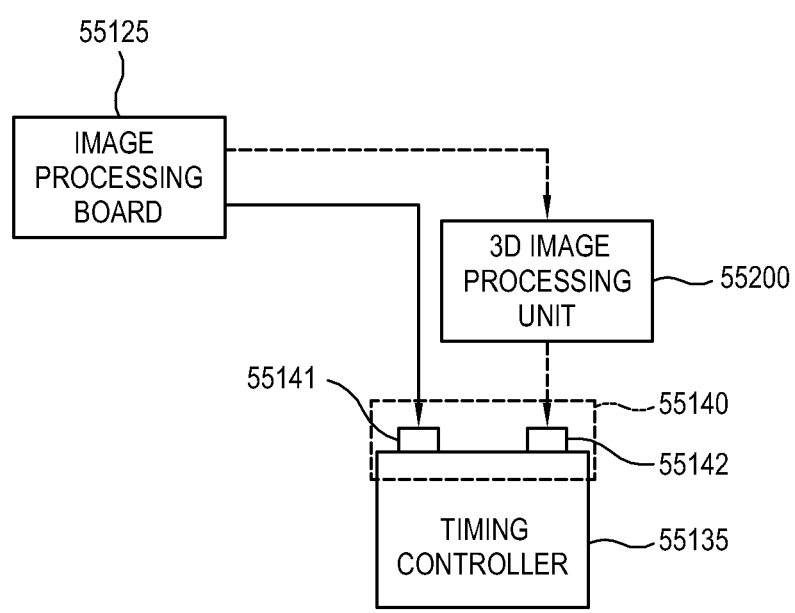
FIGS. 36 to 38 illustrate a 3D image processing apparatus coupled to a display apparatus according to exemplary embodiments.

The first image processing unit 55120 is provided as an image processing board 55125, as shown in FIG. 36, in which a circuit system including various chip sets (not shown), a memory (not shown), electronic components (not shown) and wiring (not shown) to conduct such processes is mounted on a printed circuit board (PCB, not shown).

The display unit 55130 displays an image based on an image signal output from the first image processing unit 55120. The display unit may be configured in various display modes using liquid crystals, plasma, light emitting diodes, organic light emitting diodes, a surface conduction electron emitter, a carbon nano-tube, nano-crystals, or the like, without being limited thereto.

Figure 38:
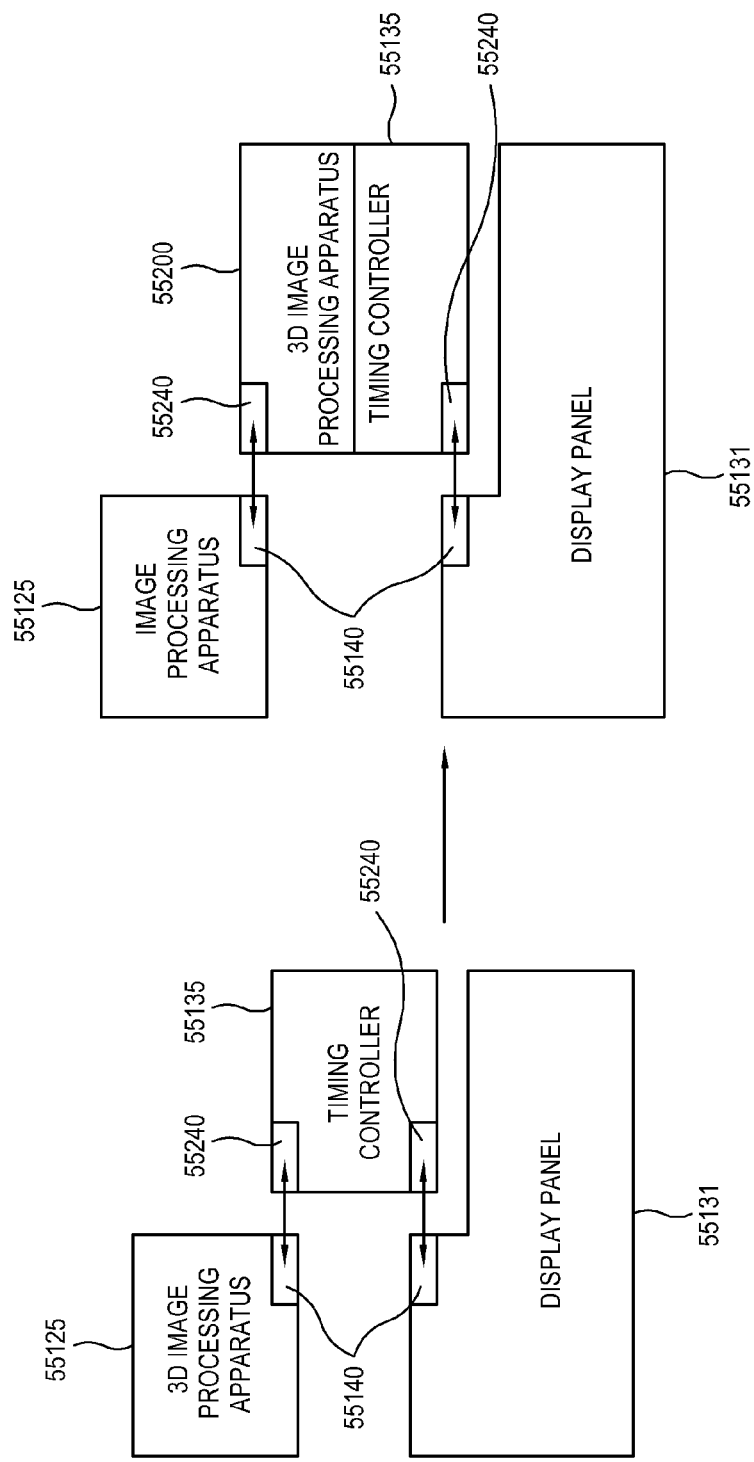

As shown in FIG. 38, the display unit 55130 may further include an additional element depending on a display mode thereof. For example, in a display mode using liquid crystals, the display unit 55130 may include an LCD panel 55131, a backlight unit (not shown) providing light to the panel 55131, a panel drive board (not shown) including a driver to drive the panel 55131, and a timing controller (T-con) 55135 coupled to a front end portion of the display panel 55131 to control the driver and improve image quality.

The 3D image processing apparatus 55200 is detachably coupled to the first connection unit 55140. The display apparatus 55100 and the 3D image processing apparatus 55200 are coupled to each other by various methods, which will be described in detail.

The first connection unit 55140 communicates with the 3D image processing apparatus 55200. In detail, the first connection unit 55140 transmits an image signal received from the image source 55300 to the 3D image processing apparatus 55200 and receives a processed 3D image signal from the 3D image processing apparatus 55200.

The user input unit 55150 transmits various preset control commands or unlimited information to the first controller 55170 by a user's manipulation and input. The user input unit 55150 may be provided as a menu key and an input panel installed on an outside of the display apparatus 55100 or as a remote controller separate from the display apparatus 55100.

Alternatively, the user input unit 55150 may be configured as a single body with the display unit 55130. That is, if the display unit 55130 is a touch screen, a user may transmit a preset command to the first controller 55170 through an input menu (not shown) displayed on the display unit 55130.

The first storage unit 55160 may store unlimited data according to control of the first controller 55170. The first storage unit 55160 may be configured as a non-volatile memory, such as a flash memory and a hard disk drive. The first storage unit 55160 is accessible by the first controller 55170, and the data stored in the first storage unit 55160 may be read, recorded, revised, deleted, or updated by the first controller 55170.

The first storage unit 55160 may store, for example, an operating system to run the display apparatus 55100 and various applications, image data, and optional data which are executable in the operating system.

The first controller 55170 performs control operations over various components of the display apparatus 55100. For example, the first controller 55170 conducts image processing by the first image processing unit 55120, transmission or reception operations of signals, information, or data through the first connection unit 55110, and a control operation corresponding to a command from the user input unit 55150, thereby controlling the overall operation of the display apparatus 55100.

When the 3D image processing apparatus 55200 is connected, the first controller 55170 may identify that an image signal received through the first image reception unit 55110 is a 3D image signal through upgrade of firmware of the first image processing unit 55120. The first controller 55170 transmits the identified 3D image signal to the 3D image processing apparatus 55200, controls the first connection unit 55140 to receive the processed 3D image signal from the 3D image processing apparatus 55200, and controls the display unit 55130 to display a 3D image based on the processed 3D image signal.

The display apparatus 55100 having the foregoing configuration needs upgrading over time due to various factors, such as technology development. Upgrading is necessary, for example, to receive a 3D image signal which is not proposed when the display apparatus 55100 is first manufactured. According to the present exemplary embodiment, the 3D image processing apparatus 55200 provided to upgrade the display apparatus 55100 is connected to the first connection unit 55140, thereby upgrading the display apparatus 55100 to achieve 3D display.

The 3D image processing apparatus 55200 includes hardware or software configurations corresponding to at least part of the hardware or software resources of the display apparatus 55100. These hardware or software configurations of the 3D image processing apparatus 55200 are provided to perform more improved functions than at least part of the resources of the display apparatus 55100. Thus, when the 3D image processing apparatus 55200 is connected to the display apparatus 55100, the hardware or software configurations of the 3D image processing apparatus 55200 replace at least part of the resources of the display apparatus 55100, thereby finally displaying a 3D image on the display apparatus 55100.

Figure 35:
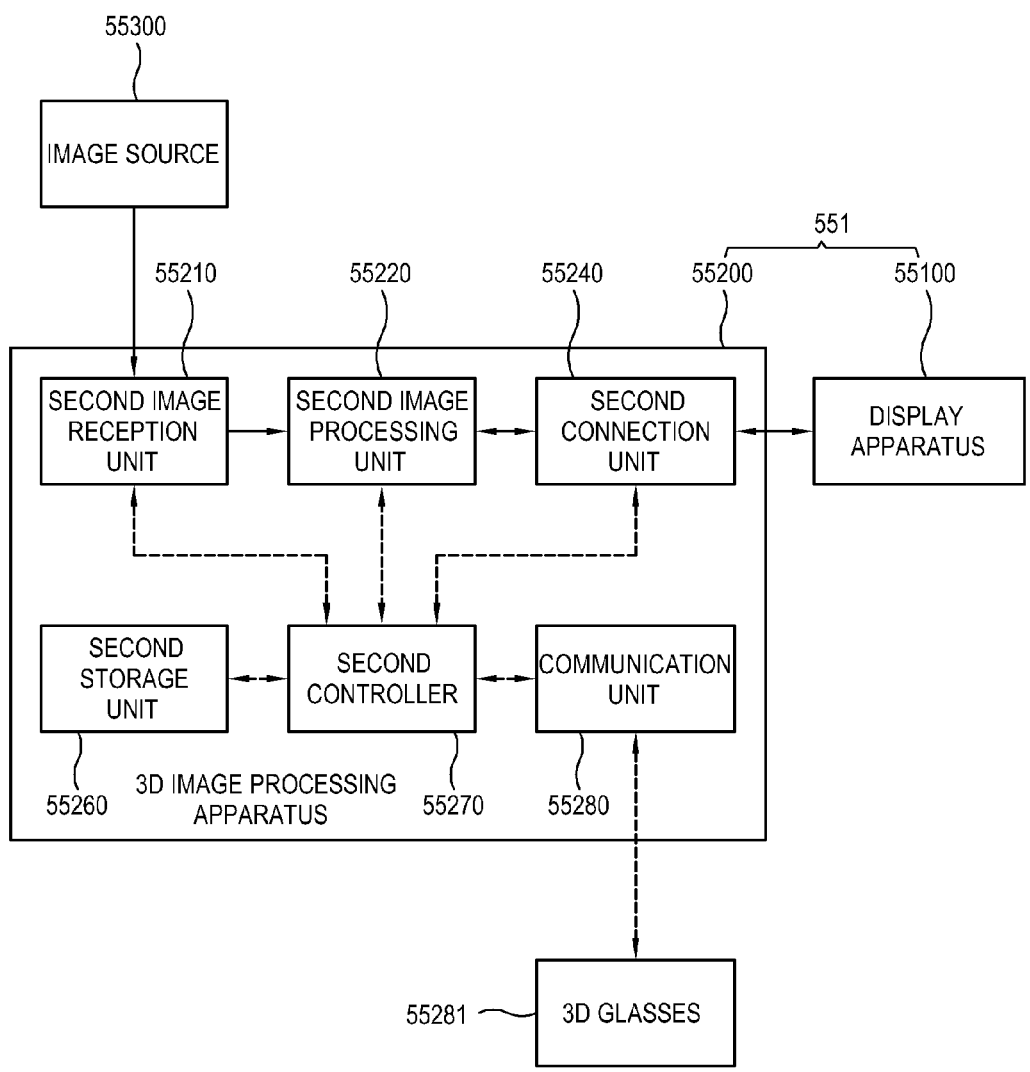
FIG. 35 is a block diagram illustrating a configuration of a 3D image processing apparatus according to an exemplary embodiment.

FIG. 35 is a block diagram illustrating a configuration of the 3D image processing apparatus 55200 of the display system 551 according to an exemplary embodiment.

The 3D image processing apparatus 55200 includes a second image reception unit 55210 to which at least one image source 55300 is connected, a second image processing unit 55220 processing a 3D image signal, a second connection unit 55240 connected to the first connection unit 55140 of the display apparatus 55100, a second storage unit 55260 storing unlimited data/information, a second controller 55270 controlling general operations of the 3D image processing apparatus 55200, and a communication unit 55280 communicating with a pair of 3D glasses 55281.

The second image reception unit 55210 receives an image signal from the at least one image source 55300 and can be configured as various types corresponding to standards of received image signals or configurations of the image source 55300 and the display apparatus 55100. For example, the second image reception unit 55210 may receive signals or data in accordance with the HDMI, USB, and component standards and may include a plurality of connection terminals (not shown) corresponding to the respective standards. Various external devices including the image source 55300 are connected to the respective connection terminals, thereby enabling communication via the second image reception unit 55210. The image signals received through the second image reception unit 55210 include a 2D image signal and a 3D image signal.

Although FIG. 35 illustrates the 3D image processing apparatus 55200 including the second image reception unit 55210 to receive an image signal, in another exemplary embodiment a component to receive an image signal in the 3D image processing apparatus 55200 may not be provided. When the second image reception unit 55210 is not provided, the 3D image processing apparatus 55200 receives an image signal from the display apparatus 55100, processes the received image signal, and transmits the processed image signal to the display apparatus 55100.

A 3D image may include a left-eye image and a right-eye image which are alternately displayed. A broadcast signal may be received in a form of a data stream. A stream of a broadcast signal includes, for example, an MPEG2 transport stream. The broadcast signal may include two or more streams. For example, the broadcast signal may include two streams (hereinafter, also referred to as a first stream and a second stream) respectively corresponding to a left-eye image and a right-eye image of a 3D image.

The second image processing unit 55220 processes a 3D image signal. The second image processing unit 55220 conducts demultiplexing, decoding, transcoding, scaling, or the like. The second image processing unit 55220 may include a demultiplexer (not shown), a first decoder (not shown) and a second decoder (not shown). When a broadcast signal is demultiplexed to first and second streams respectively corresponding to a left-eye image and a right-eye image of a 3D image, the demultiplexer separates the broadcast signal into the first stream and the second stream. The first decoder decodes the first stream to output the left-eye image, and the second decoder decodes the second stream to output the right-eye image. The decoded left-eye and right-eye images are alternately displayed by the display unit 55130 of the display apparatus 55100.

The second image processing unit 55220 may further include a dimming block (not shown) for turning on/off a power supply of a backlight to improve quality of a 3D image. The dimming block enables 3D contents to be more effectively reproduced.

The second image processing unit 55220 may include a 3D formatter converting a 2D image signal into a 3D image signal. The 2D image signal includes a plurality of image frames (hereinafter, referred to as "frames"). The 3D image signal, which uses binocular disparity, may include a plurality of left-eye frames and a plurality of right-eye frames. Among the left-eye frames and the right-eye frames, a pair including a left-eye frame and a right-eye frame may be converted from at least one corresponding frame among the plurality of frames of the 2D image signal.

When the display apparatus 55100 and the 3D image processing apparatus 55200 are connected, the second image processing unit 55220 processes a 3D image signal or converts a 2D image signal into a 3D image signal according to control of the first controller 55170 or the second controller 55270, thereby reproducing a 3D image, which will be described in detail.

The second connection unit 55240 is detachably connected to the first connection unit 55140, thereby enabling communication between the 3D image processing apparatus 55200 and the display apparatus 55100.

Figure 37:
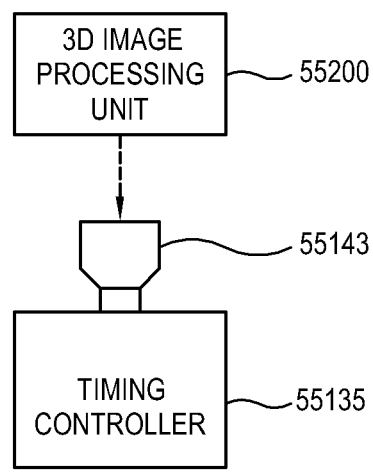

FIGS. 36 to 38 illustrate the 3D image processing apparatus 55200 which is connected to the display apparatus 55100.

The 3D image processing apparatus 55200 may be detachably connected to any one of the timing controller 55135, the display panel 55131, and the image processing board 55125 of the display apparatus 55100.

As shown in FIG. 36, the second connection unit 55210 may be connected to at least one connector 551412 among a plurality of connectors 55141 and 55142 provided in the timing controller 55135. Here, the display apparatus 55100 is launched with the image processing board 55125 connected to connector 55141. Connector 55142 is a spare connector. The 3D image processing apparatus 55200 will be connected to the spare connector 55142, thereby upgrading the display apparatus 55100 to achieve 3D display.

When the display apparatus 55100 does not include the spare connector 55142 for connection of the 3D image processing apparatus 55200, the 3D image processing apparatus 55200 may be coupled through a gender changer 55143 connected to the first connection unit 55140, as shown in FIG. 37.

Meanwhile, as shown in FIG. 38, the display apparatus 55100 may be launched with the timing controller 55135 slidingly coupled to slots of the display panel 55131 and the image processing board 55125. Then, a module, which is designed in a combined form of the 3D image processing apparatus 55200 and the timing controller 55135, replaces the timing controller 55135, thereby conveniently upgrading the display apparatus 55100 to enable 3D image processing.

Connection methods of the 3D image processing apparatus 55200 shown in FIGS. 36 to 38 are provided only for illustrative purposes, and the first connection unit 55140, and the second connection unit 55240 may be connected by various methods in addition to the foregoing examples.

The second storage unit 55260 stores unlimited data. The second storage unit 55260 is configured as a non-volatile storage medium, such as a flash memory and a hard disk drive. The second storage unit 55260 is accessed by the first controller 55170 or the second controller 55270, and the data stored in the second storage unit 55260 may be read, recorded, revised, deleted, or updated by the controller 55170 and the controller 55270. Meanwhile, the second storage unit 55260 may be also accessed not only by the second controller 55270 but by the first controller 55170 based on a configuration thereof.

The second controller 55270 performs control operations over various components of the 3D image processing apparatus 55200 to conduct general image processing processes. For example, the second controller 55270 conducts image processing by the second image processing unit 55220 and transmission or reception operations of signals, information, or data through the second connection unit 55210, thereby controlling general operations of the 3D image processing apparatus 55200.

The second controller 55270 and the first controller 55170 may be configured as a CPU. Thus, when a 3D image signal is received, the second controller 55270 may disable the first controller 55170 and control general operations of the display system 551 instead of the first controller 55170. Alternatively, the second controller 55270 may control the general operations of the display system 551 together with the first controller 55170.

The second controller 55270 and the first controller 55170 may further include a graphic processing unit (GPU) subserving the CPU, a digital signal processor (DSP), and a memory, such as a DDR RAM.

The communication unit 55280 communicates with the pair of 3D glasses 55281 and synchronizes a signal transmitted to the 3D glasses 55281 with a processed 3D image signal. The 3D glasses 55281 is configured as a pair of shutter glasses selectively transmitting light depending on an application of voltage or a pair of polarized glasses transmitting light in a preset polarization direction.

The communication unit 55280 may include a wireless communication module in accordance with a predetermined communication standard, such as radio frequency (RF), Zigbee, Bluetooth, near field communication (NFC), and infrared communication, and may enable transmission and reception of various unlimited signals, information, or data between the display apparatus 55100 and the 3D glasses 55281.

Hereinafter, a process of upgrading the display apparatus 55100 to achieve 3D display by the 3D image processing apparatus 55200 according to an exemplary embodiment will be described with reference to FIGS. 39 to 43.

FIGS. 39 to 43 are flowcharts illustrating methods of performing an image processing process of the display apparatus 55100 ungraded by the 3D image processing apparatus 55200 in the display system 551 according to exemplary embodiments.

Figure 39:
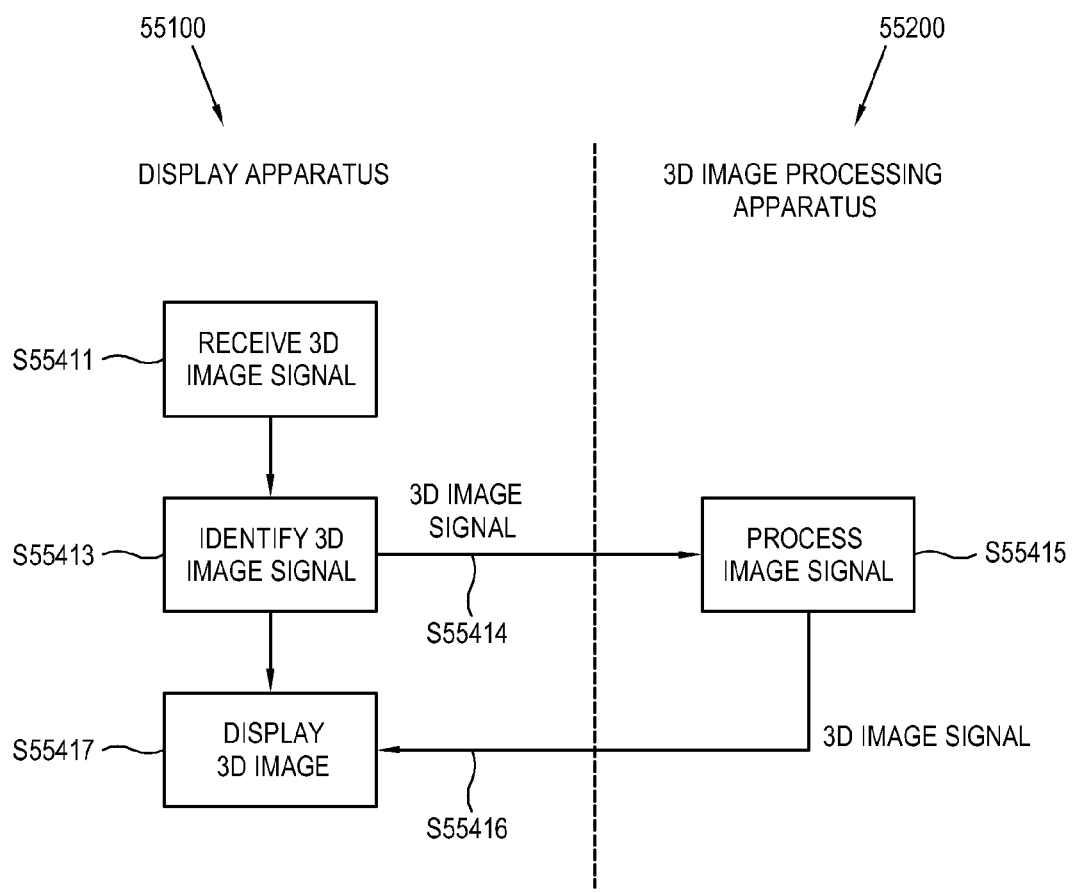
FIGS. 39 to 43 are flowcharts illustrating methods of performing an image processing process of a display apparatus upgraded by a 3D image processing apparatus in a display system according to exemplary embodiments.

When a 2D or 3D image signal is received from the image source 55300 in operation S55411 of FIG. 39, the display apparatus 55100 processes the image signal according to a preset sequence of image processing processes in operations S55413, S55415, and S55417 of FIG. 39. It should be noted that FIG. 39 illustrates only some image processing processes for concise description of the present exemplary embodiment, and does not show all image processing processes actually implemented by the display apparatus 55100.

Figure 40:
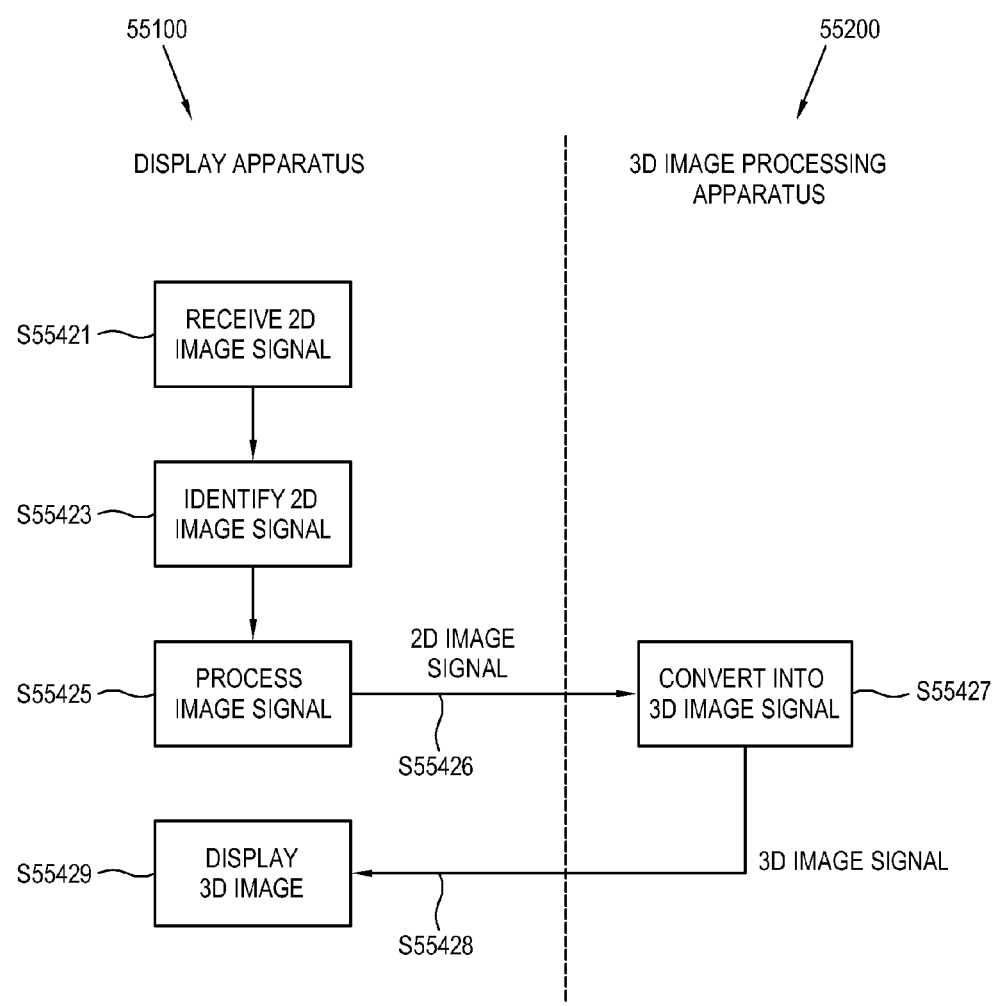

FIGS. 39 and 40 illustrate an image signal received through the first image reception unit 55110 of the display apparatus 55100.

As shown in FIG. 39, when the display apparatus 55100 receives a 3D image signal from the image source 55300 in operation S55411, the first controller 55170 identifies the received signal as a 3D image signal in operation S55413 and transmits the signal to the 3D image processing apparatus 55200 in operation S55414. The second controller 55270 controls the second image processing unit 55220 to process the received 3D image signal in operation S55415 and transmits the processed 3D image signal to the display apparatus 55100 in operation S55416. The first controller 55170 displays a 3D image based on the 3D image signal on the display unit 55130 in operation S55417.

As shown in FIG. 40, when the display apparatus 55100 receives a 2D image signal from the image source 55300 in operation S55421, the first controller 55170 identifies the received image signal as a 2D image signal in operation S55423 and controls the first image processing unit 55120 to process the 2D image signal in operation S55425. The first controller 55170 transmits the processed 2D image signal to the 3D image processing apparatus 55200 in operation S55426. The second controller 55270 controls the second image processing unit 55220 to convert the received 2D image signal into a 3D image signal in operation S55427 and transmits the converted 3D image signal to the display apparatus 55130 in operation S55428. The first controller 55170 displays a 3D image based on the 3D image signal on the display unit 55130 in operation S55429.

Although FIG. 40 illustrates that the first image processing unit 55120 processes a 2D image signal and the second image processing unit 55220 converts the 2D image signal into a 3D image signal, the second image processing unit 55220 may process a 2D image signal and convert the 2D image signal into a 3D image signal. In this case, the first controller 55170 may identify an image signal as a 2D signal and transmit the signal to the 3D image processing apparatus 55200.

Figure 41:
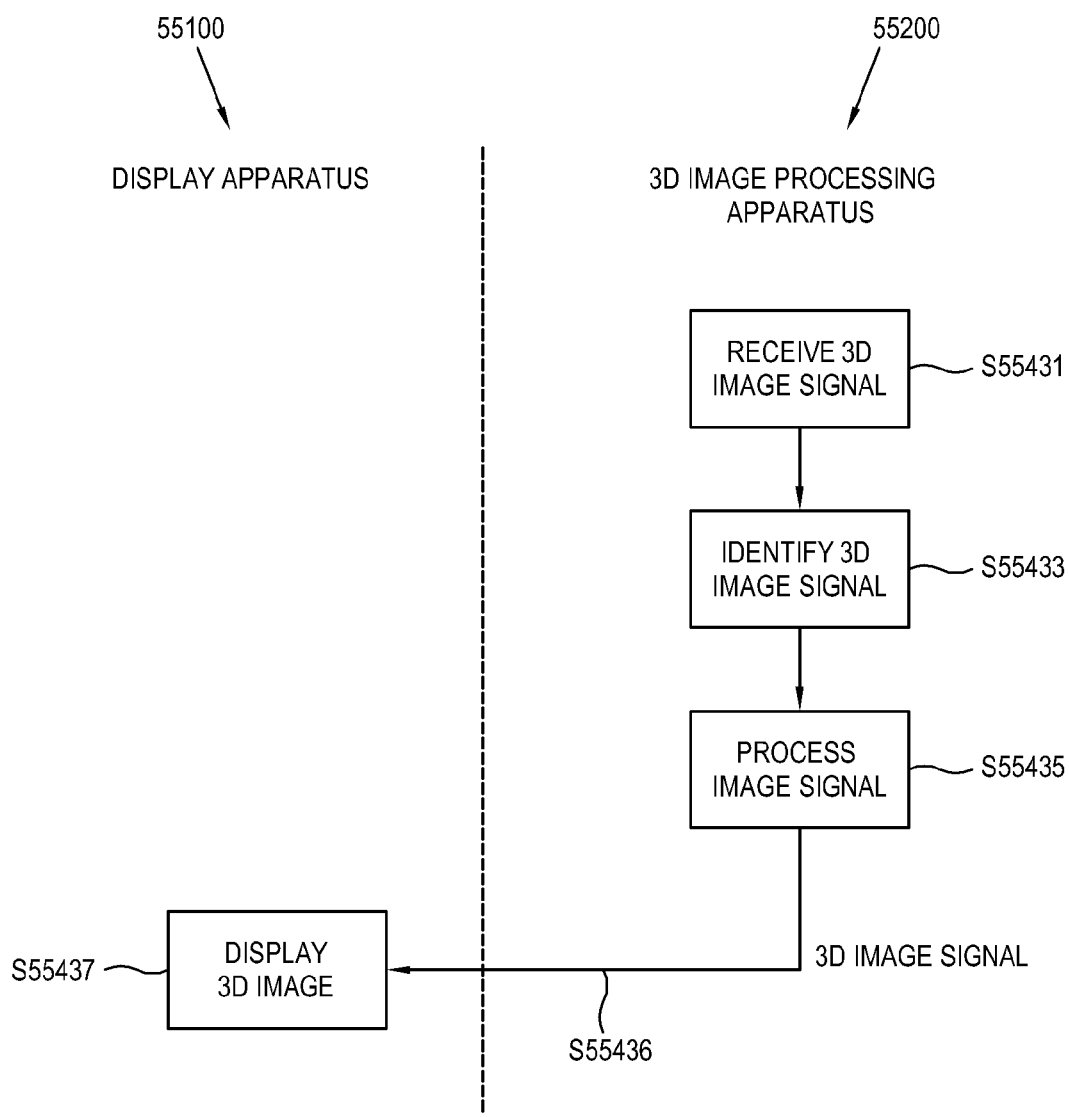
Figure 42:
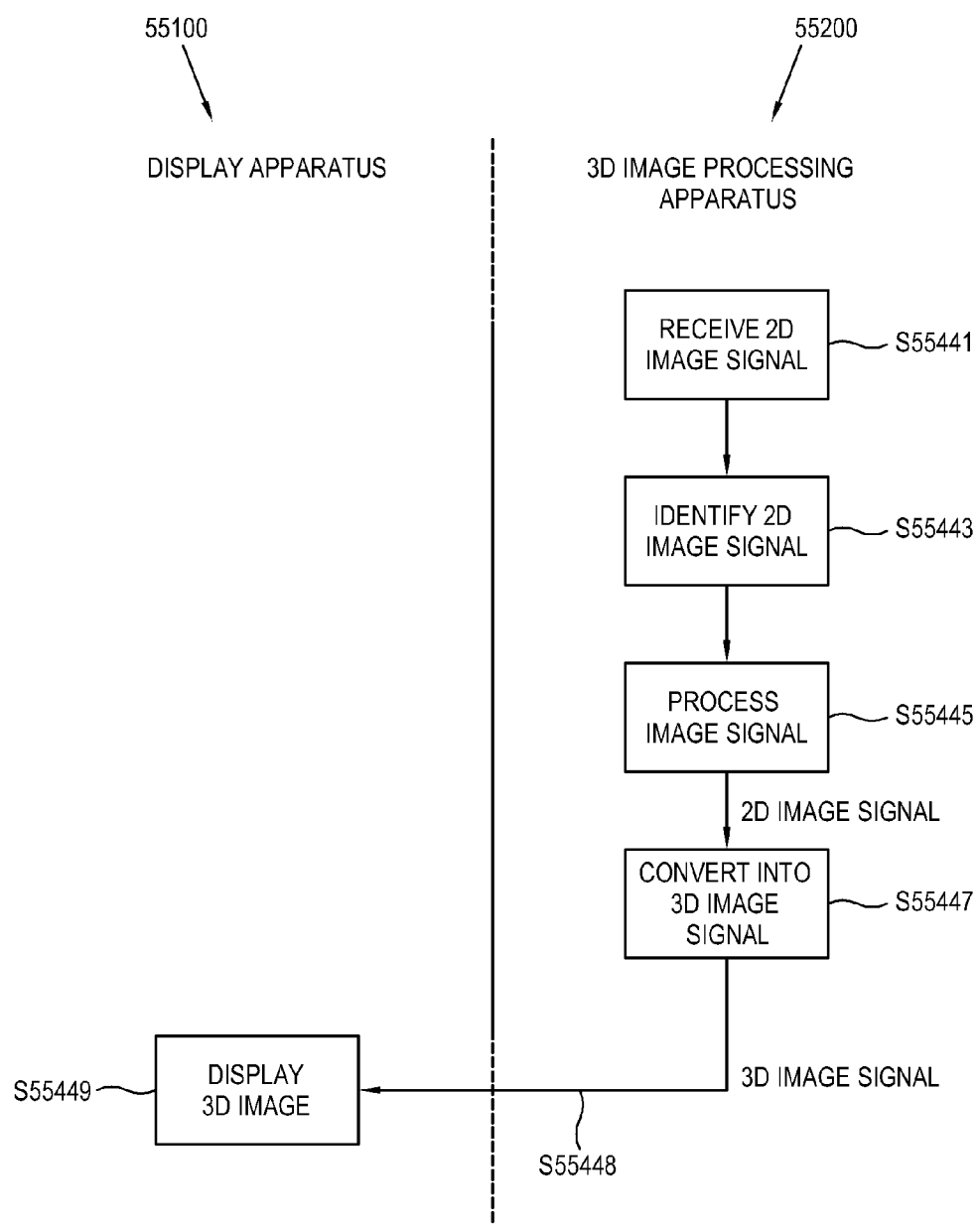
Figure 43:
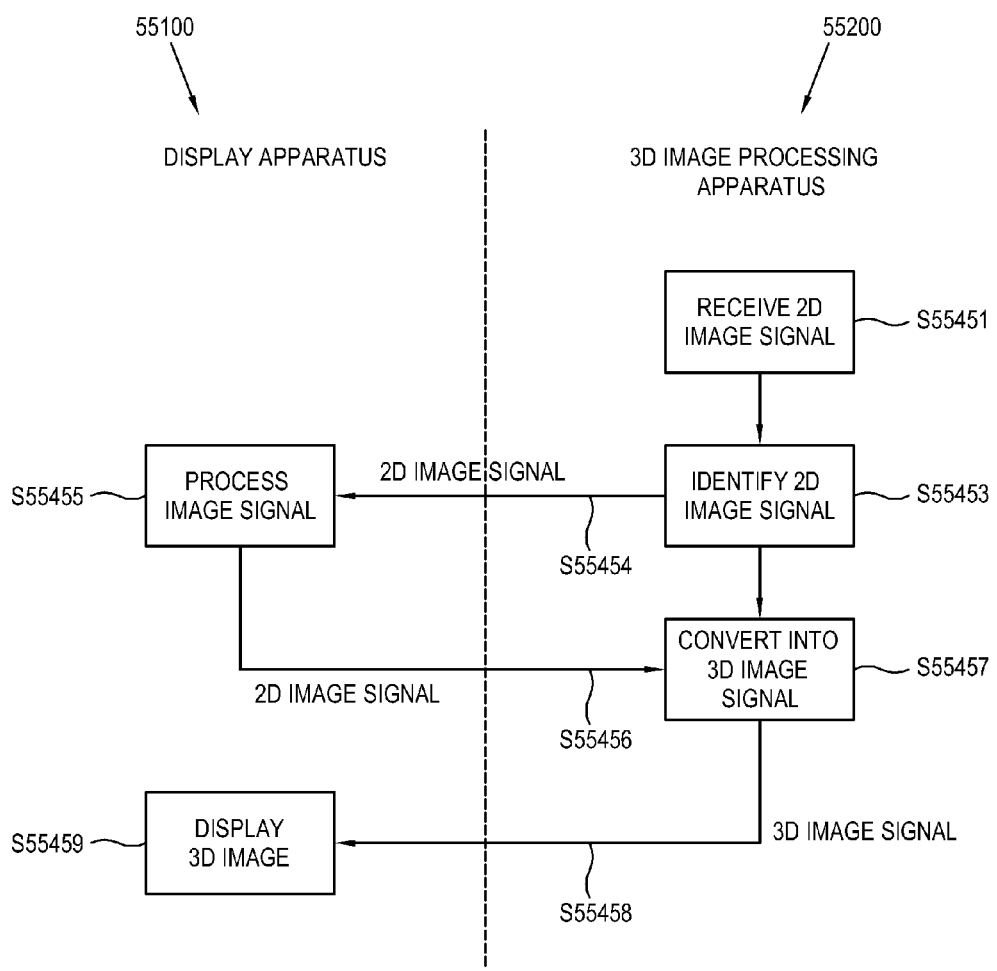

FIGS. 41 to 43 illustrate the 3D image processing apparatus 55200 including the second image reception unit 55210 to receive an image signal autonomously.

As shown in FIG. 41, when the 3D image processing apparatus 55200 receives a 3D image signal from the image source 55300 in operation S55431, the second controller 55270 identifies the received image signal as a 3D image signal in operation S55433 and controls the second image processing unit 55120 to process the received 3D image signal in operation S55435. The second controller 55270 transmits the processed 3D image signal to the display apparatus 55100 in operation S55436. The first controller 55170 displays a 3D image based on the 3D image signal on the display unit 55130 in operation S55437.

As shown in FIG. 42, when the 3D image processing apparatus 55200 receives a 2D image signal from the image source 55300 in operation S55441, the second controller 55270 identifies the received image signal as a 2D image signal in operation S55443, processes the received 2D image signal in operation S55445, and controls the second image processing unit 55220 to convert the processed 2D image signal into a 3D image signal in operation S55447. The second controller 55270 transmits the converted 3D image signal to the display apparatus 55100 in operation S55448. The first controller 55170 displays a 3D image based on the received 3D image signal on the display unit 55130 in operation S55449.

FIG. 43 is distinguished from FIG. 42 in that the first image processing unit 55120 processes a 2D image signal. As shown in FIG. 43, when the 3D image processing apparatus 55200 receives a 2D image signal from the image source 55300 in operation S55451, the second controller 55270 identifies the received image signal as a 2D image signal in operation S55453 and transmits the received 2D image signal to the display apparatus 55100 in operation S55454. The first controller 55170 controls the first image processing unit 55120 to process the received 2D image signal in operation S55455 and transmits the processed 2D image signal to the 3D image processing apparatus 55200 in operation S55456. The second controller 55270 controls the second image processing unit 55220 to convert the processed 2D image signal into a 3D image signal in operation S55457. The second controller 55270 transmits the converted 3D image signal to the display apparatus 55100 in operation S55458. The first controller 55170 displays a 3D image based on the received 3D image signal on the display unit 55130 in operation S55459.

As described above, according to the exemplary embodiments, the 3D image processing apparatus 55200 is detachably coupled to the display apparatus 55100 processing a 2D image, thereby conveniently upgrading the display apparatus 55100 to reproduce 3D contents.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image processing apparatus comprising:
   a signal input unit;
   a first image processing unit which processes an input signal input by the signal input unit to output a first output signal;
   an upgrade apparatus connection unit configured to be attachable to and detachable from an upgrade apparatus comprising a second image processing unit; and
   a first controller which controls the input signal processed by the first image processing unit and the first output signal to be transmitted to the upgrade apparatus and processed by the second image processing unit if the upgrade apparatus is connected to the upgrade apparatus connection unit,
   wherein a first function of the image processing apparatus is performed when the upgrade apparatus is not connected to the upgrade apparatus connection unit, and
   wherein the upgrade apparatus is configured to update the image processing apparatus to perform a new function, which is upgraded from or added to the first function, in response to the upgrade apparatus being connected to the upgrade apparatus connection unit,
   wherein the first controller controls to process a signal received from the upgrade apparatus separate with the first output signal if the upgrade apparatus is connected to the upgrade apparatus connection unit.

2. The image processing apparatus of claim 1, further comprising a display unit which displays at least one of a first image corresponding to the first output signal output by the first image processing unit and a second image corresponding to a second output signal processed and output by the second image processing unit of the upgrade apparatus.

3. The image processing apparatus of claim 2, wherein the upgrade apparatus connection unit transmits the first output signal to the display unit if the upgrade apparatus is not inserted into the upgrade apparatus connection unit, and transmits the second output signal output from the second image processing unit to the display apparatus if the upgrade apparatus is inserted into the upgrade apparatus connection unit.

4. The image processing apparatus of claim 3, wherein the upgrade apparatus connection unit comprises a first input signal terminal to which the first output signal is input;
   and a display unit output terminal selectively brought in contact with at least one of the first input signal terminal and a body connection unit of the upgrade apparatus based on whether the upgrade apparatus is connected, to output any one of the first output signal and the second output signal to the display unit.

5. The image processing apparatus of claim 4, further comprising an elastic member which elastically biases at least one of the first input signal terminal and the display unit output terminal so that the first input signal terminal and the display unit output terminal are brought in contact if the upgrade apparatus is not connected to the upgrade apparatus connection unit.

6. The image processing apparatus of claim 2, further comprising a signal connection member inserted into the upgrade apparatus connection unit so that the first output signal is transmitted to the display unit if the upgrade apparatus is not connected to the upgrade apparatus connection unit.

7. The image processing apparatus of claim 2, further comprising a data selection unit which selects and outputs one of the first output signal output from the first image processing unit and the second output signal output from the upgrade apparatus connection unit to the display unit according to control of the first controller; and
   a data distribution unit which distributes the first output signal to the upgrade apparatus connection unit and the data selection unit according to control of the first controller.

8. The image processing apparatus of claim 7, wherein the first controller controls the data distribution unit and the data selection unit to output the first output signal output from the first image processing unit to the display unit if the upgrade apparatus is not connected.

9. The image processing apparatus of claim 7, wherein the first controller controls the data distribution unit and the data selection unit to distribute the first output signal output from the first image processing unit to the upgrade apparatus connection unit and to output the second output signal output by the upgrade apparatus to the display unit if the upgrade apparatus is connected.

10. The image processing apparatus of claim 2, further comprising an image signal switch which selectively transmits the first output signal output from the first image processing unit to the display unit,
    wherein the first image processing unit outputs the first output signal to the upgrade apparatus connection unit and the image signal switch, and the first controller controls the image signal switch to transmit the first output signal output by the first image processing unit to the display unit if the upgrade apparatus is not connected, and to transmit the second output signal processed by the upgrade apparatus to the display unit if the upgrade apparatus is connected.

11. The image processing apparatus of claim 10, wherein the image signal switch comprises a low voltage differential signaling (LVDS) switch.

12. The image processing apparatus of claim 10, wherein the first image processing unit comprises a first output port which outputs the first output signal to the upgrade apparatus connection unit and a second output port which outputs the first output signal to the image signal switch.

13. The image processing apparatus of claim 1, wherein the first output signal comprises at least one of a first image signal and a first audio signal, and the upgrade apparatus connection unit comprises a first connection unit transmitting at least one of the input signal and the first image signal to the upgrade apparatus and a second connection unit which transmits or receives at least one of a control signal and the first audio signal to or from the upgrade apparatus.

14. The image processing apparatus of claim 1, wherein the first output signal comprises at least one of a first image signal and a first audio signal, and the image processing apparatus further comprises an audio output unit which outputs any one of the first audio signal and a second audio signal processed by the second image processing unit of the upgrade apparatus.

15. The image processing apparatus of claim 1, further comprising at least one of a wireless user input unit which receives input wirelessly from a user, a wireless communication unit to access an Internet network and a camera unit to take an image; and
    a control path conversion switch which selects the first controller or the upgrade apparatus to control over at least one of the wireless user input unit, the wireless communication unit and the camera unit based on whether the upgrade apparatus is connected.

16. The image processing apparatus of claim 15, wherein the first controller controls the wireless user input unit, the wireless communication unit and the camera unit if the upgrade apparatus is not connected to the upgrade apparatus connection unit, and does not control at least one of the wireless user input unit, the wireless communication unit and the camera unit if the upgrade apparatus is connected to the upgrade apparatus connection unit.

17. The image processing apparatus of claim 15, wherein the upgrade apparatus controls at least one of the wireless user input unit, the wireless communication unit and the camera unit through the control path conversion switch if the upgrade apparatus is connected to the upgrade apparatus connection unit.

18. The image processing apparatus of claim 1, wherein the first controller performs control to receive information about at least one upgraded function provided by the upgrade apparatus and performs control to perform the upgraded function based on the information about the upgraded function.

19. The image processing apparatus of claim 1, wherein the first controller assigns control to the upgrade apparatus, and the first image processing unit performs image processing on the input signal based on control by the upgrade apparatus.

20. The image processing apparatus of claim 1, wherein the first controller performs control to receive an external input signal input through the upgrade apparatus and performs control to display an image based on the received external input signal.

21. The image processing apparatus of claim 1, wherein the first controller controls the first output signal processed by the first image processing unit to be transmitted to the upgrade apparatus and outputted to outside of the image processing apparatus.

22. The image processing apparatus of claim 1, further comprising at least one subsidiary module each accommodating firmware, wherein the first controller upgrades the firmware of the at least one subsidiary module based on corresponding upgraded firmware received from the upgrade apparatus.

23. The image processing apparatus of claim 22, wherein the first controller upgrades the firmware according to control by the upgrade apparatus.

24. The image processing apparatus of claim 22, wherein the first controller backs up each firmware accommodated in the at least one subsidiary module in the upgrade apparatus.

25. The image processing apparatus of claim 22, further comprising a user input unit to input a user selection, wherein the first controller upgrades the firmware based on the user selection.

26. The image processing apparatus of claim 1, further comprising a storage unit which stores extended display identification data (EDID), and wherein the first controller upgrades the EDID based on upgraded EDID information received from the upgrade apparatus.

27. The image processing apparatus of claim 1, wherein the first controller controls each of a plurality of image processing processes to process the image signal to be selectively performed by one of the first image processing unit and the second image processing unit.

28. The image processing apparatus of claim 27, wherein the first image processing unit comprises a plurality of first blocks processing at least part of the plurality of image processing processes, and the second image processing unit comprises a plurality of second blocks corresponding to the first blocks, respectively, and processing at least part of the plurality of image processing processes.

29. The image processing apparatus of claim 28, further comprising a plurality of switching units respectively connected to the first blocks and the second blocks and which is switched to transmit a signal to one of the plurality of first blocks and the plurality of second blocks.

30. The image processing apparatus of claim 27, further comprising a user input unit to input a user selection, wherein the first controller controls each of the plurality image processing processes to be selectively performed by one of the first image processing unit and the second image processing unit based on the user selection.

31. The image processing apparatus of claim 1, wherein the first controller controls the upgrade apparatus connection unit to receive a three-dimensional (3D) image signal, converted from the first output signal, from the upgrade apparatus.

32. The image processing apparatus of claim 31, wherein the upgrade apparatus is detachably coupled to one of a timing controller, a display panel and an image processing board of the image processing apparatus.

33. The image processing apparatus of claim 32, wherein the upgrade apparatus is connected to a spare connector provided in the timing controller.

34. The image processing apparatus of claim 32, wherein the upgrade apparatus is inserted into slots of the image processing board and the display panel in combination with the timing controller.

35. An upgrade apparatus mounted on an image processing apparatus comprising a first image processing unit and a first controller, the upgrade apparatus comprising:
a body connection unit which is connected to the image processing apparatus;
a second image processing unit which receives and processes a signal output from the image processing apparatus through the body connection unit; and
a second controller which controls the second image processing unit,
wherein a first function of the image processing apparatus is performed when the upgrade apparatus is not connected to the image processing apparatus, and
wherein the upgrade apparatus is configured to update the image processing apparatus to perform a new function, which is upgraded from or added to the first function, in response to the upgrade apparatus being connected to the image processing apparatus,
wherein the first controller controls to process a signal received from the upgrade apparatus separate with the output signal if the upgrade apparatus is connected to the body connection unit, and
the first controller controls an input signal, input and processed by the first image processing unit, and an output signal, processed by the first image processing unit, to be transmitted to the upgrade apparatus and processed by the second image processing unit.

36. The upgrade apparatus of claim 35, further comprising a display connection unit connected to a display unit in order to transmit the signal processed by the second image processing unit to the display unit.

37. The upgrade apparatus of claim 35, wherein the body connection unit comprises a first body connection unit which receives a first image signal processed by the first image processing unit of the image processing apparatus, and a second body connection unit which receives one of a first audio signal processed by the first image processing unit and a control signal transmitted by the first controller.

38. The upgrade apparatus of claim 35, wherein the second controller controls at least one of the first controller and the first image processing unit.

39. The upgrade apparatus of claim 35, wherein the second controller performs control to transmit information about at least one upgraded function provided to the image processing apparatus and to perform the upgraded function.

40. The upgrade apparatus of claim 35, wherein the second controller is assigned control by the image processing apparatus and performs control to process the signal output from the image processing apparatus.

41. The upgrade apparatus of claim 35, further comprising a signal input unit to input an external input signal, wherein the second controller transmits the external input signal to the image processing apparatus and controls the image processing apparatus to display an image based on the transmitted external input signal.

42. The upgrade apparatus of claim 35, further comprising a signal output unit, wherein the second controller performs control to receive the signal output from the image processing apparatus and to output the signal to outside of the upgrade apparatus through the signal output unit.

43. The upgrade apparatus of claim 35, further comprising a storage unit storing upgraded firmware corresponding to a subsidiary module of the image processing apparatus, wherein the second controller comprises a controller which performs control to upgrade firmware of the at least one subsidiary module based on the upgraded firmware.

44. The upgrade apparatus of claim 43, wherein the second controller backs up the firmware of the at least one subsidiary module.

45. The upgrade apparatus of claim 43, wherein the second controller performs control to upgrade the firmware of the at least one subsidiary module based on a user selection input through the image processing apparatus.

46. The upgrade apparatus of claim 43, wherein the second controller performs control to upgrade the firmware of the at least one subsidiary module based on extended display identification data (EDID) received from the image processing apparatus.

47. The upgrade apparatus of claim 35, wherein the second controller controls the second image processing unit to generate a three-dimensional (3D) image signal by converting the signal output from the image processing apparatus and controls the connection unit to transmit the 3D image signal to the image processing apparatus.

48. The upgrade apparatus of claim 47, further comprising a communication unit communicating with a pair of 3D glasses, wherein the second controller performs synchronization of the 3D image signal based on a signal transmitted from the 3D glasses.

49. A control method of an image processing apparatus on which an upgrade apparatus is mounted, the control method comprising:
processing an input signal to output an output signal;
transmitting the input signal and the output signal to the upgrade apparatus if the upgrade apparatus is connected to the image processing apparatus;
receiving an image signal based on at least one of the input signal and the output signal from the upgrade apparatus;
processing the image signal to be displayed as an image; and
processing a signal received from the upgrade apparatus separate with the output signal if the upgrade apparatus is connected to an upgrade apparatus connection unit;
wherein a first function of the image processing apparatus is performed when the upgrade apparatus is not connected to the image processing apparatus, and
wherein the upgrade apparatus is configured to update the image processing apparatus to perform a new function, which is upgraded from or added to the first function, in response to the upgrade apparatus being connected to the image processing apparatus.

50. The control method of claim 49, further comprising receiving information about at least one upgraded function provided by the upgrade apparatus, and wherein the processing the image signal comprises performing the upgraded function based on the information about the upgraded function.

51. The control method of claim 49, further comprising receiving upgraded firmware from the upgrade apparatus; and upgrading firmware of at least one subsidiary module included in the image processing apparatus based on the received upgraded firmware.

52. The control method of claim 49, wherein each of a plurality of image processing processes to process the image signal is performed selectively by one of the image processing apparatus and the upgrade apparatus.

53. The control method of claim 49, wherein the receiving comprises receiving a three-dimensional (3D) image signal, converted from at least one of the input signal and the output signal, from the upgrade apparatus.

54. A control method of an upgrade apparatus mounted on an image processing apparatus, the control method comprising:
receiving a first image signal processed from the image processing apparatus if the upgrade apparatus is connected to the image processing apparatus;
processing at least one upgraded function of the image processing apparatus on the first image signal;
transmitting a second image signal, obtained by processing the at least one upgraded function, to the image processing apparatus; and
processing a signal received from the upgrade apparatus separate with an output signal if the upgrade apparatus is connected to an upgrade apparatus connection unit; and
transmitting an input signal, input and processed by a first image processing unit of the image processing apparatus, and an output signal, processed by the first image processing unit, to the upgrade apparatus and processed by the second image processing unit,
wherein a first function of the image processing apparatus is performed when the upgrade apparatus is not connected to the image processing apparatus, and
wherein the upgrade apparatus is configured to update the image processing apparatus to perform a new function, which is upgraded from or added to the first function, in response to the upgrade apparatus being connected to the image processing apparatus.

55. The control method of claim 54, further comprising transmitting information about the at least one upgraded function provided to the image processing apparatus.

56. The control method of claim 54, further comprising transmitting, to the upgrade apparatus, upgraded firmware to upgrade firmware of at least one subsidiary module included in the image processing apparatus.

57. The control method of claim 54, wherein the processing comprises generating a three-dimensional (3D) image signal by converting the first image signal received from the image processing apparatus, and wherein the transmitting comprises transmitting the 3D image signal to the image processing apparatus.

58. A display system comprising an image processing apparatus and an upgrade apparatus mounted on the image processing apparatus, comprising:
the image processing apparatus comprising:
a first image processing unit which processes a first input signal to output a first output signal;

a first controller which controls the first image processing unit; and an upgrade apparatus connection unit which is configured to be attachable to and detachable from the upgrade apparatus, the upgrade apparatus comprising:

a second image processing unit which processes a second input signal to output a second output signal;

a second controller which controls the second image processing unit; and a body connection unit which is connected to the upgrade apparatus connection unit, and wherein the first input signal processed by the first image processing unit and the first output signal is transmitted to the upgrade apparatus and processed by the second image processing unit if the upgrade apparatus is connected to the upgrade apparatus connection unit, wherein a first function of the image processing apparatus is performed when the upgrade apparatus is not connected to the upgrade apparatus connection unit, and wherein the upgrade apparatus is configured to update the image processing apparatus to perform a new function, which is upgraded from or added to the first function, in response to the upgrade apparatus being connected to the upgrade apparatus connection unit, wherein the first controller controls to process a signal received from the upgrade apparatus separate with the first output signal if the upgrade apparatus is connected to the upgrade apparatus connection unit.

59. The display system of claim 58, wherein the upgrade apparatus transmits information about at least one upgraded function provided to the image processing apparatus to the image processing apparatus, and the image processing apparatus performs the upgraded function based on the information about the upgraded function.

60. The display system of claim 58, wherein the image processing apparatus comprises at least one subsidiary module each accommodating firmware, wherein the upgrade apparatus comprises a storage unit which stores upgraded firmware corresponding to the at least one subsidiary module, and the image processing apparatus upgrades the firmware of at least one subsidiary module based on corresponding upgraded firmware received from the upgrade apparatus.

61. The display system of claim 58, wherein each of a plurality of image processing processes to process the image signal is performed selectively by one of the image processing apparatus and the upgrade apparatus.

62. The display system of claim 58, wherein the upgrade apparatus converts at least one of the first input signal and the first output signal output from the image processing apparatus into a three-dimensional (3D) image signal and transmits the 3D image signal to the image processing apparatus, and the image processing apparatus displays a 3D image based on the 3D image signal received from the upgrade apparatus.

63. The image processing apparatus of claim 1, wherein the upgrade apparatus is configured to perform a new function which cannot be executed by the first image processing unit.

64. The image processing apparatus of claim 63, wherein the new function is associated with processing 3D image signals.

65. The image processing apparatus of claim 1, wherein the upgrade apparatus is configured to perform a function upgraded from a pre-existing function of the image processing unit.

66. The image processing apparatus of claim 65, wherein the upgrade function performed by the upgrade apparatus is configured to generate a second output signal that is associated with higher image quality than that realized by the image processing apparatus alone.

67. The image processing apparatus of claim 1, further comprising a display unit, wherein the input signal comprises an image signal, and the first image processing unit and the upgrade apparatus cooperate with each other to perform image processing on the image signal to generate a processed image signal, and the display unit displays an image based on the processed image signal.

68. The image processing apparatus of claim 67, wherein the upgrade apparatus has priority to control the first image processing unit.

69. The image processing apparatus of claim 1, wherein the signal input unit comprises a tuner to receive a broadcast signal as the input signal.

70. The image processing apparatus of claim 1, wherein the input signal, the first output signal and the signal received from the upgrade apparatus are respective video signals.

71. The image processing apparatus of claim 1, wherein the first controller is configured to control the first output signal to be directly transmitted to the upgrade apparatus without using an intermediary memory during transmission.

* * * * *